(12) United States Patent
Gai et al.

(10) Patent No.: US 9,736,291 B2
(45) Date of Patent: Aug. 15, 2017

(54) MOBILE DEVICE PAIRING

(71) Applicant: LinkedIn Corporation, Sunnyvale, CA (US)

(72) Inventors: Bowei Gai, San Francisco, CA (US); Matthew David Shoup, San Jose, CA (US); Yevgeniy Brikman, Menlo Park, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 15/396,074

(22) Filed: Dec. 30, 2016

(65) Prior Publication Data

US 2017/0177291 A1    Jun. 22, 2017

Related U.S. Application Data

(63) Continuation of application No. 14/835,619, filed on Aug. 25, 2015, now Pat. No. 9,569,163, which is a continuation of application No. 13/708,893, filed on Dec. 7, 2012, now Pat. No. 9,131,333, which is a continuation-in-part of application No. 13/453,952, filed on Apr. 23, 2012, now Pat. No. 9,098,133.

(Continued)

(51) Int. Cl.
| | |
|---|---|
| *H04W 4/00* | (2009.01) |
| *G06F 3/01* | (2006.01) |
| *G06F 3/041* | (2006.01) |
| *H04M 1/725* | (2006.01) |

(52) U.S. Cl.
CPC .......... *H04M 1/7253* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 5,594,810 A | * | 1/1997 | Gourdol | G06F 3/04883 |
| | | | | 382/186 |
| 5,996,003 A | * | 11/1999 | Namikata | H04N 7/15 |
| | | | | 348/E7.081 |

(Continued)

FOREIGN PATENT DOCUMENTS

WO    WO-2011021877 A2    2/2011

OTHER PUBLICATIONS

"U.S. Appl. No. 13/453,952, Examiner Interview Summary mailed Jul. 16, 2014", 3 pgs.

(Continued)

*Primary Examiner* — Peijie Shen
(74) *Attorney, Agent, or Firm* — Schwegman Lundberg & Woessner, P.A.

(57) ABSTRACT

Systems and methods for pairing electronic devices are provided. In an example embodiment, first motion capture data corresponding to a physical user motion is received from a first device. Second motion capture data corresponding to the physical user motion is received from a second device. Features are extracted from the first motion capture data and the second motion capture data. An association between the first device and the second device is determined based on a comparison of the extracted features. In response to identifying the association between the first and second device, a communicative coupling between the first device and the second device is initiated.

20 Claims, 52 Drawing Sheets

Related U.S. Application Data

(60) Provisional application No. 61/582,146, filed on Dec. 30, 2011.

(56) References Cited

U.S. PATENT DOCUMENTS

| | | | | |
|---|---|---|---|---|
| 5,999,892 | A * | 12/1999 | Fan | G09B 29/106 340/995.16 |
| 6,011,545 | A * | 1/2000 | Henderson | G06F 3/046 178/18.03 |
| 6,128,603 | A * | 10/2000 | Dent | G06Q 20/04 705/33 |
| 6,252,563 | B1 * | 6/2001 | Tada | G06F 3/038 178/18.01 |
| 6,445,383 | B1 | 9/2002 | Chambers et al. | |
| 7,532,196 | B2 | 5/2009 | Hinckley | |
| 7,636,794 | B2 | 12/2009 | Ramos et al. | |
| 8,644,757 | B2 * | 2/2014 | Curcio | G06F 1/1626 345/156 |
| 9,098,133 | B2 | 8/2015 | Gai et al. | |
| 9,131,333 | B2 | 9/2015 | Gai et al. | |
| 9,137,627 | B2 | 9/2015 | Gai et al. | |
| 9,201,579 | B2 | 12/2015 | Brikman et al. | |
| 9,569,163 | B2 | 2/2017 | Gai et al. | |
| 9,571,956 | B2 | 2/2017 | Gai et al. | |
| 9,578,481 | B2 | 2/2017 | Gai et al. | |
| 2005/0093868 | A1 * | 5/2005 | Hinckley | G06F 3/011 345/502 |
| 2005/0228709 | A1 | 10/2005 | Segal | |
| 2008/0048980 | A1 * | 2/2008 | Love | G06F 1/1613 345/158 |
| 2008/0263235 | A1 * | 10/2008 | Hans | H04N 21/41407 710/22 |
| 2009/0049031 | A1 * | 2/2009 | Hepburn | G06F 17/30395 |
| 2009/0140986 | A1 * | 6/2009 | Karkkainen | G06F 3/0486 345/173 |
| 2009/0300139 | A1 * | 12/2009 | Shoemaker | G06Q 10/10 709/217 |
| 2010/0328447 | A1 * | 12/2010 | Watson | G06F 3/1446 348/135 |
| 2011/0074717 | A1 * | 3/2011 | Yamashita | G06F 1/1654 345/173 |
| 2011/0209104 | A1 | 8/2011 | Hinckley et al. | |
| 2011/0231783 | A1 * | 9/2011 | Nomura | G06F 3/0488 715/761 |
| 2012/0047046 | A1 * | 2/2012 | Mengerink | G06Q 20/10 705/26.41 |
| 2012/0105346 | A1 * | 5/2012 | Chen | G06F 3/04883 345/173 |
| 2012/0139865 | A1 * | 6/2012 | Krah | G06F 3/044 345/174 |
| 2012/0146930 | A1 | 6/2012 | Lee | |
| 2012/0213135 | A1 | 8/2012 | Woo et al. | |
| 2012/0242596 | A1 * | 9/2012 | Sip | G06F 3/04883 345/173 |
| 2012/0249415 | A1 * | 10/2012 | Nakajima | G06F 1/1647 345/156 |
| 2012/0280898 | A1 * | 11/2012 | Lucero | G06F 3/1446 345/156 |
| 2012/0328101 | A1 | 12/2012 | Lakshminarayanan | |
| 2012/0329540 | A1 * | 12/2012 | Wayans | A63F 13/80 463/9 |
| 2013/0169526 | A1 | 7/2013 | Gai et al. | |
| 2013/0169550 | A1 | 7/2013 | Gai et al. | |
| 2013/0169571 | A1 | 7/2013 | Gai et al. | |
| 2013/0214995 | A1 * | 8/2013 | Lewin | G06F 3/1446 345/1.3 |
| 2014/0160033 | A1 | 6/2014 | Brikman et al. | |
| 2015/0268789 | A1 * | 9/2015 | Liao | G06F 3/0488 345/173 |
| 2015/0334519 | A1 | 11/2015 | Gai et al. | |
| 2016/0007174 | A1 | 1/2016 | Gai et al. | |
| 2016/0054973 | A1 | 2/2016 | Gai et al. | |
| 2016/0062588 | A1 | 3/2016 | Brikman et al. | |

OTHER PUBLICATIONS

"U.S. Appl. No. 13/453,952, Final Office Action mailed Oct. 27, 2014", 39 pgs.

"U.S. Appl. No. 13/453,952, Non Final Office Action mailed Mar. 20, 2014", 36 pgs.

"U.S. Appl. No. 13/453,952, Notice of Allowance mailed Mar. 30, 2015", 8 pgs.

"U.S. Appl. No. 13/453,952, Response filed Feb. 25, 2015 to Final Office Action mailed Oct. 27, 2014", 14 pgs.

"U.S. Appl. No. 13/453,952, Response filed Jun. 20, 2014 to Non Final Office Action mailed Mar. 20, 2014", 11 pgs.

"U.S. Appl. No. 13/453,952, Supplemental Notice of Allowability mailed May 13, 2015", 2 pgs.

"U.S. Appl. No. 13/708,842, Examiner Interview Summary mailed Jun. 17, 2015", 3 pgs.

"U.S. Appl. No. 13/708,842, Examiner Interview Summary mailed Oct. 23, 2014", 3 pgs.

"U.S. Appl. No. 13/708,842, Final Office Action mailed Mar. 11, 2015", 14 pgs.

"U.S. Appl. No. 13/708,842, Non Final Office Action mailed Jun. 27, 2014", 11 pgs.

"U.S. Appl. No. 13/708,842, Notice of Allowance mailed Jul. 22, 2015", 5 pgs.

"U.S. Appl. No. 13/708,842, Response filed Jun. 11, 2015 to Final Office Action mailed Mar. 11, 2015", 12 pgs.

"U.S. Appl. No. 13/708,842, Response filed Nov. 26, 2014 to Non Final Office Action mailed Jun. 27, 2014", 11 pgs.

"U.S. Appl. No. 13/708,893, Examiner Interview Summary mailed Feb. 18, 2015", 3 pgs.

"U.S. Appl. No. 13/708,893, Examiner Interview Summary mailed Aug. 14, 2014", 3 pgs.

"U.S. Appl. No. 13/708,893, Final Office Action mailed Nov. 7, 2014", 38 pgs.

"U.S. Appl. No. 13/708,893, Non Final Office Action mailed Mar. 14, 2014", 35 pgs.

"U.S. Appl. No. 13/708,893, Notice of Allowance mailed Apr. 24, 2015", 9 pgs.

"U.S. Appl. No. 13/708,893, Response filed Feb. 9, 2015 to Final Office Action mailed Nov. 7, 2014", 13 pgs.

"U.S. Appl. No. 13/708,893, Response filed Jul. 14, 2014 to Non Final Office Action mailed Mar. 14, 2014", 10 pgs.

"U.S. Appl. No. 13/723,673, Examiner Interview Summary mailed Feb. 17, 2015", 3 pgs.

"U.S. Appl. No. 13/723,673, Final Office Action mailed Nov. 6, 2014", 20 pgs.

"U.S. Appl. No. 13/723,673, Non Final Office Action mailed Apr. 25, 2014", 21 pgs.

"U.S. Appl. No. 13/723,673, Notice of Allowance mailed May 8, 2015", 11 pgs.

"U.S. Appl. No. 13/723,673, Response filed Feb. 6, 2015 to Final Office Action mailed Nov. 6, 2014", 14 pgs.

"U.S. Appl. No. 13/723,673, Response filed Jul. 25, 2014 to Non Final Office Action mailed Apr. 25, 2014", 11 pgs.

"U.S. Appl. No. 14/811,668, Final Office Action mailed Jul. 11, 2016", 22 pgs.

"U.S. Appl. No. 14/811,668, Non Final Office Action mailed Mar. 11, 2016", 15 pgs.

"U.S. Appl. No. 14/811,668, Notice of Allowability mailed Oct. 19, 2016", 2 pgs.

"U.S. Appl. No. 14/811,668, Notice of Allowance mailed Sep. 27, 2016", 14 pgs.

"U.S. Appl. No. 14/811,668, Preliminary Amendment filed Jul. 29, 2015", 4 pgs.

"U.S. Appl. No. 14/811,668, Response filed Jun. 8, 2016 to Non Final Office Action mailed Mar. 11, 2016", 10 pgs.

"U.S. Appl. No. 14/811,668, Response filed Aug. 29, 2016 to Final Office Action mailed Jul. 11, 2016", 12 pgs.

"U.S. Appl. No. 14/811,668, Supplemental Preliminary Amendment filed Nov. 11, 2015", 8 pgs.

"U.S. Appl. No. 14/835,619, Final Office Action mailed Jul. 13, 2016", 23 pgs.

(56) References Cited

OTHER PUBLICATIONS

"U.S. Appl. No. 14/835,619, Non Final Office Action mailed Mar. 14, 2016", 15 pgs.
"U.S. Appl. No. 14/835,619, Notice of Allowability mailed Dec. 6, 2016", 2 pgs.
"U.S. Appl. No. 14/835,619, Notice of Allowance mailed Sep. 30, 2016", 13 pgs.
"U.S. Appl. No. 14/835,619, Preliminary Amendment filed Nov. 10, 2015", 11 pgs.
"U.S. Appl. No. 14/835,619, Response filed Jun. 8, 2016 to Non Final Office Action mailed Mar. 14, 2016", 10 pgs.
"U.S. Appl. No. 14/835,619, Response filed Aug. 29, 2016 to Final Office Action mailed Jul. 13, 2016", 13 pgs.
"U.S. Appl. No. 14/850,879, Final Office Action mailed Jun. 30, 2016", 20 pgs.
"U.S. Appl. No. 14/850,879, Non Final Office Action mailed Mar. 25, 2016", 12 pgs.
"U.S. Appl. No. 14/850,879 Notice of Allowance mailed Oct. 6, 2016", 11 pgs.
"U.S. Appl. No. 14/850,879, Preliminary Amendment filed Nov. 11, 2015", 10 pgs.
"U.S. Appl. No. 14/850,879, Response filed Jun. 8, 2016 to Non Final Office Action mailed Mar. 25, 2016", 10 pgs.
"U.S. Appl. No. 14/850,879, Response filed Aug. 29, 2016 to Final Office Action mailed Jun. 30, 2016", 12 pgs.
"U.S. Appl. No. 14/937,601, Preliminary Amendment filed Nov. 17, 2015", 8 pgs.
"How to: Add a Drag-and-Drop Handler", Microsoft, [Online] retrieved from the internet: <https://web.archive.org/web/20120616024117/http://msdn.microsoft.com/en-us/library/ff793459.aspx, dated on Jun. 16, 2012,attached>, (Jun. 16, 2012), 2 pgs.
"iPhone 4 iOS4 User Guide", Apple, [Online]. Retrieved from the Internet: <URL: https://manuals.info.apple.com/MANUALS/1000/MA1539/en_US/iPhone_iOS4_User_Guide.pdf>, (2012), 274 pgs.
Everitt, Katherine M., et al., "Two Worlds Apart: Bridging the Gap Between Physical and Virtual Media for Distributed Design Collaboration", CHI 2003, (Apr. 5-10, 2003), 8 pgs.
Hartmann, Bjorn, et al., "Augmenting Interactive Tables with Mice & Keyboards", UIST '09, (Oct. 4-7, 2008), 4 pgs.
Hartmann, Bjorn, et al., "Pictionaire: Supporting Collaborative Design Work by Integrating Physical and Digital Artifacts", CSCW 2010, (Feb. 6-10, 2010), 4 pgs.
Hinckley, Ken, et al., "Stitching: Pen Gestures that Span Multiple Displays", Submitted to CHI 2004, (Oct. 6, 2003), 8 pgs.
Ramos, Gonzalo, et al., "Synchronous Gestures in Multi-Display Environments", [Online]. Retrieved from the Internet: <URL: http://kenhinckley.wordpress.com/2009/04/21/paper-synchronous-gestures-in-multi-display-environments/, (Apr. 21, 2009), 105 pgs.
Yeh, Ron Bing, "Designing Interactions that Combine Pen, Paper and Computer", Doctoral dissertation submitted to the Department of Computer Science and the Committee on Graduate Studies at Stanford Unviersity, (Dec. 2007), 261 pgs.
"U.S. Appl. No. 15/395,990, Notice of Allowance mailed Feb. 16, 2017", 14 pgs.

* cited by examiner

Fig. 2: Multi-Device Pairing Steps

Fig. 3: Client Architecture

Fig. 4: Pairing Server Architecture

Fig. 6: Characterization Engine Architecture

Fig. 7: Comparison Engine Architecture

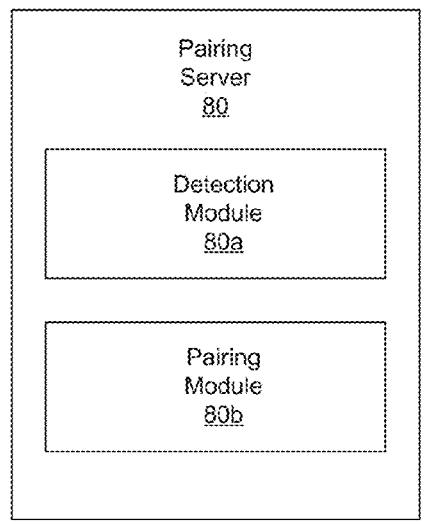
Fig. 8
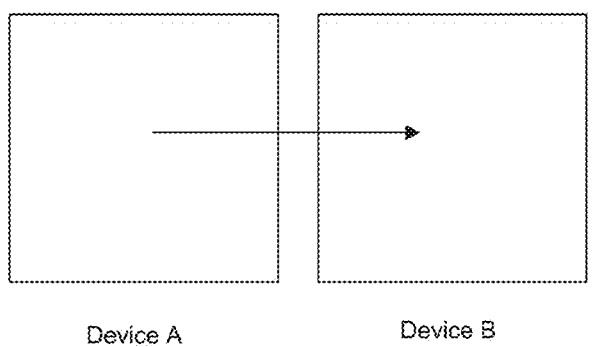
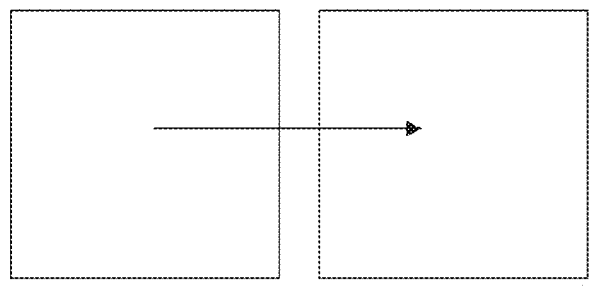
Fig. 9

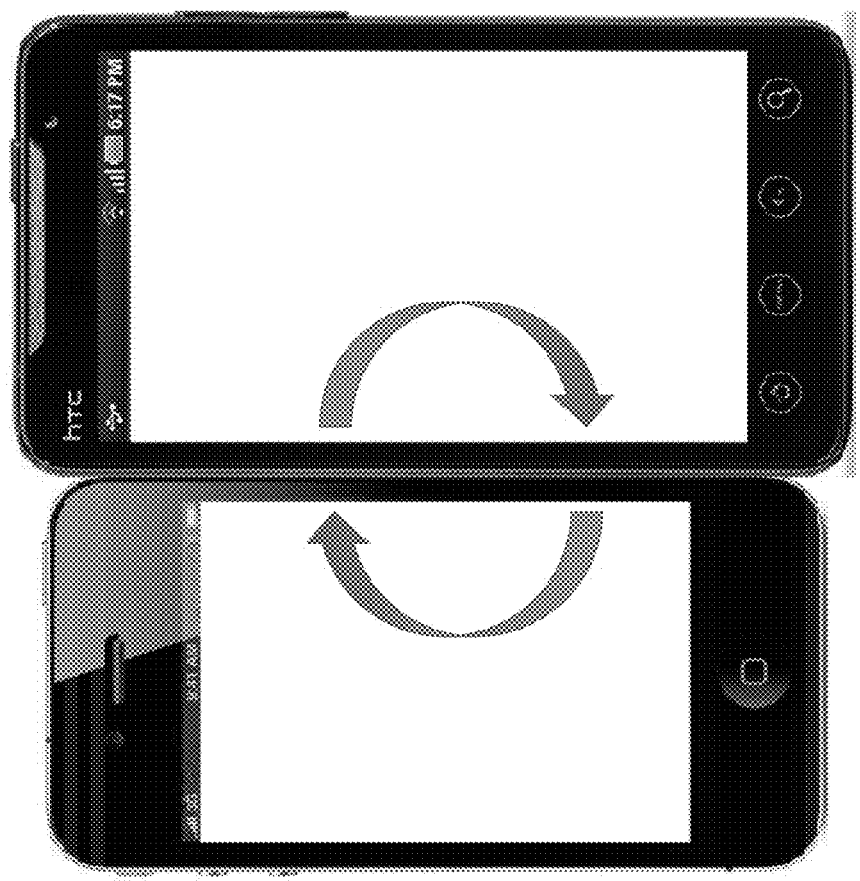
Fig. 10A: Simple Circle Pairing

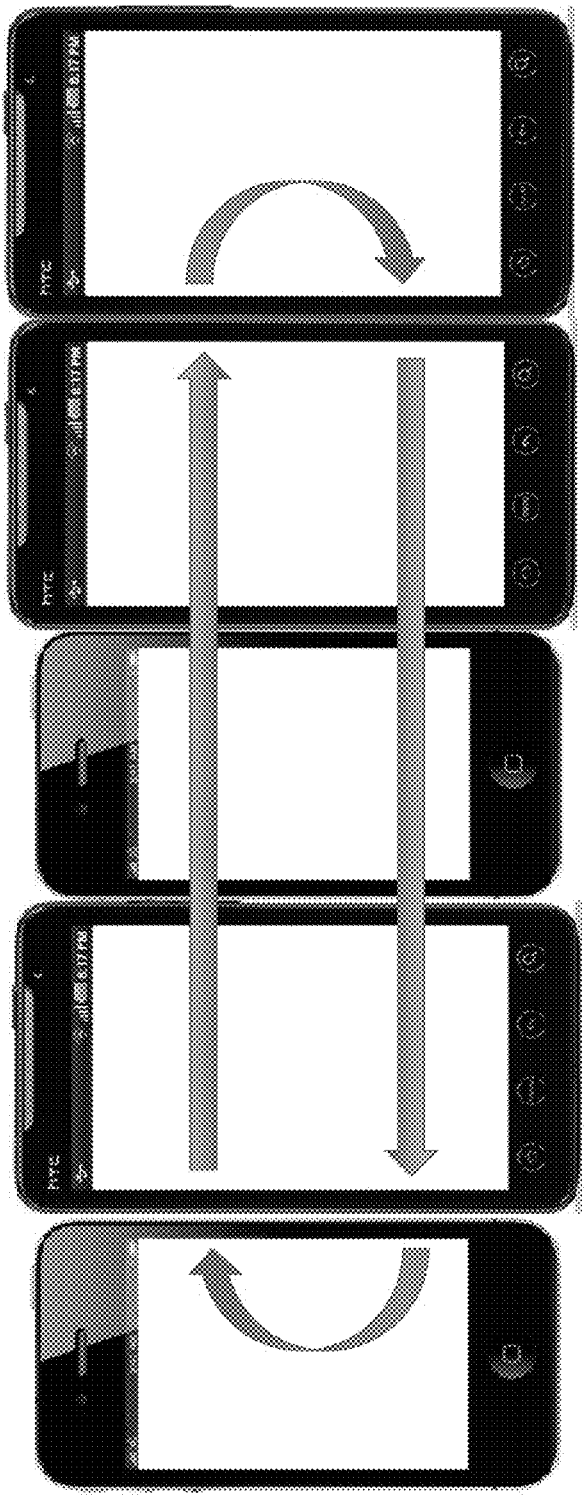
Fig. 10B: Simple Grouping Example
A single arrow represents one finger's unified movement on multiple device touchscreens

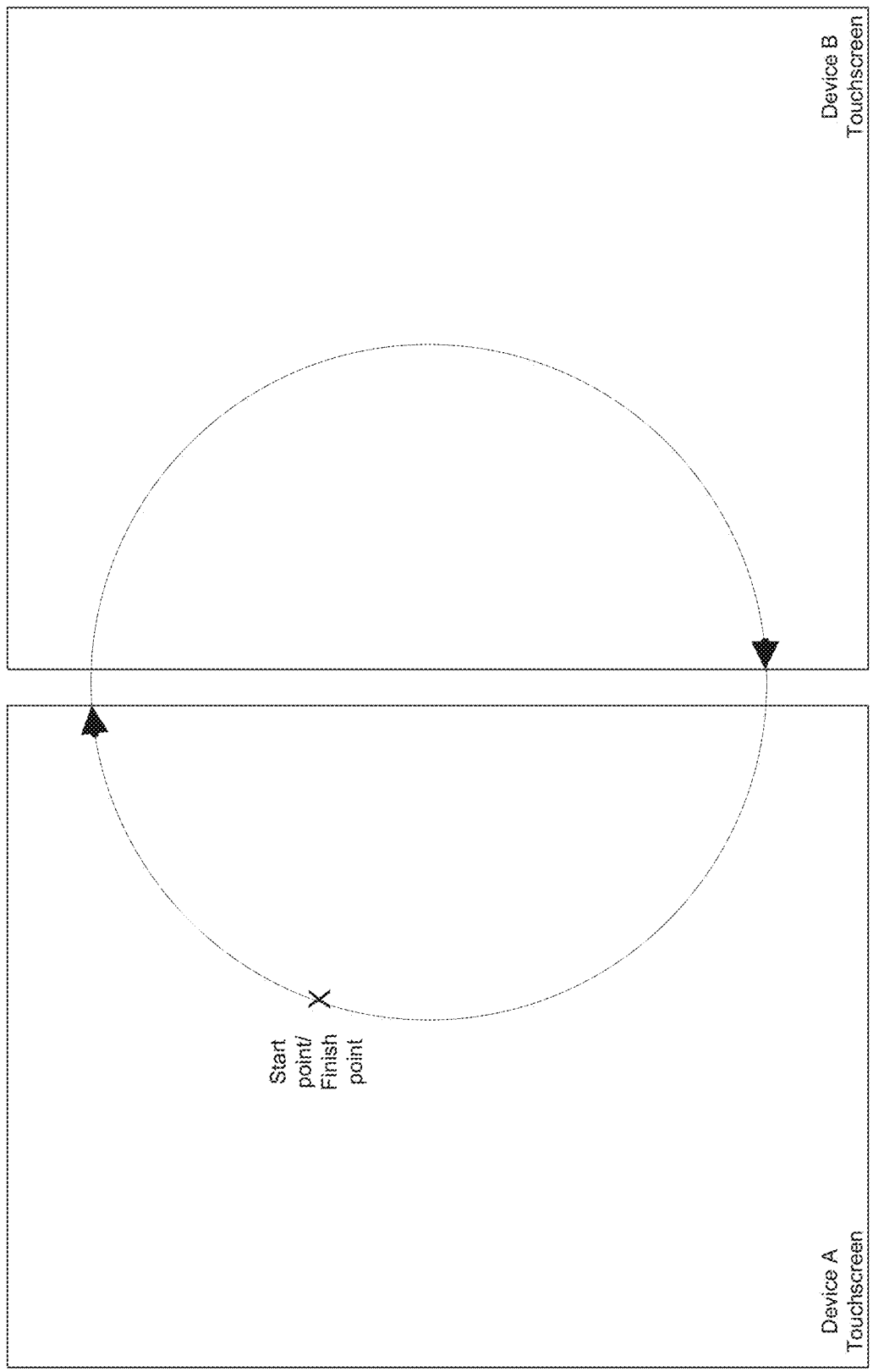

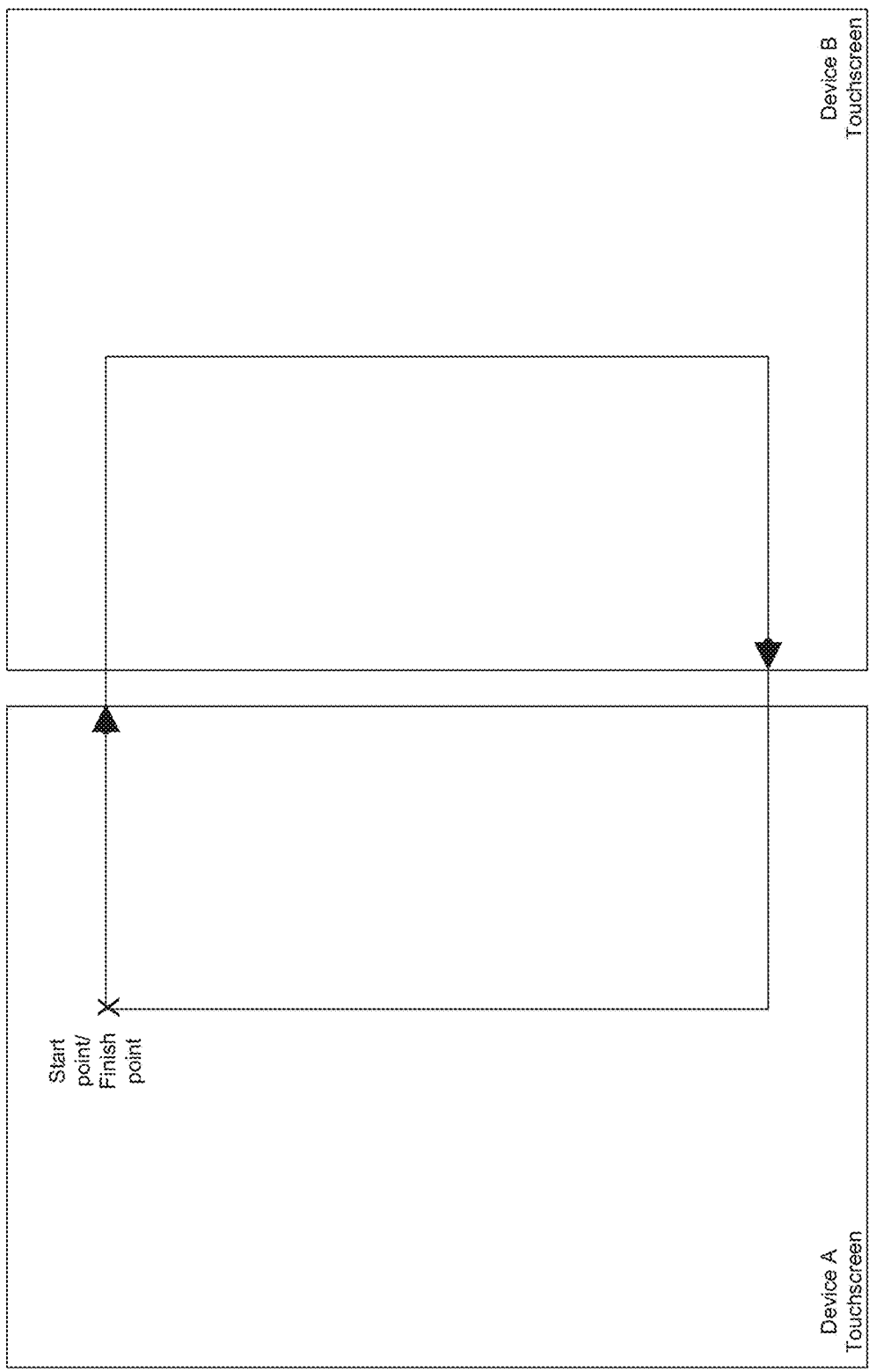

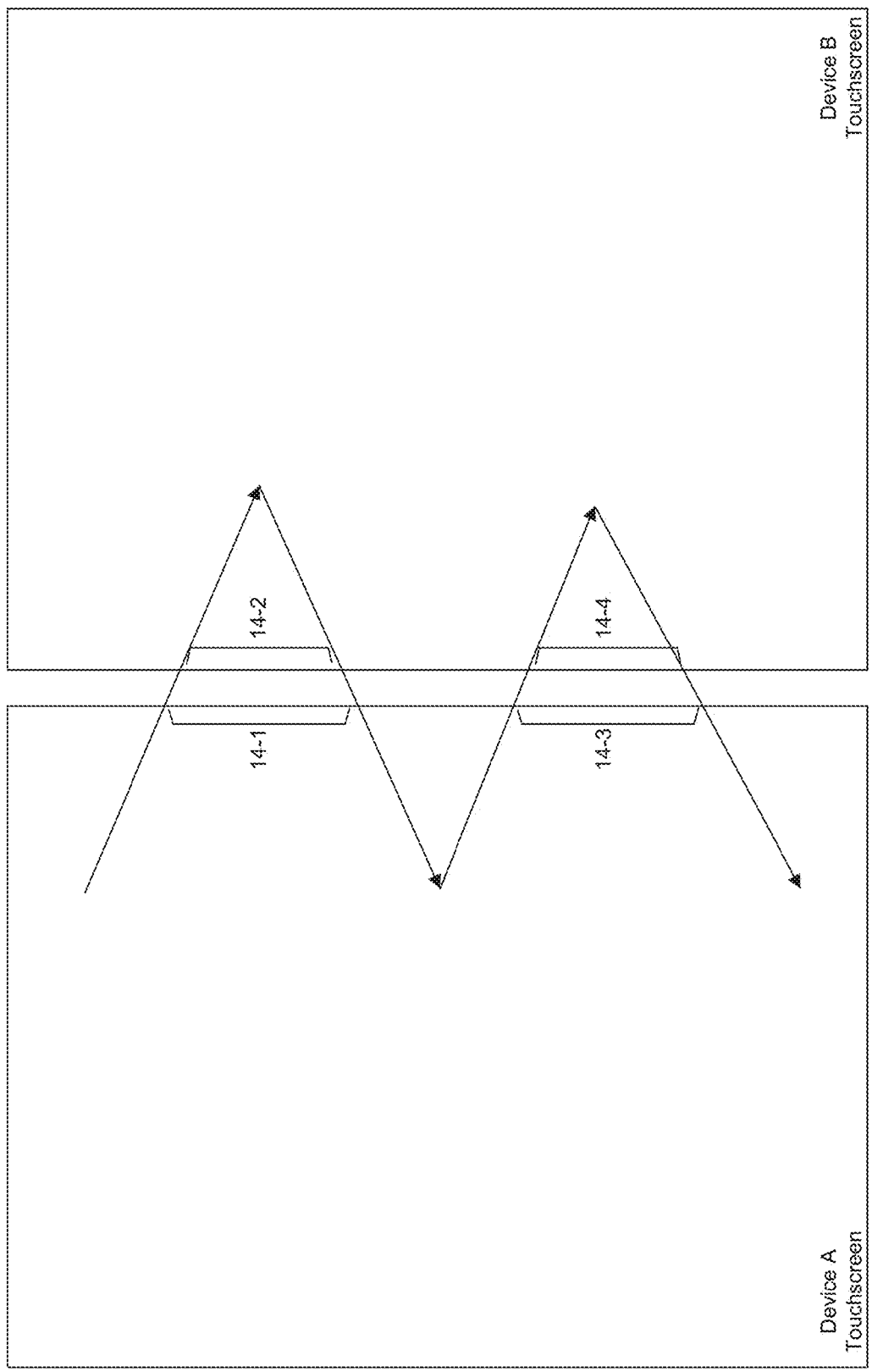

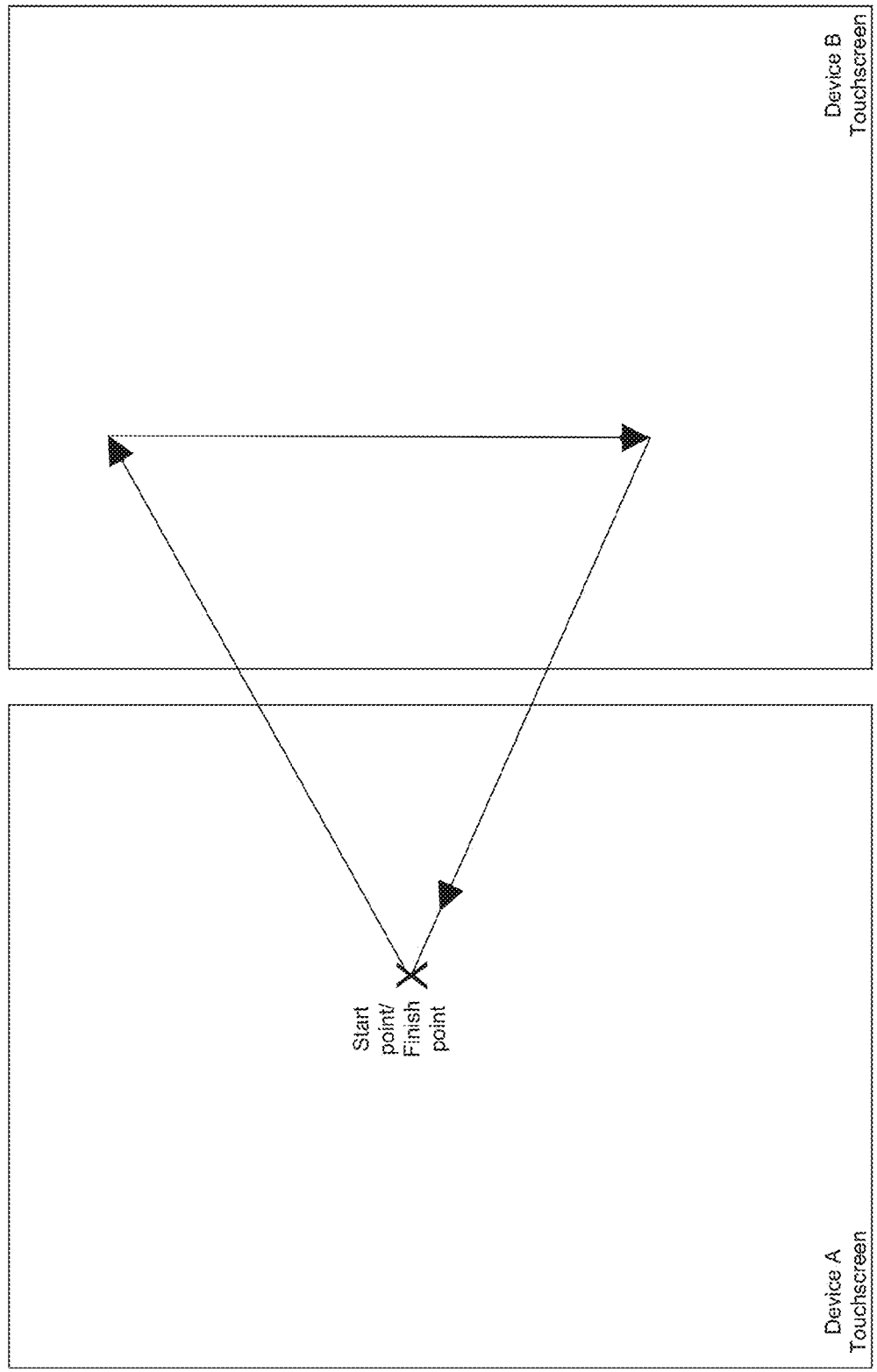

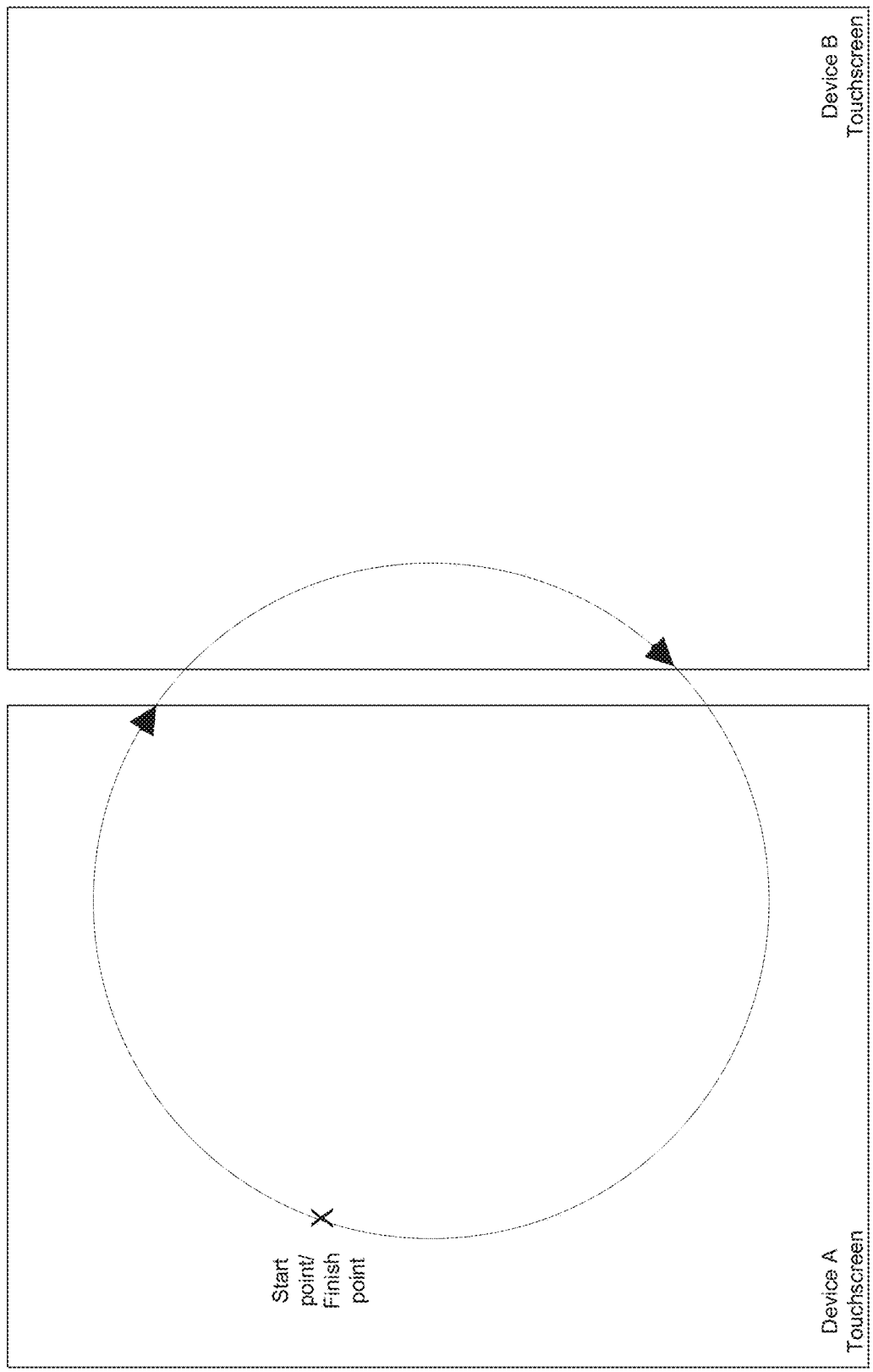

Connect to a Point of Sales System

Make Payment

FIG. 19: Additional Use Case – Device Payment

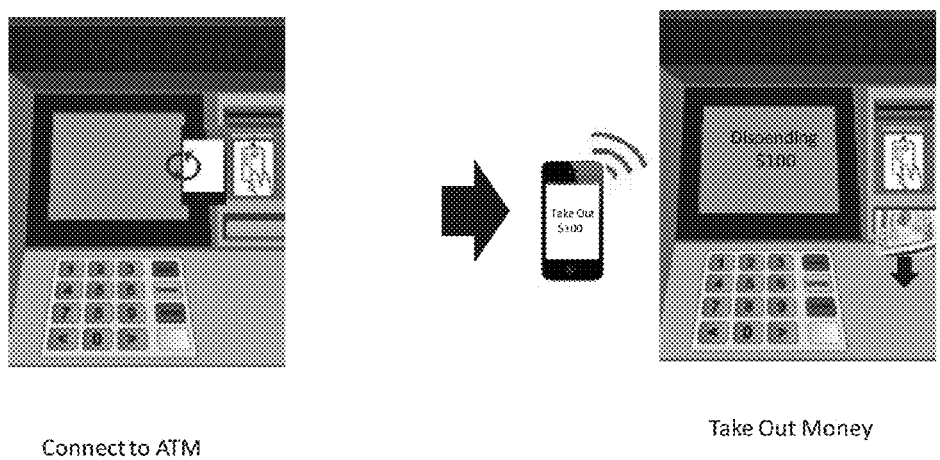
Connect to ATM  Take Out Money
Fig. 32: Additional Use Case – Cash withdrawal Additional Use Case– In-Car Syncing
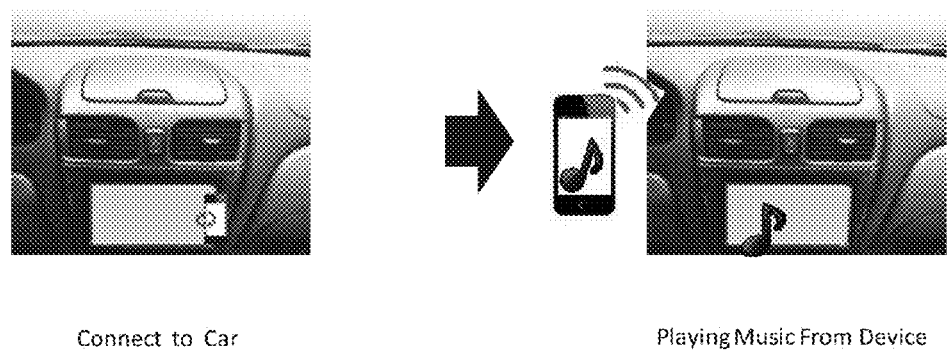
Connect to Car → Playing Music From Device
Fig. 33A: Additional Use Case – In-Car Syncing
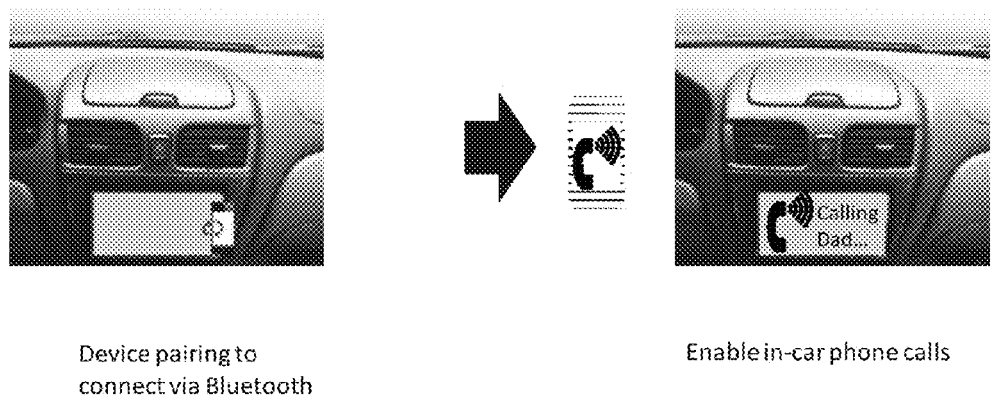
Device pairing to connect via Bluetooth → Enable in-car phone calls
Fig. 33B

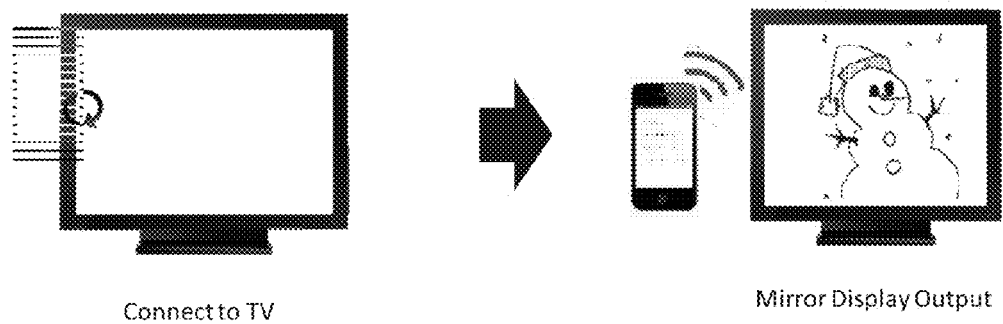
Fig. 34: Additional Use Case – TV Syncing

Fig. 37
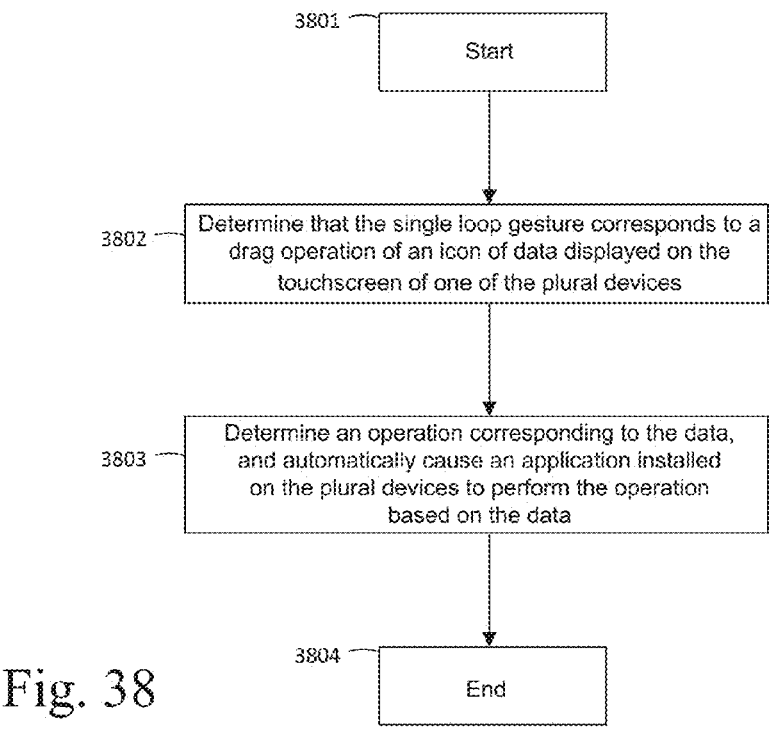
Fig. 38

Two finger circle gesture - (generic/user specified) second action

A double arrow represents two fingers' unified movement on two device touchscreens
FIG. 9: Simple Double Finger Gesture Multi-finger slide gesture – pairing/discovery The green circles represent fingertips placed on the touchscreen
The red circles represent the green fingertips end point on the touchscreen Fig. 43: Gesture Example - Multi-Finger Turn 44-1
44-2

Fig. 46: Adhoc pairing

Fig. 47: Bluetooth pairing

Fig. 48: Wifi pairing

MOBILE DEVICE PAIRING

RELATED APPLICATIONS

This application is a continuation of U.S. application Ser. No. 14/835,619, filed Aug. 25, 2015, now U.S. Pat. No. 9,569,163, issued Feb. 14, 2017, which is a continuation of U.S. application Ser. No. 13/708,893, filed Dec. 7, 2012, now U.S. Pat. No. 9,131,333, issued Sep. 8, 2015, which is a continuation-in-part of U.S. application Ser. No. 13/453,952, filed Apr. 23, 2012, now U.S. Pat. No. 0,098,133, issued Aug. 4, 2015, which claims the benefit of priority to U.S. Provisional Application No. 61/582,146, filed Dec. 30, 2011, which are incorporated by reference in their entirety.

TECHNICAL FIELD

This patent document pertains generally to tools (systems, apparatuses, methodologies, computer program products, etc.) for allowing plural electronic devices to share information with each other, and more particularly, but not by way of limitation, to an approach for pairing electronic devices and facilitating communication between paired electronic devices.

BACKGROUND

In the current information age, mobile information technology (IT) tools are extensively used in order to provide processing and storage of various documents and data. In particular, mobile devices such as smartphones, mobile/cellular phones or handsets, personal digital assistants (PDAs), tablet computing devices, personal, notebook or workstation computers, multi-function devices (MFDs), and so forth, allow users to perform numerous processing functions from almost any location.

There have been various attempts to connect and pair mobile devices in order to share information between the devices. One example is the Bump application, which detects device location and accelerometer action to allow two smartphone users to bump their phones together to share information between the phones. In the Bump application, Global Positioning System (GPS) components detect the proximity of the two devices to one another, and accelerometers within the devices detect the movement or 'bump' action of the devices touching one another, in order to thereby initiate the communication link between the bumped devices. As another example, there is the use of Near Field Communications (NFC) technology, which is a set of standards for establishing radio communication between smartphones by touching them together or bringing them into close proximity, usually no more than a few centimeters. Another example is the use of Bluetooth technology, which is a proprietary open wireless technology standard for exchanging data over short distances (using short wavelength radio transmissions) from fixed and mobile devices, thereby creating personal area networks.

However, both the NFC and the Bluetooth approaches require the installation of specialized hardware on the mobile devices to establish the communication links between the devices, and such specialized hardware is not universally available or accessible on all mobile devices. On the other hand, while the Bump application utilizes standard hardware such as accelerometers that are available on most mobile devices, the bump technique used with the Bump application requires specialized software to be installed on a mobile device. Further, the Bump application is not very accurate at detecting the bumping action between two mobile devices, especially in densely populated areas where a large number of mobile device users are in close proximity to each other.

BRIEF DESCRIPTION OF DRAWINGS

Some embodiments are illustrated by way of example and not limitation in the figures of the accompanying drawings in which:

FIG. 8 is a block diagram illustrating a pairing server for pairing and syncing mobile electronic devices, according to an exemplary embodiment;

FIG. 9 illustrates a scenario where a single line gesture is performed across the touchscreens of a device A and B, while another single line gesture is performed across the touchscreens of devices C and D FIG. 10A illustrates an example of a one finger single loop gesture performed on the FIG. 10A illustrates an example of a one finger single loop gesture performed on the touch screens of two mobile devices, according to an exemplary embodiment; touch screens of two mobile devices, according to an exemplary embodiment;

FIG. 10B illustrates an example of a one finger single loop gesture performed on the touch screens of several mobile devices, according to an exemplary embodiment;

FIG. 11A illustrates an example of a single loop gesture performed on the touch screens of two mobile devices, the gesture corresponding to an circle shape, according to an exemplary embodiment;

FIG. 12A illustrates an example of a single loop gesture performed on the touch screens of two mobile devices, the gesture corresponding to a square shape, according to an exemplary embodiment;

FIG. 14B illustrates an example of a single, continuous gesture performed on the touchscreen of multiple devices;

FIG. 15A illustrates an example of a single loop gesture performed on the touch screens of two mobile devices, the gesture corresponding to a triangle shape, according to an exemplary embodiment;

FIG. 16A illustrates an example of a single loop gesture performed on the touch screens of two mobile devices, the gesture corresponding to a circle, according to an exemplary embodiment;

FIG. 32 illustrates an example of the multi-pairing system of this disclosure being used to connect/sync a mobile device with an ATM system, according to an exemplary embodiment;

FIG. 33A illustrates an example of the multi-pairing system of this disclosure being used to connect/sync a mobile device with a car's electronic audio/entertainment, according to various exemplary embodiments;

FIG. 33B illustrates an example of the multi-pairing system of this disclosure being used to connect/sync a mobile device with a car's electronic audio/entertainment, according to various exemplary embodiments;

FIG. 34 illustrates an example of the multi-pairing system of this disclosure being used to connect/sync a mobile device with a television, according to an exemplary embodiment;

FIG. 37 illustrates aspects of a user interface of a mobile device, according to an exemplary embodiment;

FIG. 38 illustrates an example of a method performed by the device pairing server 80 illustrated in FIG. 8, according to an exemplary embodiment;

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Figure 1:
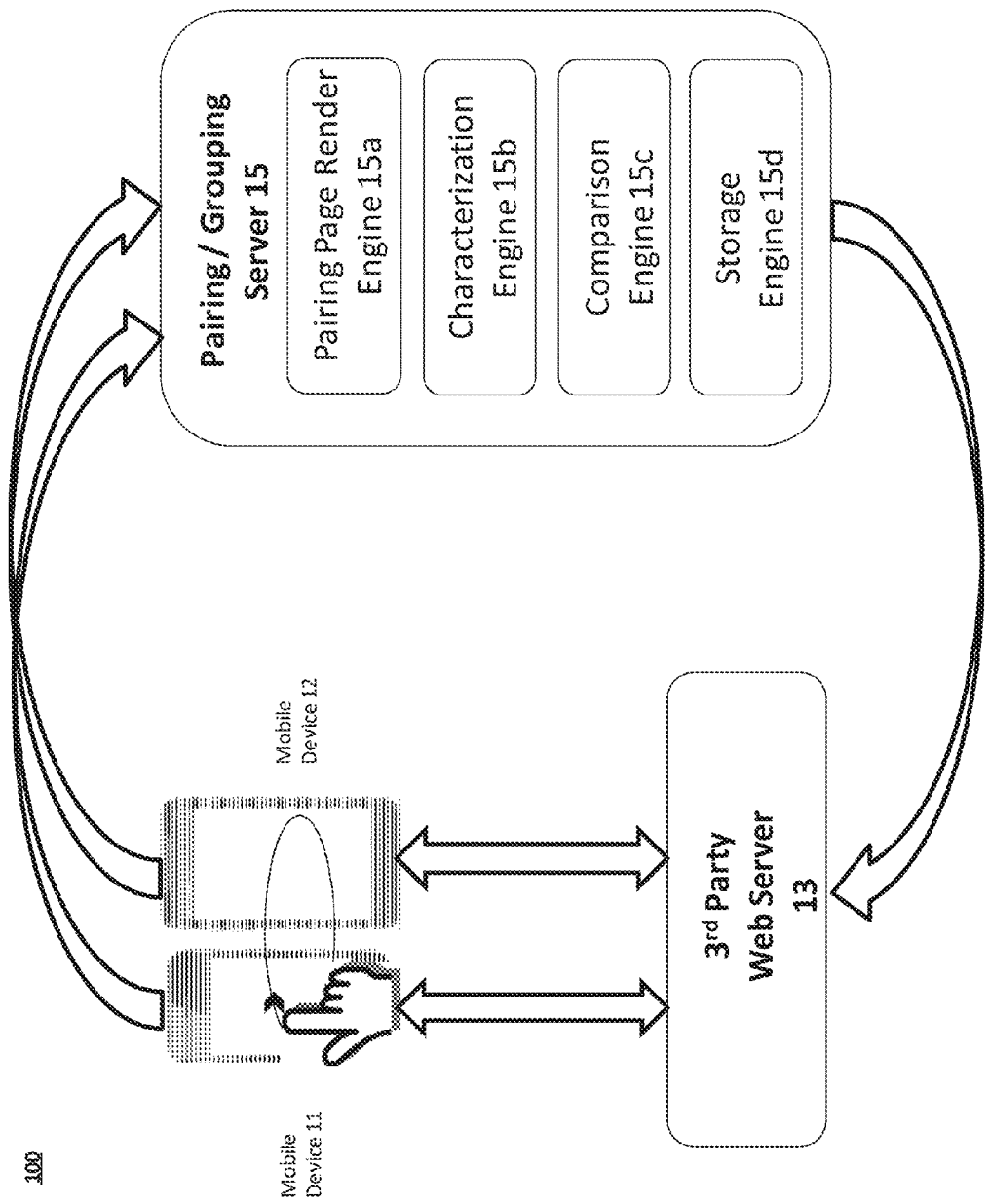
FIG. 1 is a block diagram illustrating a system for pairing and syncing mobile electronic devices, according to an exemplary embodiment.

Turning now to FIG. 1, there is illustrated an environment 100 for pairing and syncing electronic devices according to an exemplary embodiment. The mobile device pairing environment 100 illustrated in FIG. 1 includes a first mobile device 11, a second mobile device 12, a $3^{rd}$ party server 13 and a pairing/grouping server 15. As described in this disclosure, the term 'mobile devices' refers to smartphones, mobile/cellular phones or handsets, personal digital assistants (PDAs), tablet computing devices, personal, notebook or workstation computers, multi-function devices (MFDs), kiosks, timepieces, and any other mobile electronic devices that typically include a touchscreen display (also referred to herein as a "touch-sensitive surface"), as understood by those skilled in the art. Thus, mobile device 11 and 12 may correspond to one or more of the aforementioned devices. According to this exemplary embodiment, the mobile devices 11 and 12 are Internet connected devices with touchscreens. The mobile devices 11 and 12 may also be configured with GPS or geolocation systems and may include HTML5 compatibility, as is the case with most mobile devices (e.g. smartphones) currently in use.

In order to pair touchscreen-enabled devices (such as mobile devices 11 and 12) according to this exemplary embodiment, a basic overview of the workflow is as follows. First, each user of the mobile devices 11 and 12 opens a customized webpage on a browser software application installed on each device, such that the customized webpage may be displayed on the touchscreens of the mobile devices. Thereafter, the mobile devices 11 and 12 are placed side by side (i.e. adjacent to each other, and in contact with each other, or in very close physical proximity to each other). Finally, a user performs a single, uniform, and continuous gesture/motion across the touchscreens of the multiple mobile devices that are displaying the customized web page. The single continuous gesture may be, for example a single loop gesture, zigzag gesture, staircase gesture, or any other gesture with at least one entry point and exit point on the touchscreen of each device. For example, with a finger, pen, or stylus, the user touches the touchscreen of one of the mobile devices 11, and begins to draw a single loop gesture (e.g. a circle, ellipse, rectangle, square triangle) starting on the touchscreen of the first mobile device 11, extending across the touchscreen of the second mobile device 12, and returning back to the touchscreen of the first mobile device 11, to thereby complete the single loop gesture motion (e.g. a circle), as seen in FIG. 1.

While the description above refers to each device opening a customized webpage on a browser software application installed on each device in order to receive the touch gesture information, the aspects of this disclosure are not limited to such webpages, so long as each mobile device can detect or receive the touch gesture coordinates and transmit the same over a network. For example, the device's touchscreen could receive the touch gesture co-ordinate information via an embedded application or native application of the device, where such device transmits the touch gesture co-ordinate information via the network.

The pairing/grouping server 15 detects the single gesture motion performed by the user that extends across the touchscreens of both mobile devices 11 and 12 that are displaying the customized web page, and determines that this is a request by the user to pair/group the two devices. The pairing/grouping server 15 proceeds to pair/group the two mobile devices to thereby allow the user(s) of both devices to share information or perform some action between the two devices, such as syncing data and sharing contact information, photos, video, music, documents, files, payment information, geographic location or map information, etc., or enabling the users of the two mobile devices to commence playing a game together on the two mobile devices.

According to the system of this disclosure, pairing/grouping by the pairing/grouping server 15 is performed almost instantaneously (i.e. within a fraction of a second) and visually displayed to the user. It is a very fast and intuitive way to connect devices that may be both satisfying and visually appealing to the user. Different pre-defined gestures (described in more detail below) that can be performed across multiple devices can each be bound with respective specific actions as a quick and versatile way to exchange information.

As seen in FIG. 1, the major components in the environment 100 are the mobile devices 11 and 12, the pairing server 15 and the $3^{rd}$ party server 13. A basic overview of the workflow performed in the environment 100 is as follows.

3$^{rd}$ party server 13 may be a web server designed to communicate with the mobile devices 11 and 12 via a network, such as the Internet, and configured to generate a custom web page for the devices 11 and 12, and host the web page accessible via a browser application operating on the mobile devices 11 and 12. Alternatively, 3$^{rd}$ party server 13 may generate the code (e.g. HTML and Javascript) for the customized webpage, and transmit the same to the pairing server 15. The pairing page render engine 15a of the pairing server 15 can then communicate with the mobile devices 11 and 12 in order to render the customized webpage in the browser application operating on the mobile devices 11 and 12.

While the descriptions above, and elsewhere throughout this disclosure refer to the generation of code for the customized webpage in the form of HTML code or Javascript code, it will be understood by those skilled in the art that the customized webpage may be generated based on any applicable code, web communication protocol, format, markup language, etc. For example, the code of the customized webpage could be generated using web sockets, wherein a persistent connection is established between two devices communicating with each other.

The custom web page is configured to permit the mobile devices 11 and 12 to pass custom information (such as user/device identification information) and gesture information to the pairing server 15. That is, the users of devices 11 and 12 access and display the custom web page and perform the single motion gesture across the touchscreen of both mobile devices 11 and 12, and then the devices 11 and 12 return custom information (such as user/device identification information) along with gesture information (describing a gesture performed by the user on the touchscreen of each device 11 and 12) via the custom webpage through the network to the pairing server 15. The pairing server 15 then determines that the devices 11 and 12 are to be paired, proceeds to pair the devices by establishing a communication link between the devices, and confirms that pairing. The pairing server 15 then communicates confirmation of the pairing to the 3$^{rd}$ party server 13 once the pairing is confirmed. After the 3$^{rd}$ party server 13 receives the confirmation of the pairing, the 3$^{rd}$ party server 13 can directly transfer/sync files and perform other actions across the paired mobile devices 11 and 12.

The pairing-grouping server 15 includes a pairing page render engine 15a, characterization engine 15b, comparison engine 15c, and storage engine 15d. The operation of the pairing server 15 and of each of the components thereof is described in more detail with reference to FIG. 2.

Figure 2:
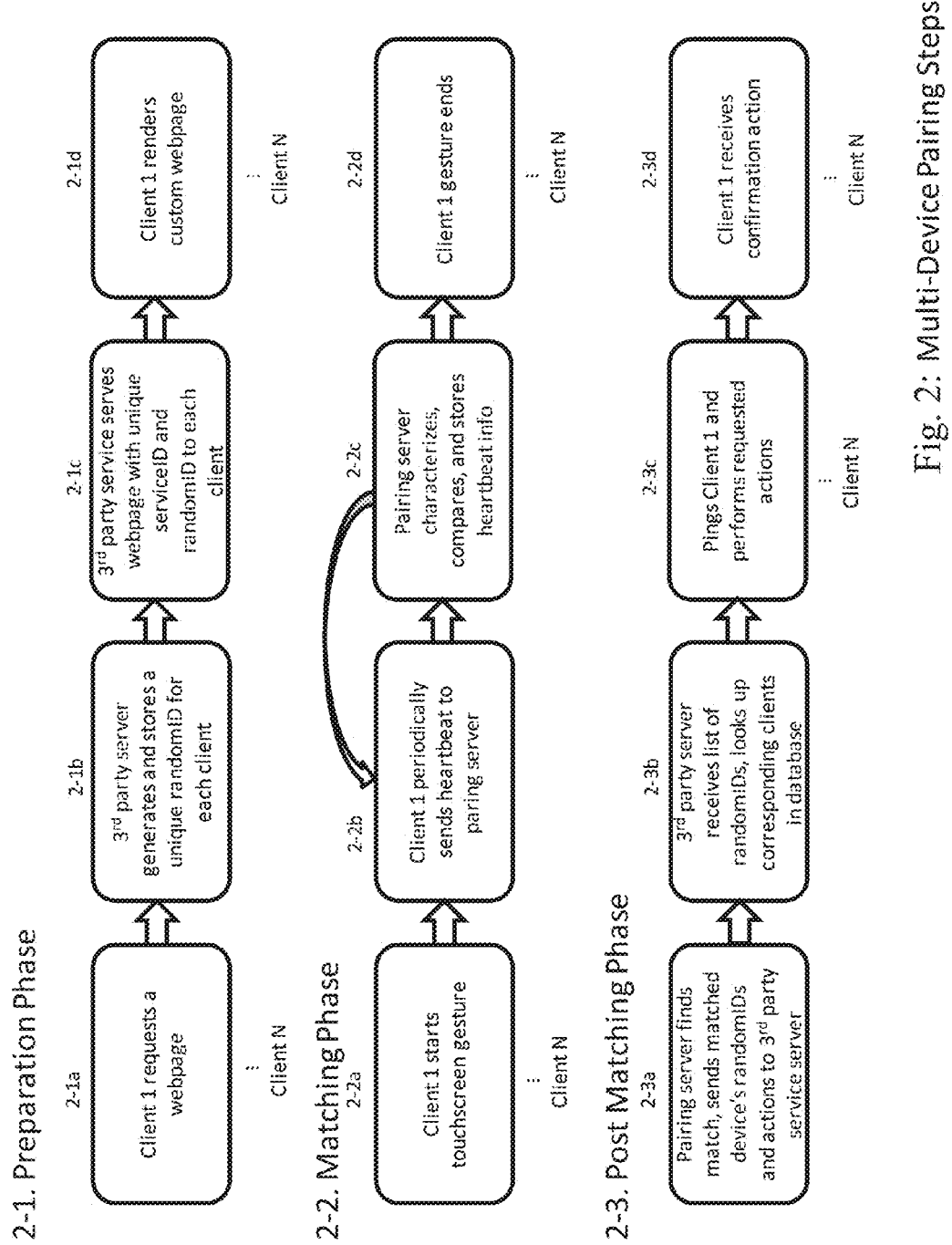
FIG. 2 illustrates three phases of operations performed in the mobile device pairing system illustrated in FIG. 1, according to an exemplary embodiment.

In FIG. 2, three phases of the operations occurring in the mobile device pairing environment 100 are described: 2-1 the preparation phase; 2-2 the matching phase; and 2-3 the post matching phase.

In the preparation phase 2-1, the client 1 (e.g. mobile device 11) transmits a request to the 3$^{rd}$ party server 13 for the customized webpage (2-1a). This is repeated for client 2 (e.g. mobile device 12) and for each client up to client N. Then the 3$^{rd}$ party server 13 generates and stores a unique randomID for each client (2-1b). The randomID could either be generated based on a purely random string, or could be a foreign key to some other account identifying mechanism (e.g. derived from a 3$^{rd}$ party service or a profile page corresponding to the user of the client device, such as a hashed version of that person's ID created using hash mechanism). The 3$^{rd}$ party server generates for each client a customized webpage, unique serviceID and randomID, and stores this information in a third party server database 14 (see FIG. 5), and transmits the customized webpage incorporating the serviceID and randomID to each client (2-1c). Finally, when each client (client 1 through client N) receives the customized webpage, that client renders the respective custom webpage (2-1d), typically in a browser application installed on the respective client. Thus, the customized webpage may be displayed on a touchscreen of the mobile device to the user of that client/device.

Alternatively, in the preparation phase 2-1, the pairing server 15 may have greater involvement. For example, the client 1 (e.g. mobile device 11) transmits a request to the 3$^{rd}$ party) server 13 for the customized webpage (2-1a). This is repeated for client 2 (e.g. mobile device 12) and for each client up to client N. Then the 3$^{rd}$ party server 13 generates and stores a unique randomID for client (2-1b). The 3$^{rd}$ party server generates for each client a customized webpage (including HTML code and Javascript code, for example) that displays/incorporates a unique serviceID and randomID unique to the client, stores this information in a third party server database 14 (see FIG. 5), and transmits the customized webpage incorporating the serviceID and randomID to the pairing server 15. The pairing page render engine 15a of the pairing server 15 can then communicate with the mobile devices 11 and 12 in order to render the customized webpage in the browser application operating on the mobile devices 11 and 12. (2-1c). Finally, when each client (client 1 through client N) receives the customized webpage, that client renders the respective custom webpage (2-1d), typically in a browser application installed on the respective client. Thus, the customized webpage may be displayed on a touchscreen of the mobile device to the user of that client/device.

In the matching phase 2-2, the user of client 1 (e.g. mobile device 11) starts touchscreen gesture/motion on the touchscreen of that device (2-2a). Thereafter, client 1 periodically sends a data signal transmission (referred to herein as 'heartbeat' information) via the customized webpage to the pairing server 15 (2-2b). More particularly, this information is received by the pairing page render engine 15a or characterization engine 15b of the pairing server 15. The heartbeat indicates a large amount of information regarding the user inputs detected and received by the touchscreen of that device—that is, the heartbeat periodically describes information regarding the touchscreen gesture motion being performed on the touchscreen of the device. The heartbeat may describe information such as the gesture X,Y coordinates, velocity, acceleration, curvature, entry/exit points, time difference and any induced vibrations.

After the pairing server 15 receives the heartbeat information from the client device 1, the characterization engine 15b of the pairing server 15 analyzes and characterizes the heartbeat information received from that device in order to determine the exact nature, type and characteristics of the fingerprint gesture being performed by the user on that device's touchscreen (2-2c). The storage engine 15d of the pairing server 15 also stores all the heartbeat information received from that device. (Moreover, at this step, the comparison engine 15c of the pairing server 15 also compares the received heartbeat information with any heartbeat information received from other devices, in order to determine if the gestures received from different mobile devices match). The process of 2-2b (client transmitting heartbeat information regarding touchscreen gesture to pairing server while gesture is being performed) and 2-2c (pairing server analyzes, characterizes, compares and stores heartbeat information) are repeated so long as the user is performing the touchscreen gesture on the touchscreen of the client device 1. Finally, the touchscreen gesture motion being performed by the user of the client device 1 ends (2-2d). The end or completion of the gesture may be detected when the touchscreen gesture co-ordinate information indicates that the gesture has reached the limit of the touch screen, or no touchscreen gesture co-ordinate information is received after a predetermined time (indicating the finger has been removed from the touchscreen).

Thereafter, the matching phases 2-2a through 2-2d are performed again for each of the devices (client 1 through client N) from which heartbeat information is being received, when the user's finger/pen reaches the touchscreen of that respective device while the user is performing the single, continuous, uniform touchscreen gesture on the touchscreens of the multiple devices. When steps 2-2b and 2-2c are performed for the heartbeat information received from each device, the comparison engine 15c of the pairing server 15 compares the received heartbeat information with any heartbeat information received from other devices, in order to determine the exact nature, type and characteristics of the fingerprint gesture being performed on each device, and in order to determine whether the gestures received from certain mobile devices 'match'—i.e. corresponding to a single, continuous, uniform gesture being performed. Instead, or in addition, this is performed in the post-matching phase 2-3.

In the post-matching phase 2-3, the comparison engine 15c of the pairing server finds a match, and sends the matched device's randomIDs and actions to $3^{rd}$ party service server 13 (2-3a). Thereafter, the $3^{rd}$ party server 13 receives the list of randomIDs, and looks up corresponding clients in the third party server database 14 (see FIG. 5) (2-3b). The third party server 13 then pings each client 1 through N that is to be paired, and performs actions request by the user of the paired devices, such as sharing information (2-3c). Finally, each paired client 1 through N that is paired receives confirmation of the performance of the requested action (2-3d).

Thus, as the user begins the touchscreen gesture on one device (e.g. mobile device 11), the device immediately starts to send a barrage of touchscreen coordinates to the pairing server 15. The server 15 takes this information and computes the continuously changing gesture fingerprint based on the gesture coordinates, velocity, acceleration, curvature, entry/exit points, time difference and any induced vibrations. As the gesture leaves one device and enters another (e.g. mobile device 12), it takes only very few datapoints before the server can match the gesture fingerprint and perform the pairing. Furthermore, the server can continually monitor the gesture fingerprint motions, and group multiple devices in a single gesture.

That is, based on the aforementioned criteria (e.g. trajectory/curvature, velocity, entry/exit points, and relative position on screen), the pairing server determines whether particular devices should be paired. For example, the comparison engine 15c may determine from the received data points or heartbeat information from a first mobile device that the touchscreen of the first device is receiving user input of a curved line of a certain trajectory/curvature, being drawn by the user at a certain velocity, and having a certain exit point at the right side of the touchscreen of the first mobile device. Similarly, the comparison engine 15c may determine from the received data points or heartbeat information from a second mobile device that the touchscreen of the second device is receiving user input of a curved line of matching/continuing along the same trajectory/curvature of the line on the first device, and being drawn by the user at the same velocity as that on the first device, and having a certain entry point on the left side of the touchscreen of the second mobile device matching the exit point on the right side of the touchscreen of the first mobile device. The comparison engine may utilize the screen size information received from each device (e.g. via HTML) in order to assist in determining a match between these entry and exit points, since the devices placed side by side may have different screen sizes or may not be placed exactly side by side in a proper upright rotation.

Figure 3:
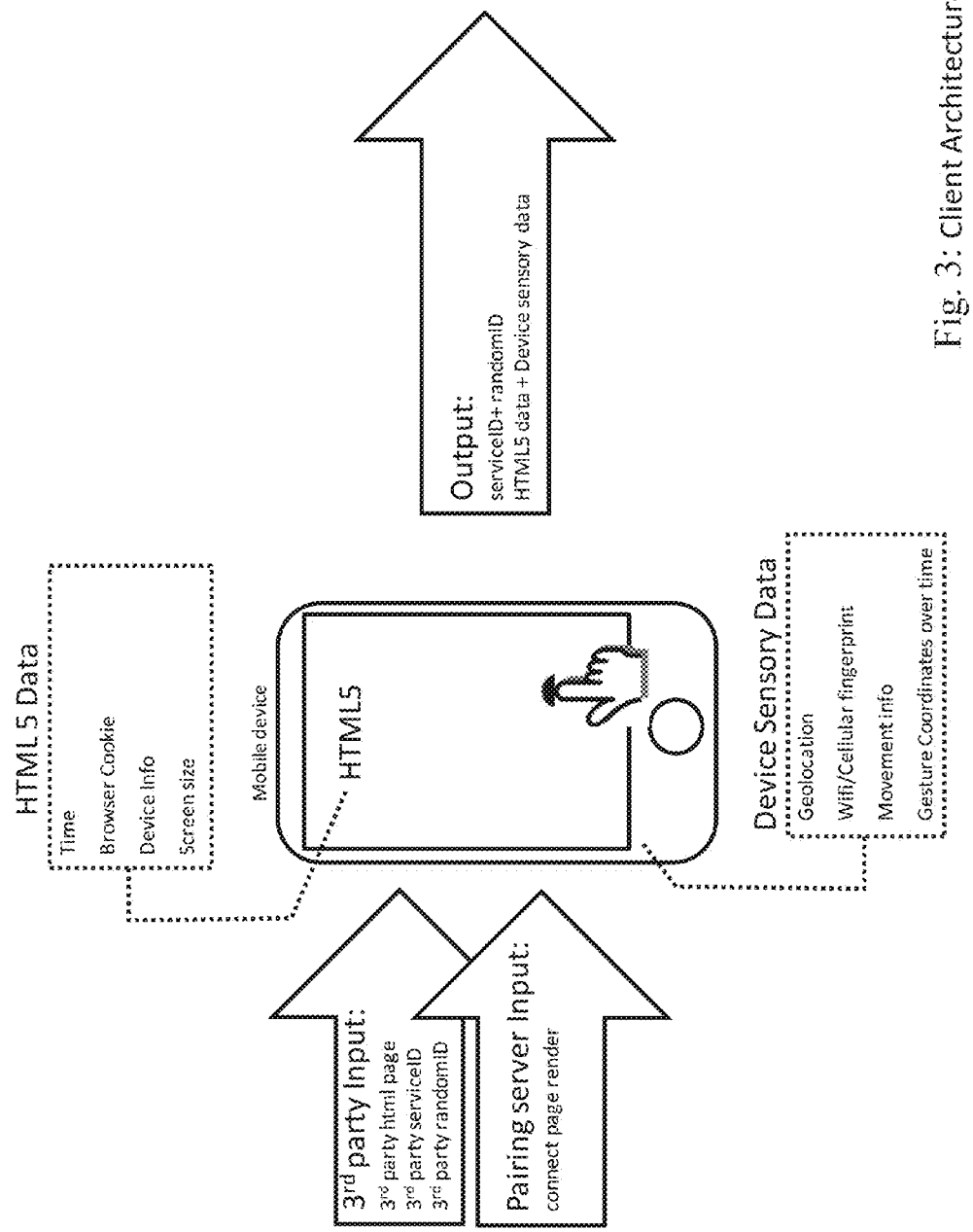
FIG. 3 illustrates a schematic of the architecture of a client device (e.g. mobile devices 11 and 12) of the mobile device pairing system illustrated in FIG. 1, according to an exemplary embodiment.

FIG. 3 illustrates a schematic of the architecture of the client (e.g. mobile devices 11 and 12) of the mobile device pairing environment 100 illustrated in FIG. 1. The client device receives information from the $3^{rd}$ party server 13 that includes the html page corresponding to the customized web page, as well as the unique serviceID and randomID (unique to each client). Alternatively, as seen in FIG. 3, $3^{rd}$ party server 13 may generate the code (e.g. HTML, Javascript, websockets, etc.) for the customized webpage, and transmit the same to the pairing server 15. The pairing page render engine 15a of the pairing server 15 can then communicate a connect page render signal to the mobile devices 11 and 12 in order to render the customized webpage in the browser application operating on the mobile devices 11 and 12 and/or receive the touchscreen gesture and heartbeat information via the customized web page.

As seen in FIG. 3, the client is configured to generate device sensory data, such as geolocation information, wifi/cellular fingerprints, movement information, and gesture coordinates over time. The client may also include HTML5 compatibility, and is configured to generate and maintain various types of HTML5 data regarding the client, such as time, device information, device model and make, local storage capability, screen size and browser cookies.

The client in FIG. 3 is also configured to output various information to the pairing server 15, such as the client's unique serviceID and randomID, as well as HTML5 data and the actual device sensory data that will be analyzed by the pairing server 15 to determine the appropriate device pairing.

Figure 4:
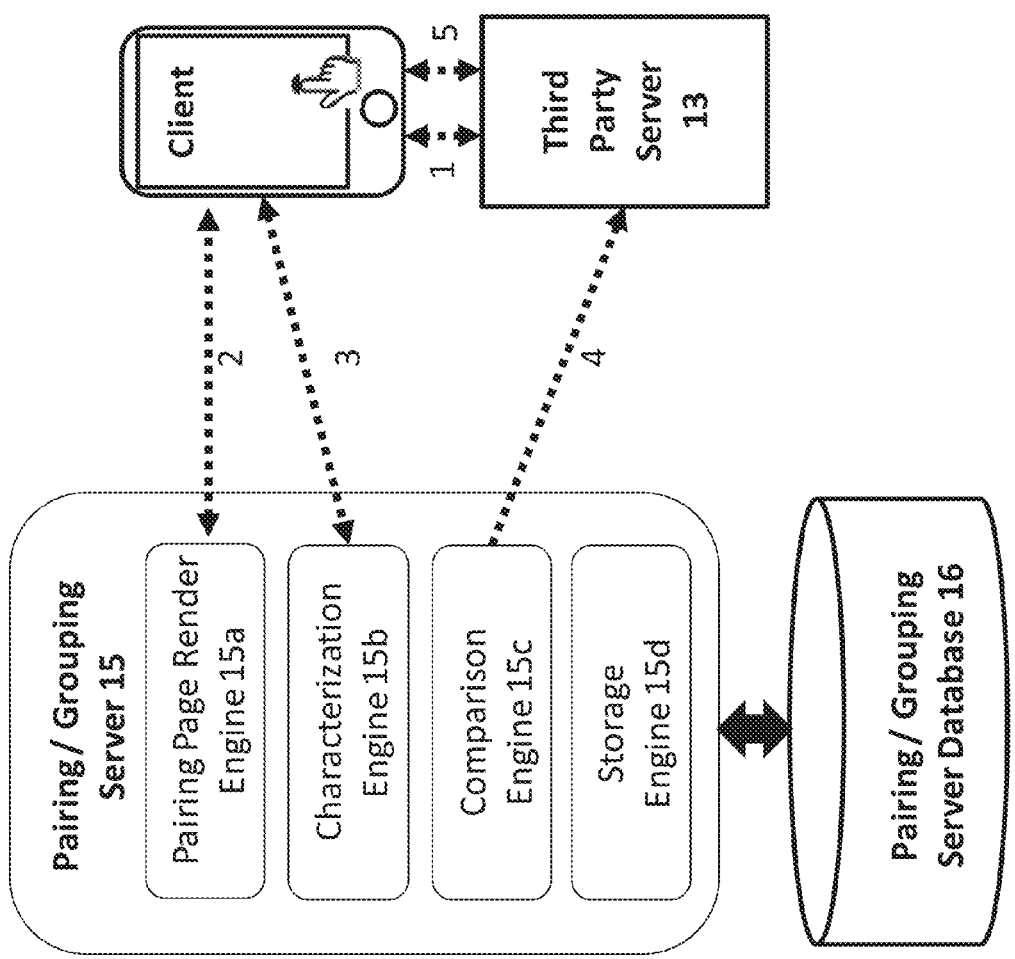
FIG. 4 illustrates a schematic of the architecture of the pairing server of the device pairing system illustrated in FIG. 1, according to an exemplary embodiment.

FIG. 4 illustrates a schematic of the architecture of the pairing server 15 of the device pairing environment 100. As seen in FIG. 4, the client is configured to communicate with the third party server 13 to request access to the customized web page (1). The $3^{rd}$ party server 13 or pairing page render engine 15a may generate the code (e.g. HTML and Javascript) for the customized webpage, and transmit the same to the pairing server 15. The pairing page render engine 15a of the pairing server 15 can then communicate with the mobile devices 11 and 12 in order to render the customized webpage in the browser or native application operating on the mobile devices 11 and 12 (2). Any gesture information or heartbeat information from the client may be transmitted to the pairing page render engine 15a (2) or the characterization engine 15b (3).

After the pairing server 15 receives the heartbeat information from the client device 1, the characterization engine 15b of the pairing server 15 analyzes and characterizes the heartbeat information received from that device in order to determine the exact nature, type and characteristics of the fingerprint gesture being performed by the user on that device's touchscreen (3). The storage engine 15d of the pairing server 15 also stores all the heartbeat information received from that device (e.g. in a pairing/grouping server database 16). The comparison engine 15c of the pairing server 15 also compares the received heartbeat information with any heartbeat information received from other devices, in order to determine if the gestures received from certain mobile devices match; thereafter, the pairing server 15 pairs those certain mobile devices and transmits a pairing confirmation to the third party server 13 (4). After the $3^{rd}$ party server 13 receives the confirmation of the pairing, the $3^{rd}$ party server 13 can directly transfer/sync files and perform other actions across the paired mobile devices (5).

The geolocation information, Wifi/cellular fingerprints, etc., received from the client can be used by the pairing server 15 to determine that mobile devices (e.g. devices 11 and 12) are in close proximity to each other, which can be factored into the determination that two or more devices are to be paired. For example, if the pairing server 15 determines that certain devices are next to each, the pairing server can determine that it is possible they are to be paired, whereas if the pairing server 15 determines that certain devices are far away from each other, the pairing server can determine that these certain devices are not to be paired.

Various information is used by the pairing server 15 to identify the client/mobile device. To identify the device, pairing server can use but is not limited to WiFi signatures, cellphone tower signatures, device/model/modem signature, cookie, received from the client device. Various information is used by the pairing server 15 to identify the pairing. To identify pairing, pairing server can use but is not limited to time, geolocation, gesture pattern, location, velocity, entry/exit points, curvature and vibration data received from the client device. Various information is used by the pairing server 15 to identify the $3^{rd}$ party server 13. To identify the $3^{rd}$ party server corresponding to the mobile devices, the pairing server uses a service key that is shared between the servers as well as a hash key value that is only known to the $3^{rd}$ party server.

Figure 5:
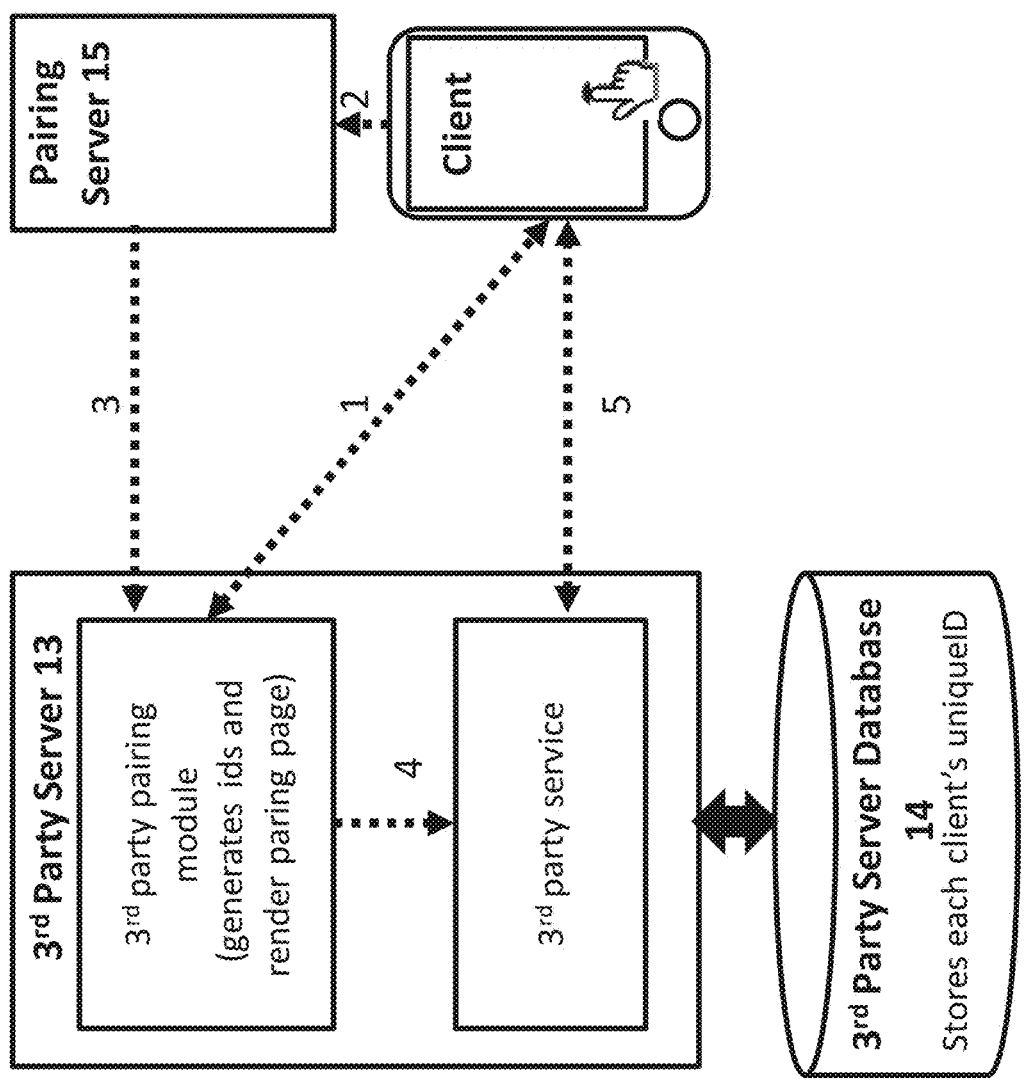
FIG. 5 illustrates a schematic of the architecture of the $3^{rd}$ party server of the device pairing system illustrated in FIG. 1, according to an exemplary embodiment.

FIG. 5 illustrates a schematic of the architecture of the $3^{rd}$ party server 13 of the device pairing environment 100. As seen in FIG. 4, the client is configured to communicate with the $3^{rd}$ party pairing module of the 3rd party server 13, which generates the unique serviceID and randomID unique to the client and stores this information in the third party server database 14, and renders the customized web page that incorporates the serviceID and random ID and which is accessible by the client (1). Thereafter, any gesture information or heartbeat information (along with serviceID and randomID) from the client is transmitted to the pairing server 15 (2) via the customized web page.

After the pairing server 15 pairs certain mobile devices and transmits a pairing confirmation to the third party server 13 (3), the $3^{rd}$ party server hosts the third party service that allows the paired clients to directly transfer/sync files or data and perform other actions across the paired mobile devices (4, 5).

Figure 6:
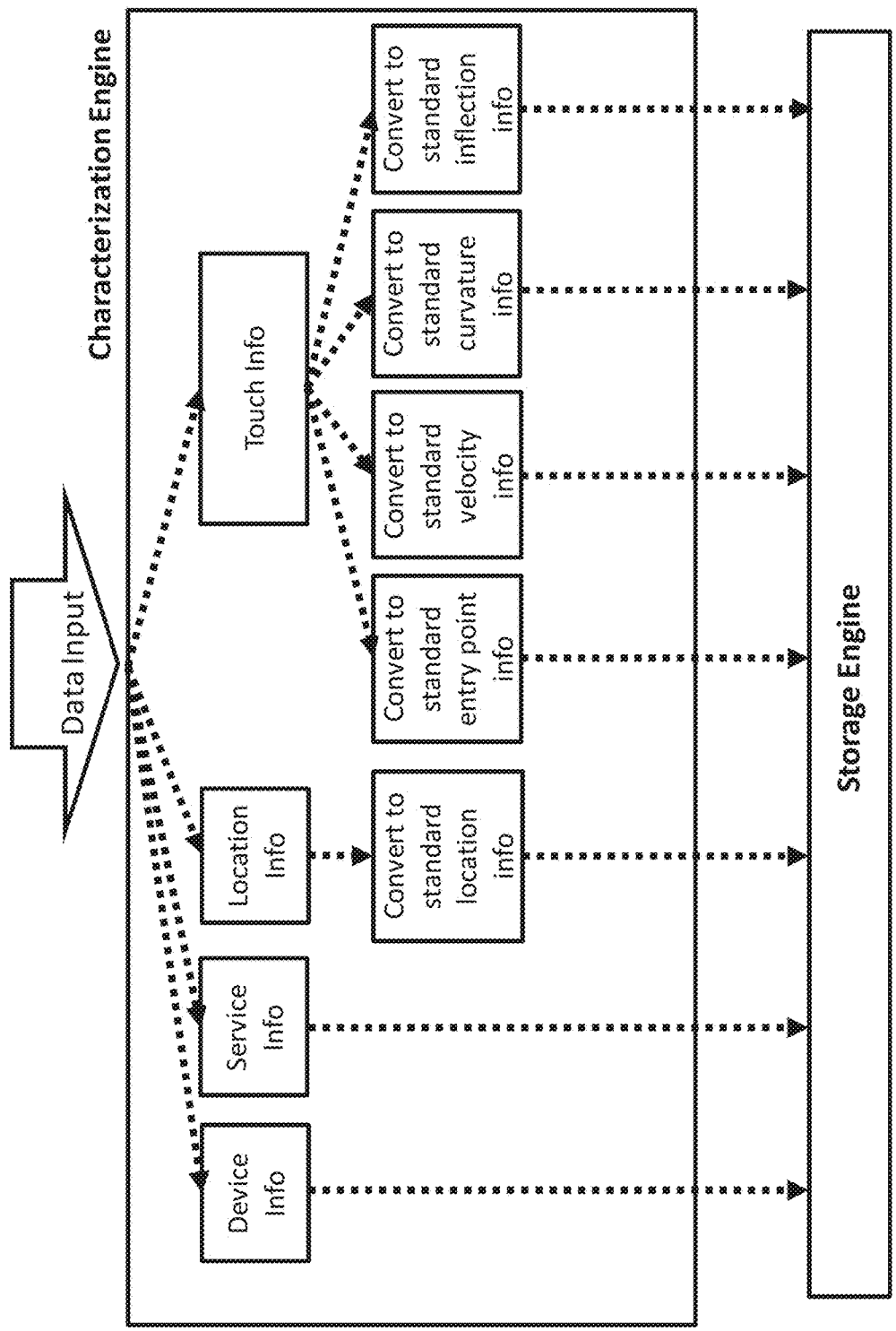
FIG. 6 illustrates a schematic of the architecture of the characterization engine of the pairing server illustrated in FIG. 1, according to an exemplary embodiment.

FIG. 6 illustrates a schematic of the architecture of the characterization engine 15b of the pairing server 15. As seen in FIG. 6, the characterization engine can receive various types of data input. For example, the characterization engine can receive device information and service information from the client, which is transmitted to the storage engine 15d for storage. Moreover, the characterization engine can receive location (e.g. WiFi/cellular footprint of the client, or geolocation information from a GPS system of the client), and convert this information into standard location information for storage by the storage engine 15d. The characterization engine can also receive the actual touchscreen fingerprint gestures or touch information from the client, wherein this information is converted into standard entry point information, standard velocity information, standard curvature information, and standard inflection information, all describing the gesture performed on the touch screen of that client device. The aforementioned information can be transmitted from the characterization engine 15b to the storage engine for storage (e.g. in the pairing/grouping server database 16 illustrated in FIG. 4) and/or provided to the comparison engine 15c.

Figure 7:
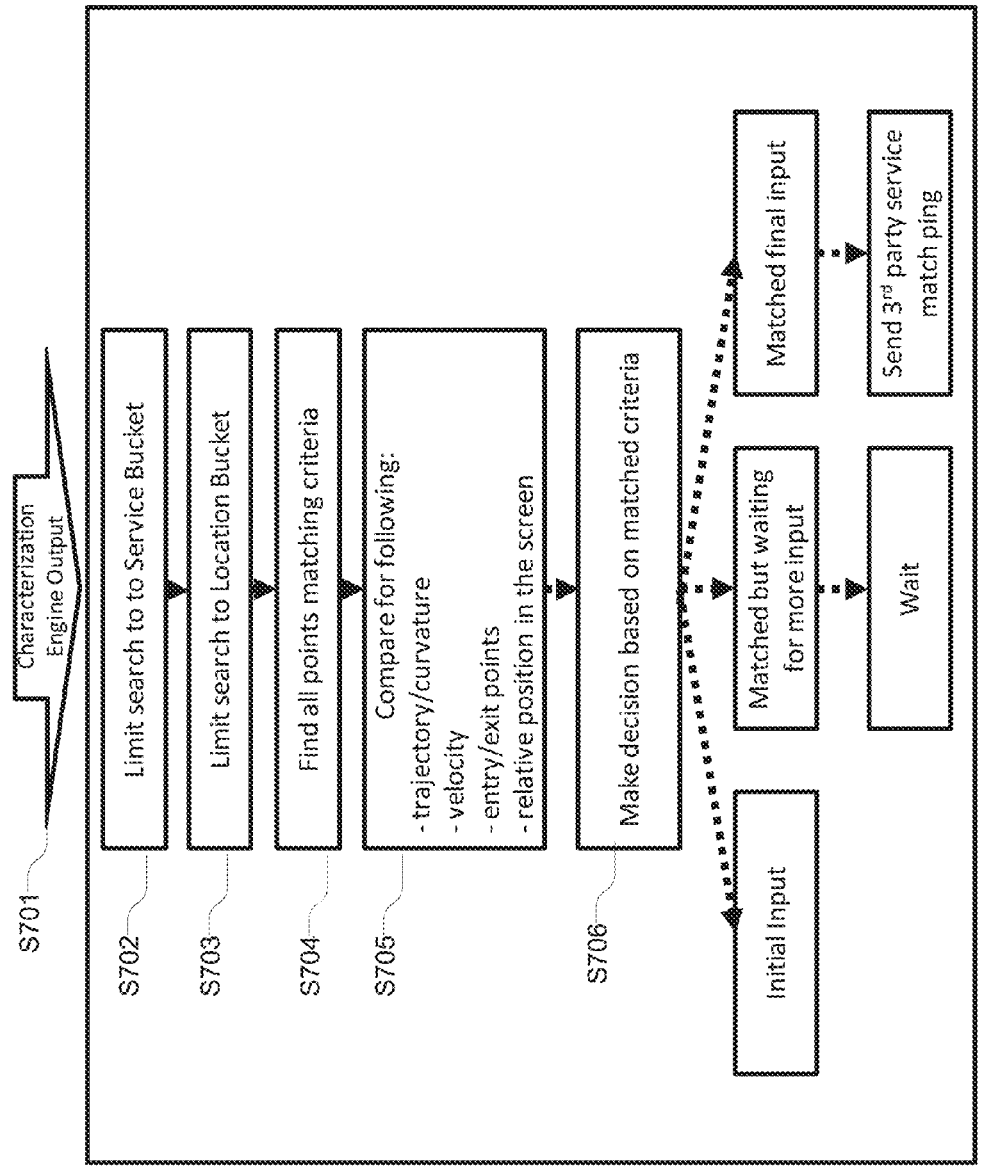
FIG. 7 illustrates a schematic of the architecture of the comparison engine 15c of the pairing server illustrated in FIG. 1, according to an exemplary embodiment.

FIG. 7 illustrates a schematic of the architecture of the comparison engine 15c of the pairing server 15. As seen in FIG. 7, the comparison engine in S701 receives various information from the characterization engine 15b and/or storage engine 15d, including device information, service information, location information and touch information (including standard entry and exit point information, standard velocity information, standard curvature information, and standard inflection information, all describing the gesture performed on the touch screen of a client device). The comparison engine can limit the search to the received service information to determine whether devices should be paired; S702. The comparison engine can then limit the search to the received location information, to determine whether devices should be paired (e.g. if the devices are near each other, it is possible they should be paired, and if they are not near each other, they should not be paired); S703. Thereafter, the comparison engine can find all points matching criteria (S704) and compare information regarding those points (e.g. trajectory/curvature, velocity, entry/exit points, and relative position on screen) (S705), in order to make a decision based on the matching criteria (S706). For example, the comparison engine may wait for more information in order to determine a match, or may have already determined a match but still wait for more input, or have determined a match after receiving the final input, after which the comparison engine sends the third party server 13 a service match ping.

Thus, based on the aforementioned criteria (e.g. trajectory/curvature, velocity, entry/exit points, and relative position on screen), the comparison engine determines whether particular devices should be paired. For example, the comparison engine may determine from the received data points or heartbeat information from a first mobile device that the touchscreen of the first device is receiving user input of a curved line of a certain trajectory/curvature, being drawn by the user at a certain velocity, and having a certain exit point at the right side of the touchscreen of the first mobile device. Similarly, the comparison engine may determine from the received data points or heartbeat information from a second mobile device that the touchscreen of the second device is receiving user input of a curved line of matching/continuing along the same trajectory/curvature of the line on the first device, and being drawn by the user at the same velocity as that on the first device, and having a certain entry point on the left side of the touchscreen of the second mobile device matching the exit point on the right side of the touchscreen of the first mobile device. The comparison engine may utilize the HTML5 screen size information received from each device in order to assist in determining a match between these entry and exit points, since the devices placed side by side may have different screen sizes or may not be placed exactly side by side.

Thus, in the device pairing system of this exemplary embodiment, a single, uniform, continuous touchscreen gesture performed across multiple devices provides a high resolution fingerprint that can be matched quickly and easily. Using this information, it is possible to accurately identify pairing/grouping actions on multiple devices. Indeed, the system is a hyper accurate solution that leverages a whole new facet of data input that was not previously used by other methods. Touchscreens can provide fingerprint data that is magnitudes more rich than the standard accelerometer sensor. As a result, the rich data can translate to magnitudes more accurate identification of the same, single, uniform gesture being performed on multiple devices.

Moreover, the device pairing system of this exemplary embodiment uses basic sensors installed on every smartphone in use today, and the installation of custom software on the mobile devices is not required. The system also leverages the HTML5 standards that are already ubiquitous to almost all mobile devices at the moment, and which are sufficient for the computing power required for the pairing system and which will greatly reduce the usage friction of the system by multiple users. Thus, unlike conventional pairing approaches, the pairing system of this disclosure is operating system agnostic and does not require a custom application or specialized hardware or software to be installed on the mobile devices. The system requirements of the pairing system are low enough such that it will be foreseeably universally accessible on all models of touchscreen-enabled smart devices.

While the system 100 is referred to as a 'mobile' device pairing system, and the examples of this disclosure generally refer to pairing mobile devices (such as mobile devices 11 and 12), it should be understood that the aspects of this disclosure are applicable to, for example, pairing any two or more touchscreen-enabled devices (including, for example, televisions, cameras, video cameras, music players, media players, computer terminals, ATMs, in-car audio entertainment systems, cash registers, payments systems, kiosks, etc.). Thus, any of the mobile devices 11 and 12 in FIG. 1 may be substituted with any of the aforementioned touchscreen-enabled devices. For example, FIGS. 28-35 illustrate exemplary embodiments wherein a touchscreen-enabled mobile device is paired with another touchscreen-enabled device, including an in-car audio entertainment system, a television, an ATM and a cash register machine.

While the pairing/grouping server 15 and $3^{rd}$ party server 13 may be described as being separate devices (see FIG. 1), the paring server and $3^{rd}$ party server may in fact be manifested in a single device.

Single Continuos Gesture with at Least One Entry Point and Exit Point on Each Touchscreen of Each Device to be Paired FIG. 8 illustrates a pairing server 80 according to an exemplary embodiment. The pairing server 80 includes a detection module 80a operable to detect user input of a single continuous gesture across the touchscreens of plural devices, and a pairing module 80b operable to automatically pair the plural devices to enable transfer of data between the plural devices. The detection module 80a may correspond to the paring server 15 (and include the functionality of the characterization engine 15b and comparison engine 15c), while the pairing module 80b may correspond to the paring server 15 and/or $3^{rd}$ party web server 13.

According to this exemplar) embodiment, the detection module 80a is configured to detect a single continuous gesture across the touchscreens of plural devices, wherein the single continuous gesture includes at least one entry point and exit point on the touchscreen of each device to be paired, as described below. The single continuous gesture may be, for example a zigzag gesture, staircase gesture, single loop gesture (e.g. a circle, ellipse, square, rectangle, triangle, parallelogram, etc.) or any other gesture with at least one entry point and exit point on the touchscreen of each device. As described below (e.g. with reference to FIGS. 11a-11c), an 'exit point' of a first device corresponds to a point where the gesture reaches the edge of the touchscreen of the first device and leaves the touchscreen of the first device; thereafter, the gesture continues and enters the edge of the touchscreen of a second device at an "entry point" of the second device, and continues along the touchscreen of the second device.

The pairing module 80b only pairs the plural devices, if the detection module 80a detects the user input of the single continuous gesture across the touchscreens of the devices. The requirement of detecting the user input of the single continuous gesture with at least one entry point and exit point on the touchscreen of each device, rather than user input of a line, greatly increases the accuracy and robustness of the pairing server 80, as described below.

In the interests of brevity, this disclosure will refer throughout to the basic example of a single loop gesture (e.g. FIGS. 10a-14a, 15-18, etc.). However, this is merely one basic example of a single continuous gesture performed on the touchscreens of plural devices with at least one entry point and exit point on the touchscreen of each device. Thus, it should be understood that any embodiment of this disclosure that refers to a single loop gesture is equally applicable to any single, continuous gesture performed on the touchscreens of plural devices with at least one entry point and exit point on the touchscreen of each device (e.g. zigzag gesture, staircase gesture, see FIG. 14b).

FIG. 9 illustrates a scenario where a first user is performing a single line gesture across the touchscreens of device A and device B, at exactly the same time as a second user is performing an identical (or near-identical) single line gesture across the touchscreens of device C and device D. Assuming that the two line gestures in FIG. 9 are nearly identical, and performed at exactly the same time, it may become difficult for the pairing server to accurately detect the devices to be paired. That is, the pairing server may possibly determine that device A is to be paired with device D (instead of device B), and device C is to be paired with device B (instead of device D). This is because the gesture information from the touchscreen of device A may match with the gesture information from the touchscreens of both device B and device D. Similarly, the gesture information from the touchscreen of device C may match with the gesture information from the touchscreens of both device B and device D.

According to this exemplary embodiment, this problem is minimized since the detection module 80a of the pairing server 80 detects user input of a single, continuous gesture performed on the touchscreens of plural devices with at least one entry point and exit point on the touchscreen of each device, such as the single loop gesture across the touchscreens of two devices (see FIG. 10a), or single loop gesture across the touchscreens of more than two devices (see FIG. 10b). As described below, this greatly increases the accuracy and robustness of the detection module 80a and pairing server 80 at detecting the appropriate devices to be paired.

Figure 11B:
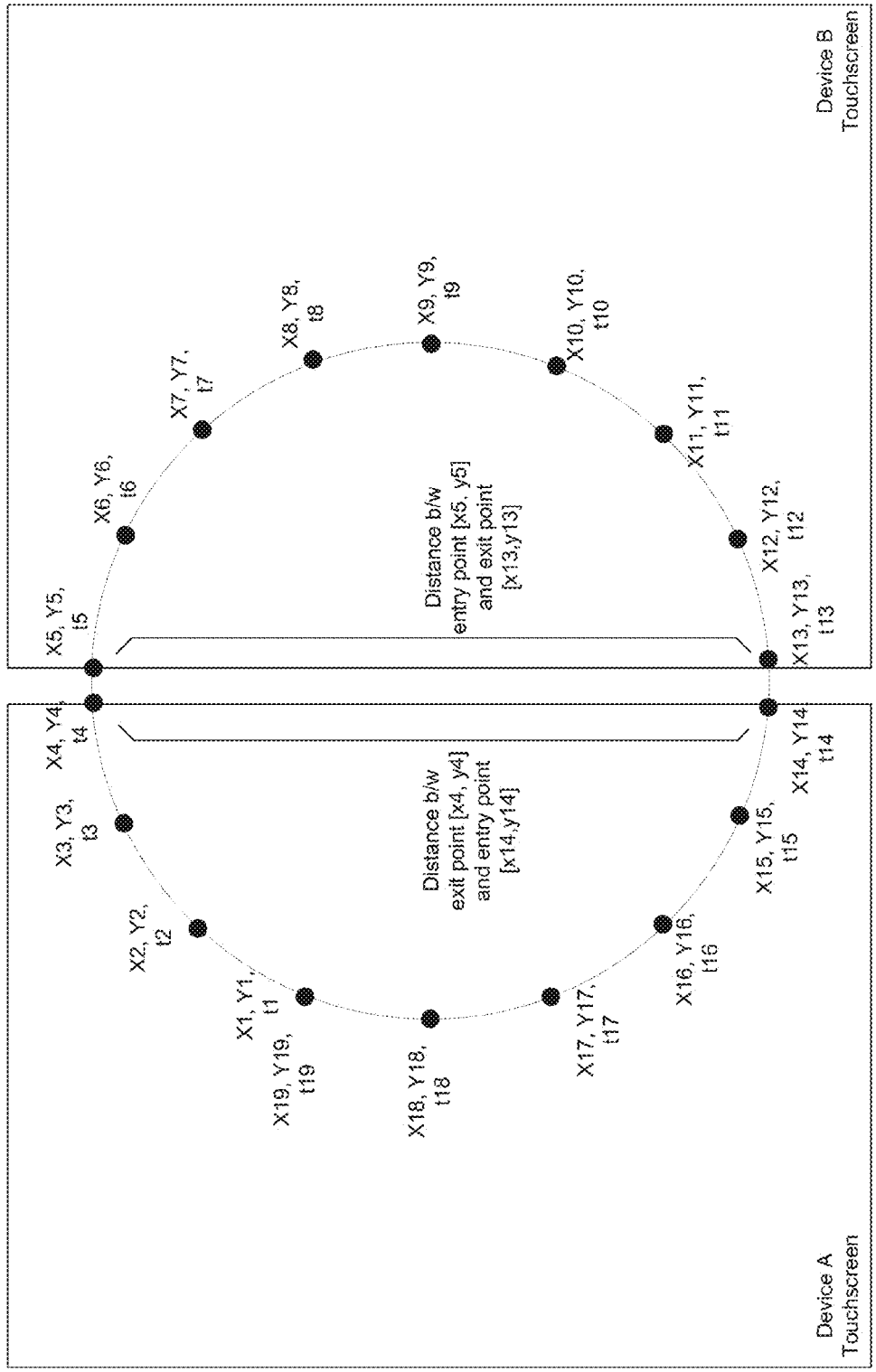
FIG. 11B illustrates an coordinate touch gesture input information or "heartbeat" information received from the two mobile devices illustrated in FIG. 11A.
Figure 11C:
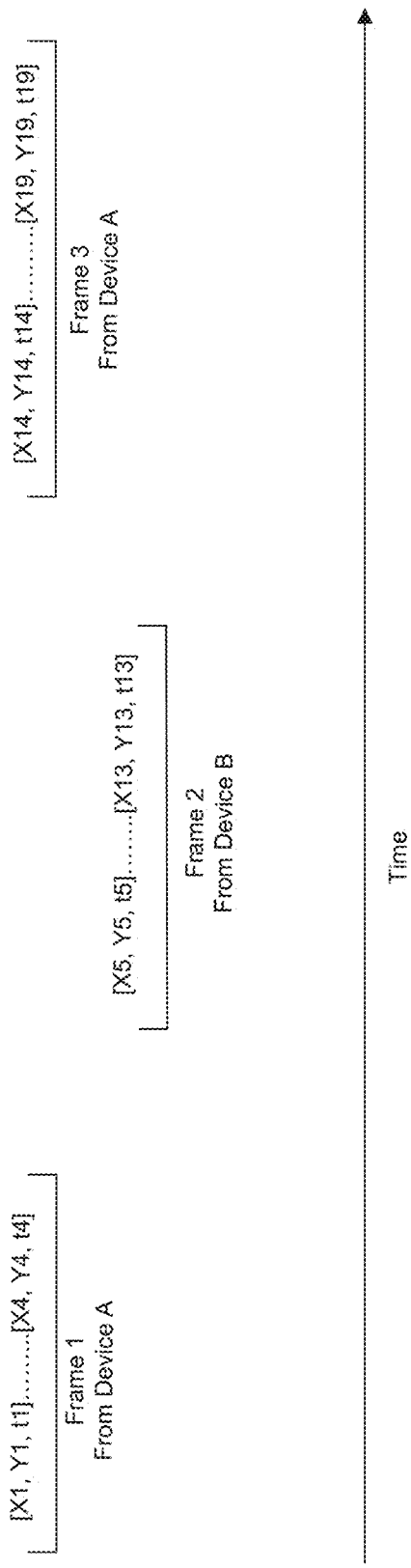
FIG. 11C illustrates a timeline of how the coordinate touch gesture input information or "heartbeat" information is received from the two mobile devices illustrated in FIG. 11B, the information being received in frames.
Figure 12B:
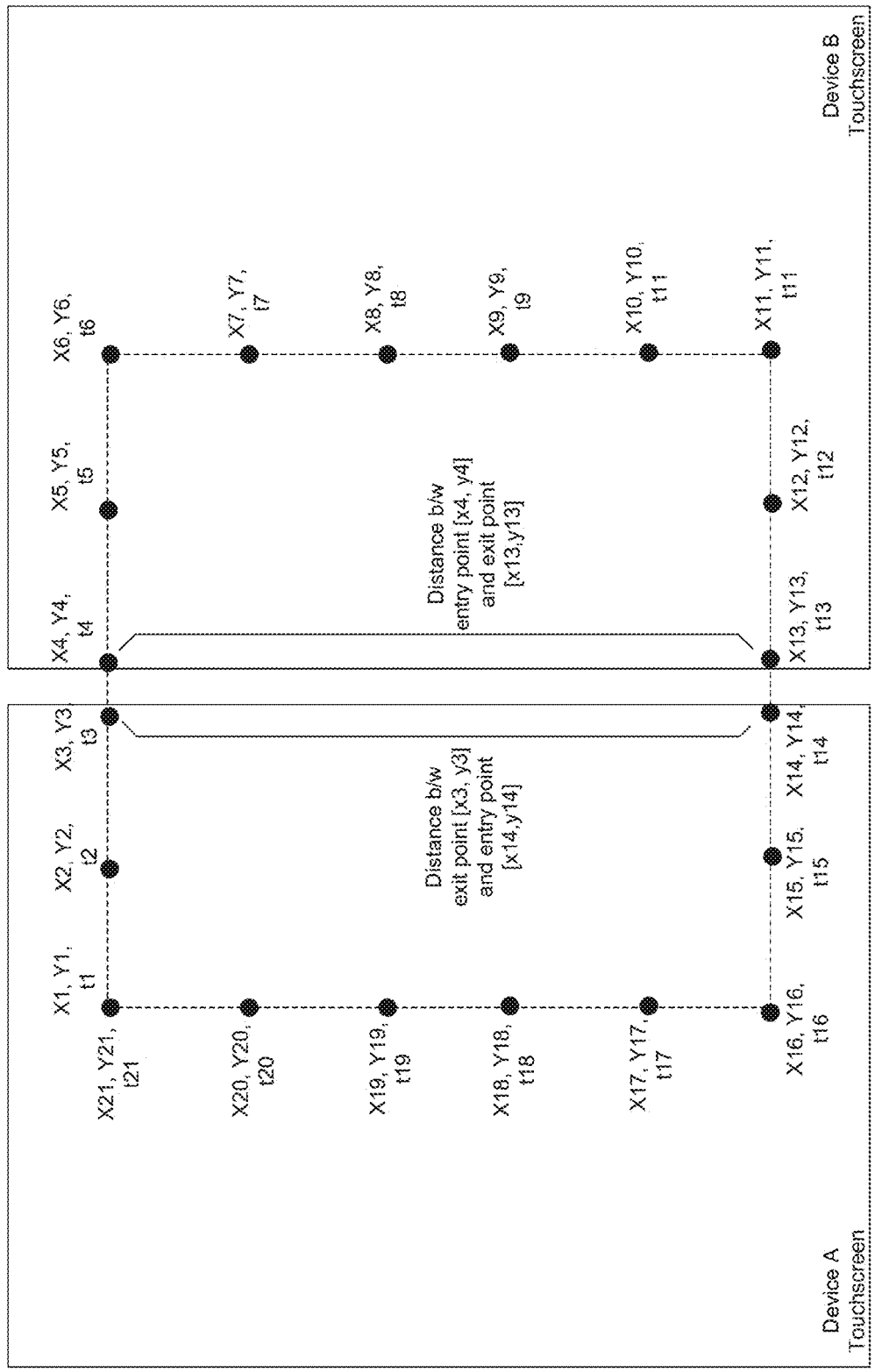
FIG. 12B illustrates an coordinate touch gesture input information or "heartbeat" information received from the two mobile devices illustrated in FIG. 12A.

For example, FIG. 11a illustrates a single loop gesture corresponding to a circle gesture performed across the touchscreens of device A and device B. Each of the devices' touchscreens detects the touch inputs, and transmits gesture information to the pairing server 80, wherein the gesture information may correspond to spatial co-ordinates of touch input detected at regular intervals at each touchscreen. For example, as seen in FIGS. 11b and 11c, the pairing server receives, from device A, touch gesture co-ordinates [X1,Y1] at time t1, [X2,Y2] at time t2 through [X4,Y4] (the "exit point" at device A) at time t4. The paring device then receives, from device B, co-ordinates [X5,Y5] (the "entry point" at device B) at time t5 through [X13,Y13] (the "exit point" at device B) at time t13. Finally, the pairing server receives, from device A, gesture co-ordinates [X14,Y14] (the "entry point" at device A) at time t14, through [X19, Y19] at time t19. The pairing server may organize the gesture information received from the devices into frames 1 through 3, as seen in FIG. 11c. The number of points illustrated in, for example, FIG. 11b is merely exemplary, and it should be understood that the pairing server may receive information from any number of touch gesture co-ordinates from the devices.

As seen in FIG. 11c, the single loop gesture includes a start point at the touchscreen of device A (e.g. X1,Y1), a mid-point at the touchscreen of device B (e.g. X10, Y10), and a finish point at the touchscreen of the first device (e.g. X19,Y19). The loop gesture includes a first line segment between the start point and the mid-point (e.g. [X1,Y1] through [X10,Y10]) that extends across the touchscreens of the plural devices in a specific order (i.e. device A, device B), and a second line segment between the mid-point and the finish point (e.g. [X10,Y10] through [X19, Y19]) that extends across the touchscreens of the plural devices in a reverse order (i.e. device B, device A) that is the reverse of the specific order (i.e. device A, device B).

As described throughout this disclosure, the pairing server 80 compares the touch gesture information received from device A with the touch gesture information received from device B, in order to determine if there is a match. For example, the pairing server 18 may compare the speed, velocity, acceleration, position, inclination, angle, gradient or curvature of the touch gesture information from the devices. However, since the gesture is a loop gesture, rather than a single line gesture, the pairing server can not only compare the characteristics of the first line segment/upper line portion of the single loop gesture (e.g. [X1,Y1] through around [X10,Y10] in FIG. 11b, and particularly around coordinates [X4,Y4] and [X5,Y5] where the line crosses the devices), but also the characteristics of the second line segment/lower line portion of the single loop gesture (e.g. [X10,Y10] through [X19, Y19] in FIG. 11b, and particularly around coordinates [X13,Y13] and [X14,Y14], where the line crosses the devices again). Thus, the matching process is duplicated and made more redundant, since both portions of the single loop gesture must match, as determined by the determination module 80a of the paring server 80.

The loop gesture also increases the accuracy and robustness of the matching process, since the determination module 80a may analyze and compare the distance between the entry and exit points of the single loop gesture on each of the touchscreens. For example, as seen in FIG. 11b, the single loop gesture exits the touchscreen of device A at [X4, Y4], enters the touchscreen of device B at [X5,Y5], exits the touchscreen of device B at [X13,Y13], and re-enters the touchscreen of device A at [X14, Y14]. The determination module 80a may easily determine these points, since they are the first or last points from the frames of touch gesture co-ordinate information received from the devices (see FIG. 11c).

Thereafter, the determination module may determine that the devices are to be paired, if the distance between an entry point [X5,Y5] and an exit point [X13,Y13] of the loop gesture on the touchscreen of device B, corresponds to a distance between an entry point [X14,Y14] and an exit point [X4,Y4] of the loop gesture on the touchscreen of device A.

The aforementioned aspects and functionality of the determination module 80a of the pairing server 80 applies with different types of loop gestures. For example, the loop gesture may correspond to a square gesture (see FIGS. 12a and 12b), a rectangle gesture, a parallelogram. Similarly, the aspects and functionality of the determination module 80a of the pairing server 80 applies with any single, continuous gesture performed on the touchscreens of plural devices with at least one entry point and exit point on the touchscreen of each device (see FIG. 14b).

Figure 13A:
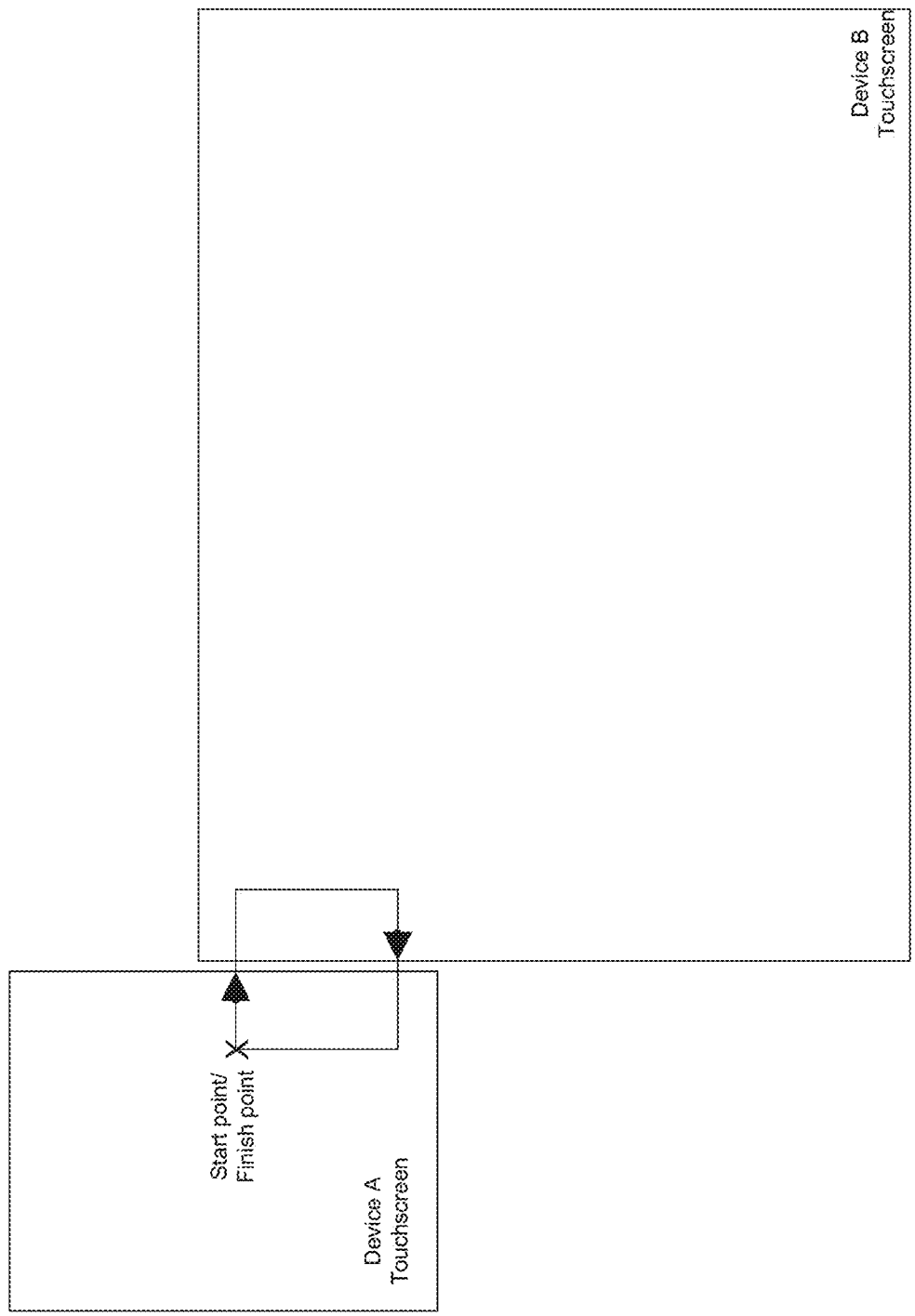
FIG. 13A illustrates an example of a single loop gesture performed on the touch screens of two mobile devices, the gesture corresponding to an square shape, wherein the two mobile devices have different size screens and the two mobile devices are oriented differently, according to an exemplary embodiment.
Figure 13B:
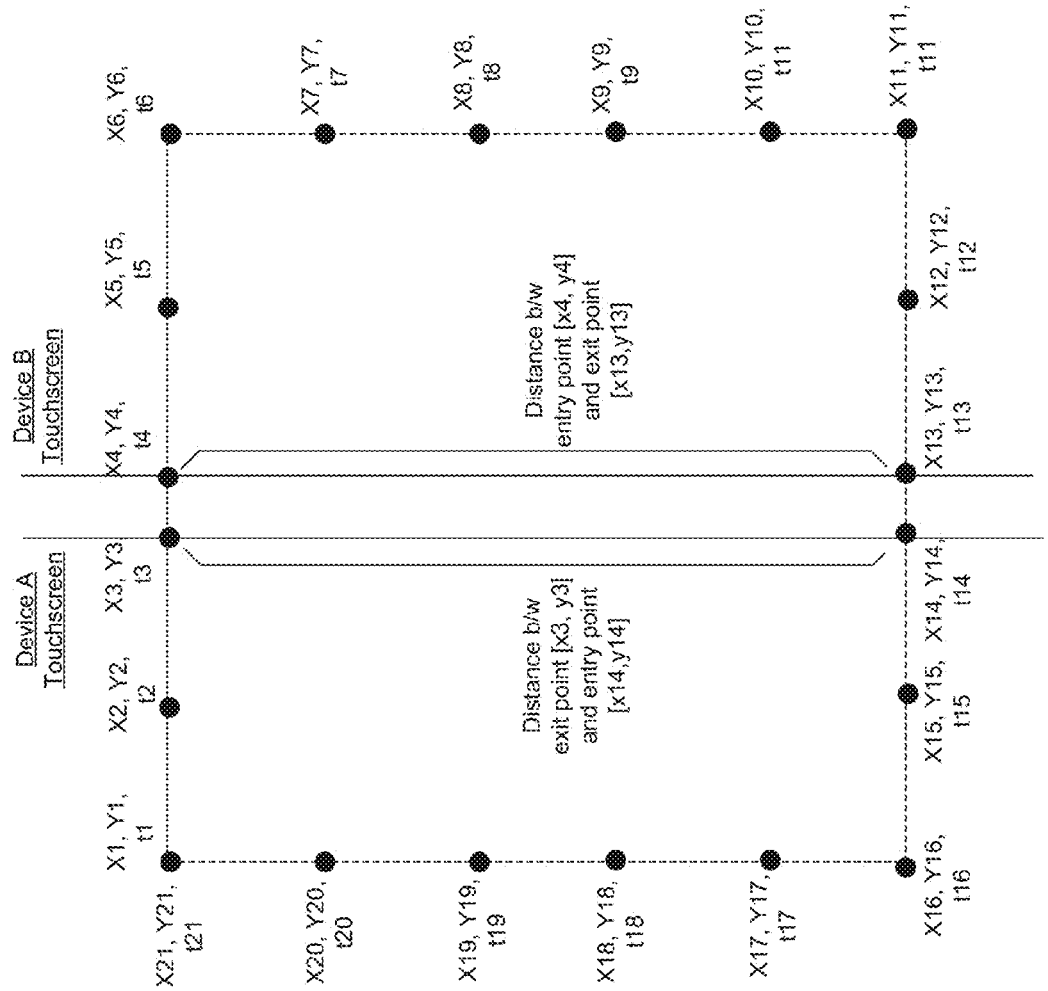
FIG. 13B illustrates an coordinate touch gesture input information or "heartbeat" information received from the two mobile devices illustrated in FIG. 13A.
Figure 14A:
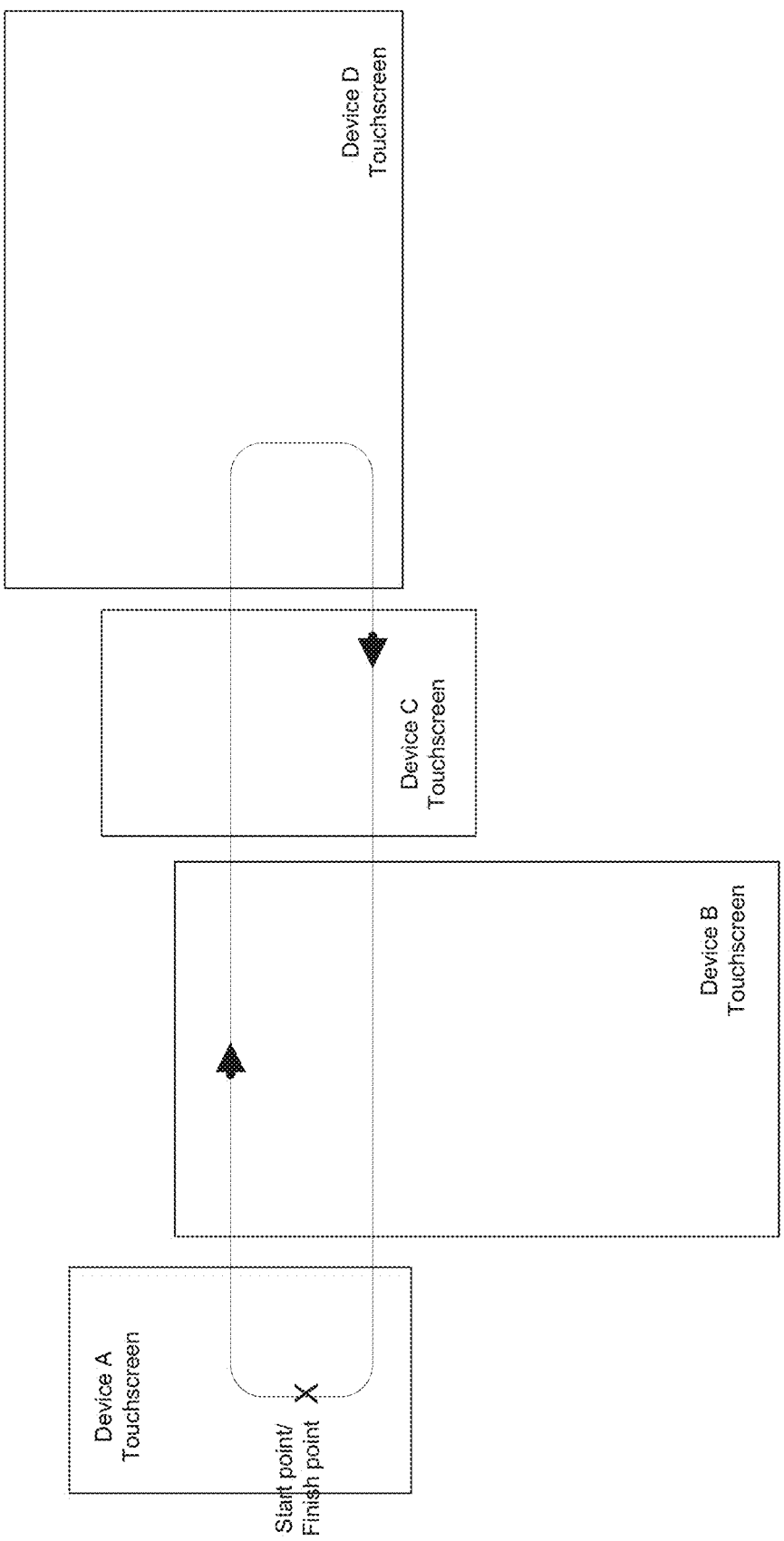
FIG. 14A illustrates an example of a single loop gesture performed on the touch screens of plural mobile devices, wherein the plural devices have different size screens and the plural devices are oriented differently, according to an exemplary embodiment.
Figure 15B:
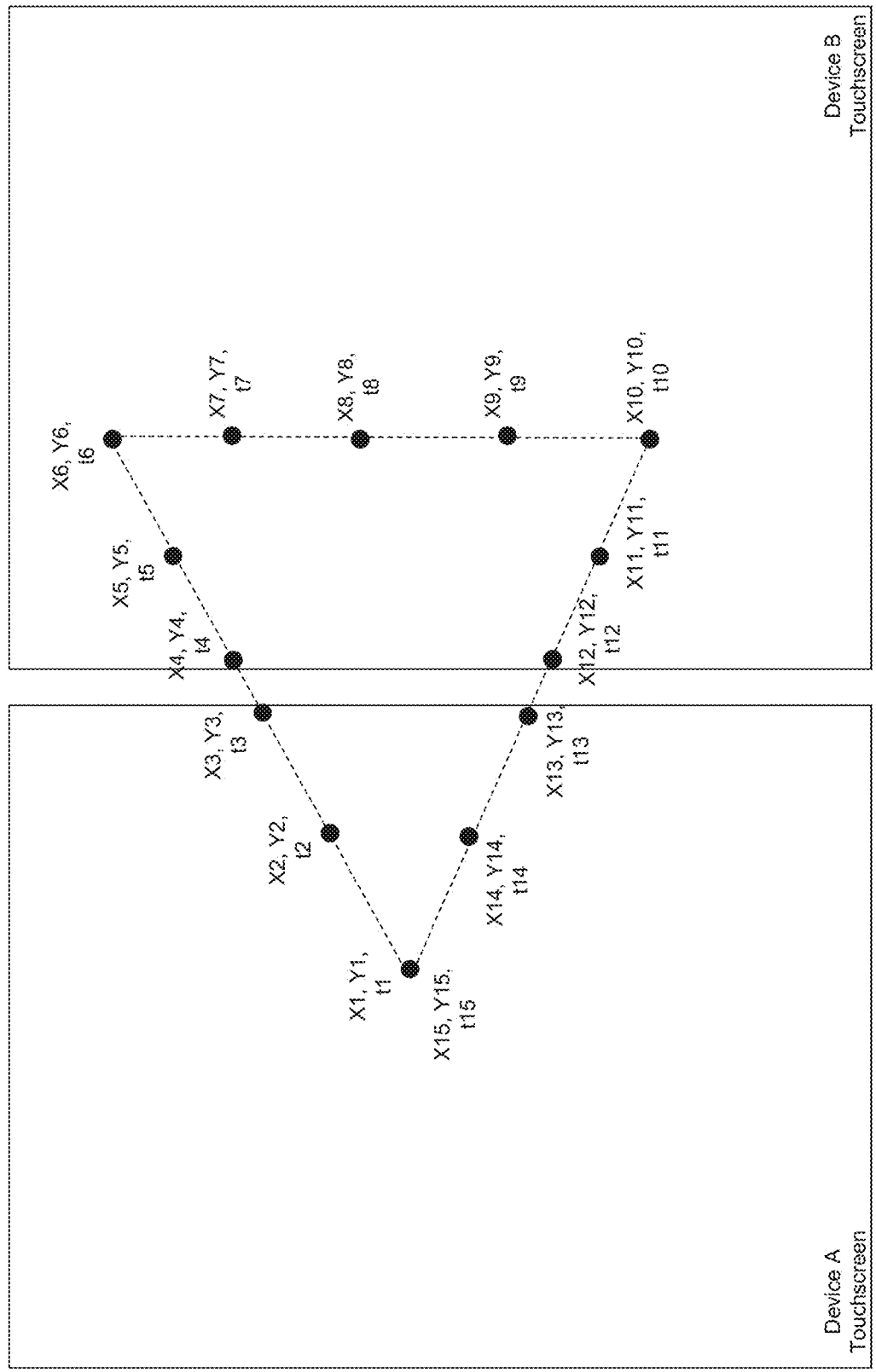
FIG. 15B illustrates an coordinate touch gesture input information or "heartbeat" information received from the two mobile devices illustrated in FIG. 15A.
Figure 15C:
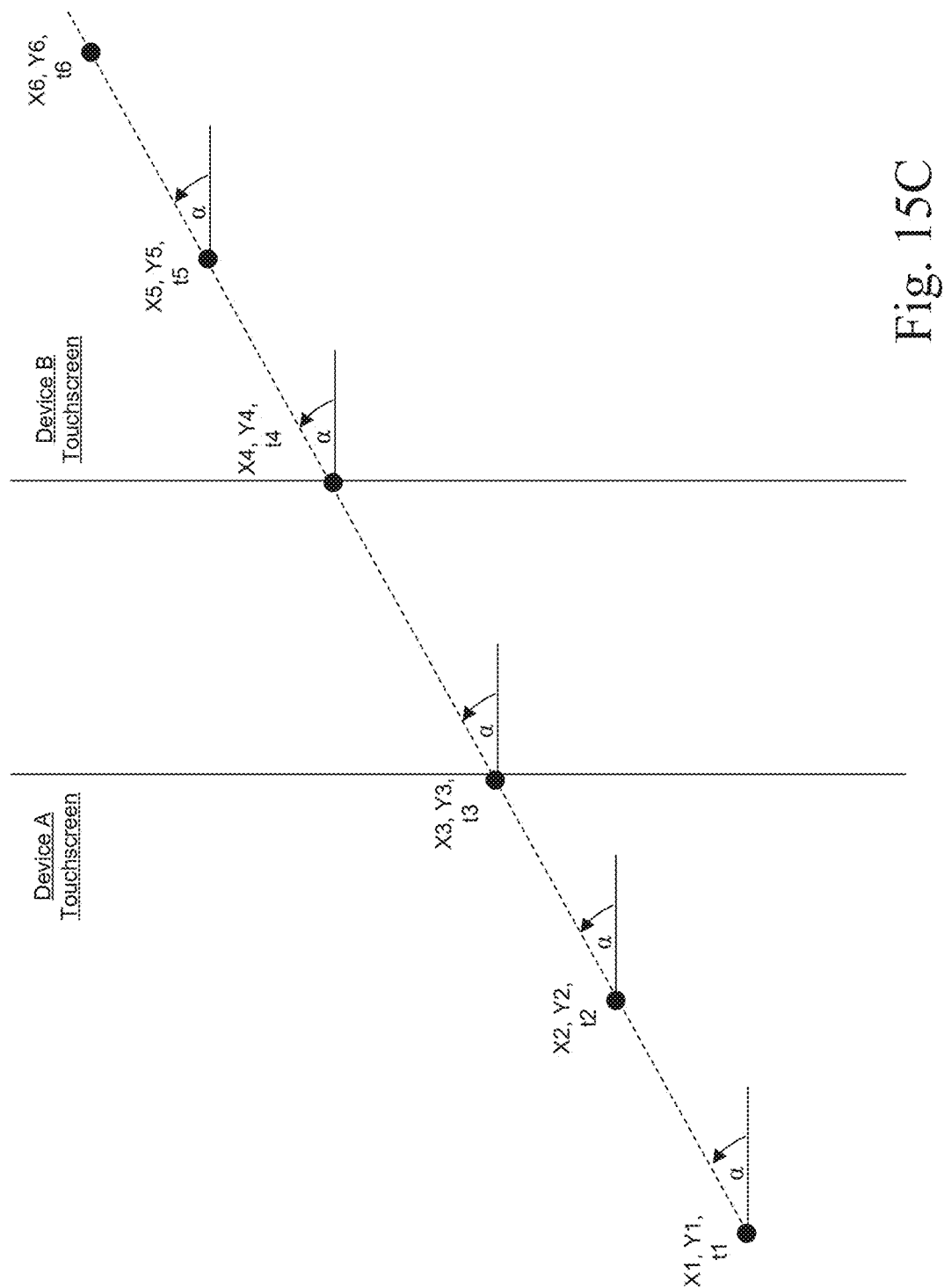
FIG. 15C illustrates how the angle or inclination between various touch gesture co-ordinates received from two devices (see FIG. 15B), may be utilized to determine if there is a match between the touch gesture inputs received at the two devices and, thus, whether the user has inputted a single loop gesture indicating that the two devices are to be paired.

Moreover, the detection by the determination module 80a of a loop gesture, and not merely a single line gesture, increases robustness and accuracy when the touchscreens of the plural devices are different sizes and/or are positioned differently. For example, as seen in FIG. 13a, the user performs a single loop gesture across the touchscreens of devices A and B, which have different sizes and are positioned differently. Thus, as seen in FIG. 13b, the co-ordinates [X3,Y3] and [X4,Y4] received from the two devices may not appear on their face to match, since they positioned at very different portions of the touchscreens of the devices, the sizes of the touchscreens of the devices are very different.

For example, referring to FIG. 13a, suppose the resolution of device A is 800 pixels (height) by 600 pixels (width). So the height on the right side of the device A touchscreen is 800 pixels, and the single loop gesture leaves the device A touchscreen close to half the height on the right side, say 350 pixels "high". If height corresponds to the y-axis, then Y3 co-ordinate from device A may simply specify "350". On the other hand, suppose the resolution of device B is 1920 pixels (width) by 1080 pixels (height). So the height on the left side of the device B touchscreen is 1080 pixels, and the single loop gesture enters the device B touchscreen near the top on the left side, say 900 pixels "high". If height corresponds to the y-axis, then Y4 co-ordinate from device B may simply specify "900". Thus, with reference to FIG. 13b, the co-ordinates [X3, Y3] and [X4, Y4], which may not appear on their face to match, in terms of vertical position on the two display screens. Likewise, the co-ordinates [X14, Y14] and [X13, Y13], which may not appear on their face to match, in terms of vertical position on the two display screens.

To minimize this problem, the determination module 80a may determine that the devices are to be paired, if the distance between an entry point [X4,Y4] and an exit point [X13,Y13] of the loop gesture on the touchscreen of device B, corresponds to a distance between an entry point [X14, Y14] and an exit point [X3,Y3] of the loop gesture on the touchscreen of device A. The detection module 80a may determine these distances independently of whether co-ordinates [X3,Y3] and [X4,Y4] (or co-ordinates [X13,Y13] and [X14,Y14]) received from the two devices appear on their face to match. This approach is applicable in situations where plural devices positioned differently and/or having different-sized touchscreens are to be paired (see FIG. 14a).

In some cases, it may be problematic to rely on the distance between entry and exit points, since the co-ordinate information return from the browsers will indicate the number of pixels between entry and exit points, but that different devices may have different pixel sizes.

Thus, according to another exemplary embodiment, the determination module 80a may take into account the ratio between the number of pixels between various entry and exit points. For example, with reference to the example of FIG. 14b, the determination module may determine a first ratio of the number of pixels along distance 14-1 to the number of pixels along distance 14-3. The determination module may also determine a second ratio of the number of pixels along distance 14-2 to the number of pixels along distance 14-4. The determination module may compare the first and second ratios to see if there is a match, and thus if pairing of the devices should occur. Instead, or in addition, the determination module may determine a third ratio of the number of pixels along distance 14-1 to the number of pixels along distance 14-2. The determination module may also determine a fourth ratio of the number of pixels along distance 14-3 to the number of pixels along distance 14-4. The determination module may compare the third and fourth ratios to see if there is a match, and thus if pairing of the devices should occur.

The detection by the determination module 80a of a loop gesture, and not merely a single line gesture, increases robustness and accuracy when the touchscreens of the plural devices are positioned in a different orientation. For example, suppose the resolution of device A in FIG. 13a is 800 pixels (width) by 600 pixels (height), but the device is placed on its side such that it's orientation is rotated by 90 degrees. The pairing server will be able to determine that the gesture entry point and exit point are from the same side of the device (e.g. the "bottom" side or the "top" side of the device), and the pairing server 80a will be able to perform the matching with the entry point/exit point of device B accordingly.

While the Figures have illustrated a circle loop gesture and a square loop gesture, it should be understood that the detection module 80a may detect other types of gestures, such as a triangle gesture (see FIGS. 15a and 15b), wherein the detection module 80 may analyze the angle or inclination between various touch gesture co-ordinates (see FIG. 15c), in order to determine if there is a match between the touch gesture inputs received from two devices and, thus, whether the user has inputted a single loop gesture indicating that the two devices are to be paired.

Figure 16B:
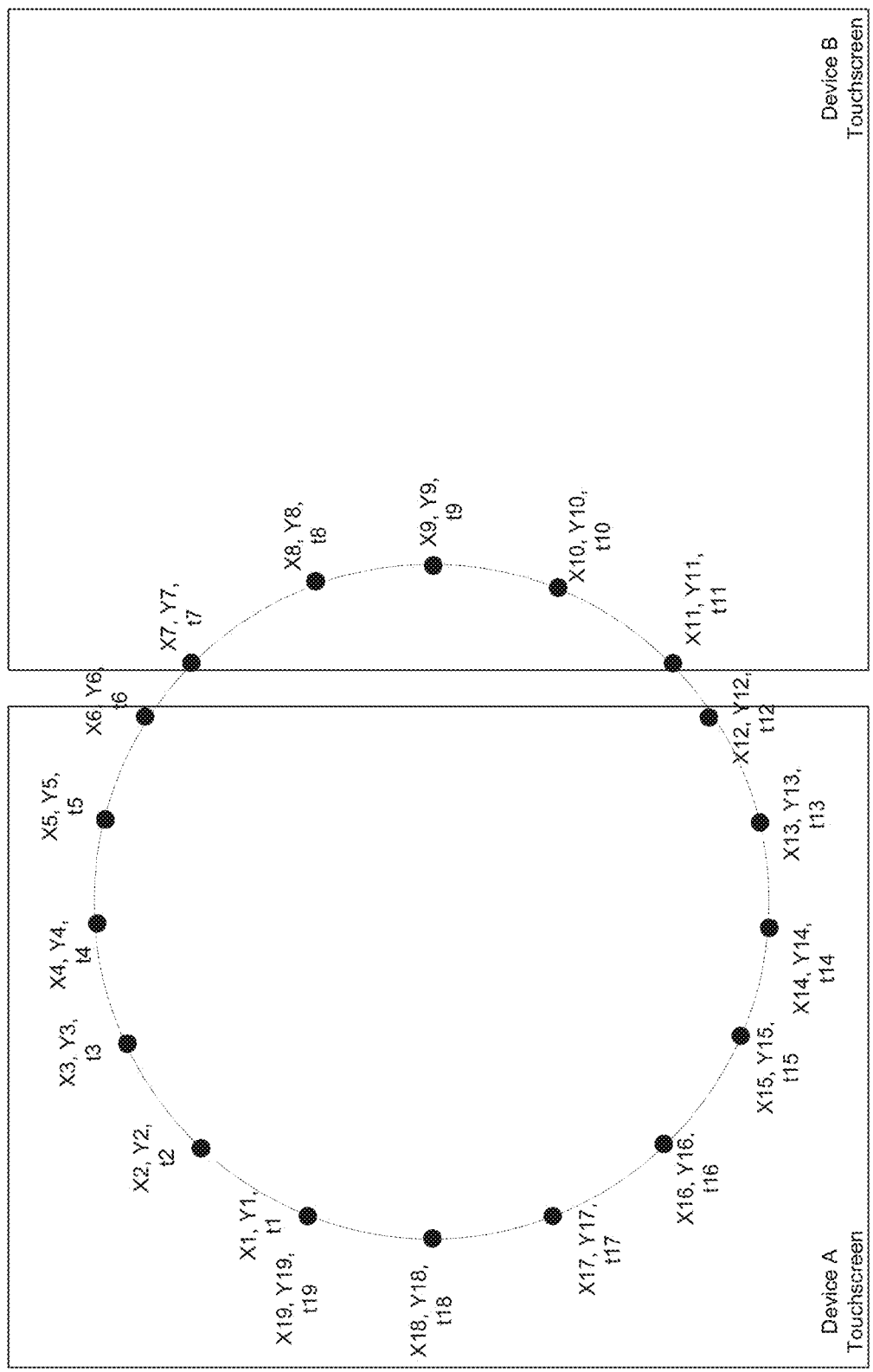
FIG. 16B illustrates an coordinate touch gesture input information or "heartbeat" information received from the two mobile devices illustrated in FIG. 16A.

Similarly, the detection module 80a may detect a circle gesture, even when the circle gesture is off-center (see FIGS. 16a and 16b). In such case, the detection module may analyze the curvature of various portions of the loop gesture received from the different touchscreens, in order to determine that they correspond to a circle having a specific diameter, radius, curvature, etc. Thus, the detection module 80a may determine if there is a match between the touch gesture inputs received from two devices and, thus, whether the user has inputted a single loop gesture indicating that the two devices are to be paired.

The detection of the loop gesture, and not merely a single line gesture, increases the accuracy and robustness of the detection module 80a of the pairing server 80 in still other ways. For example, the loop gesture includes an end portion or "turn-back" portion that indicates to the detection module that the loop gesture will not extend further to any more devices, and as such the only devices to be paired are those for which at least some touch gesture information has already been received.

The detection module can easily detect the "turn-back" portion, since that will correspond to the frame of information from a device wherein the entry point and exit point are on the same side of that device's touchscreen. E.g., see FIG. 11b, and frame 2 from device B in FIG. 11c, wherein the X5 co-ordinate should match up with the X13 co-ordinate, as both identify the left-hand side of the current orientation for the touchscreen of device B.

Figure 17:
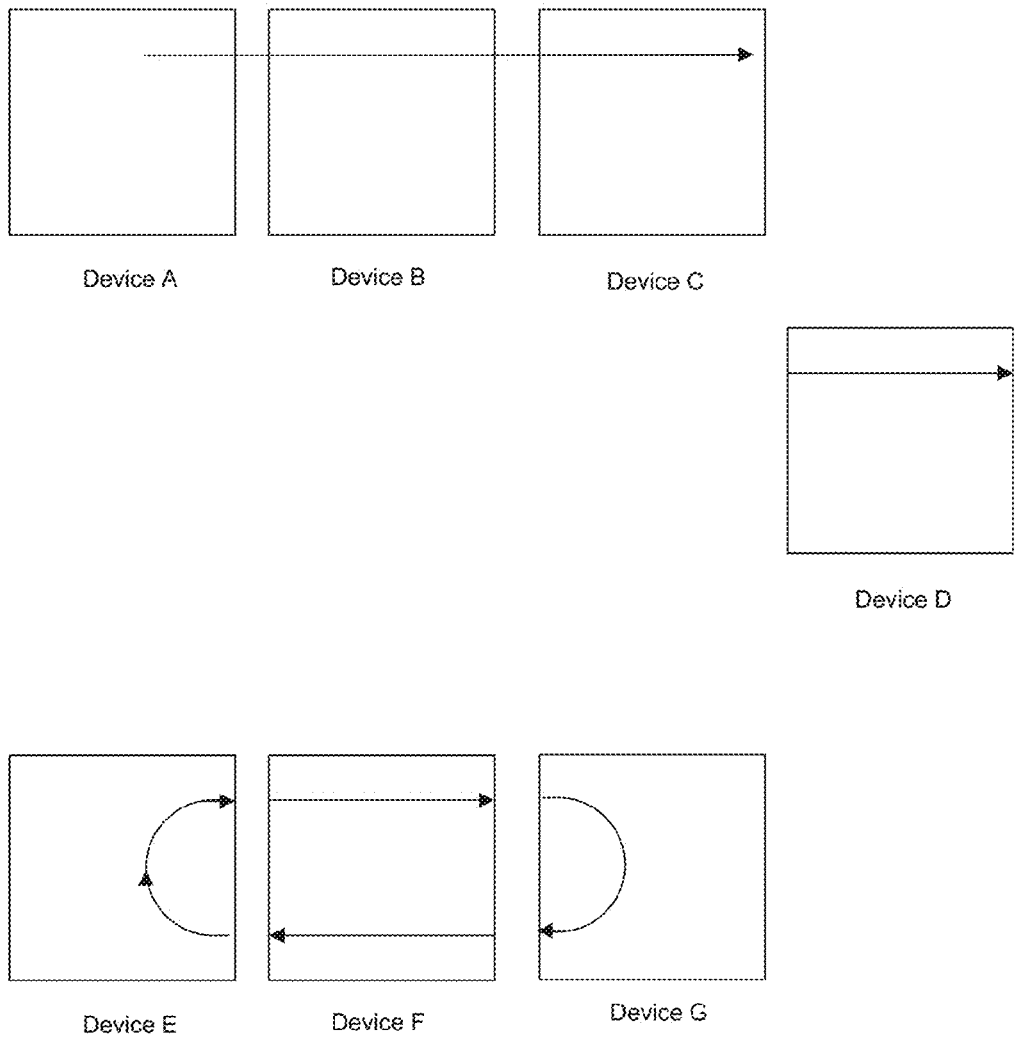
FIG. 17 illustrates an example of how a turn-back gesture of a single loop gesture may be used to determine devices to be paired.

For example, with reference to FIG. 17, it can be seen that a user has performed a single line touch gesture across devices A, B, and C, with the intention that devices A, B and C are to be paired. However, suppose that immediately after the user completes the single line gesture on device C, an unrelated user elsewhere swipes a line gesture across device D. Further suppose that the line gesture across device D happens to match the line gesture across devices A, B and C in terms of velocity, acceleration, inclination, etc. In such case, it may be difficult for the pairing server to determine where the user intended the line gesture across devices A, B and C to end. Indeed the pairing server may mistakenly determine that the line gesture across device D is an extension of the line gesture across devices A, B and C, and may try to pair devices A through D.

In contrast, FIG. 17 also illustrates a loop gesture performed across devices E, F and G. The touch gesture information received from device G will clearly indicate a "turn-back" portion of the gesture (i.e. both entry point and exit point are on the same side of the touchscreen of device G). After detecting the "turn-back" portion, the detection module 80a will determine that device G is the final device to be paired, and as such the only devices to be paired are those for which at least some touch gesture information has already been received (i.e. devices E, F and G).

Referring back to FIG. 10b, there is illustrated an example of a one finger gesture performed on the touch screens of several mobile devices, the gesture corresponding to an enclosed shape. According to an exemplary non-limiting embodiment, after the detection module 80a detects such a gesture, the pairing module 80b discovers and pairs/groups the multiple devices. It should be understood that any shape may be used, such as an ellipse, square, rectangle, triangle, parallelogram, and so forth. Also, the gesture can be performed on more than two phones or devices.

Figure 18:
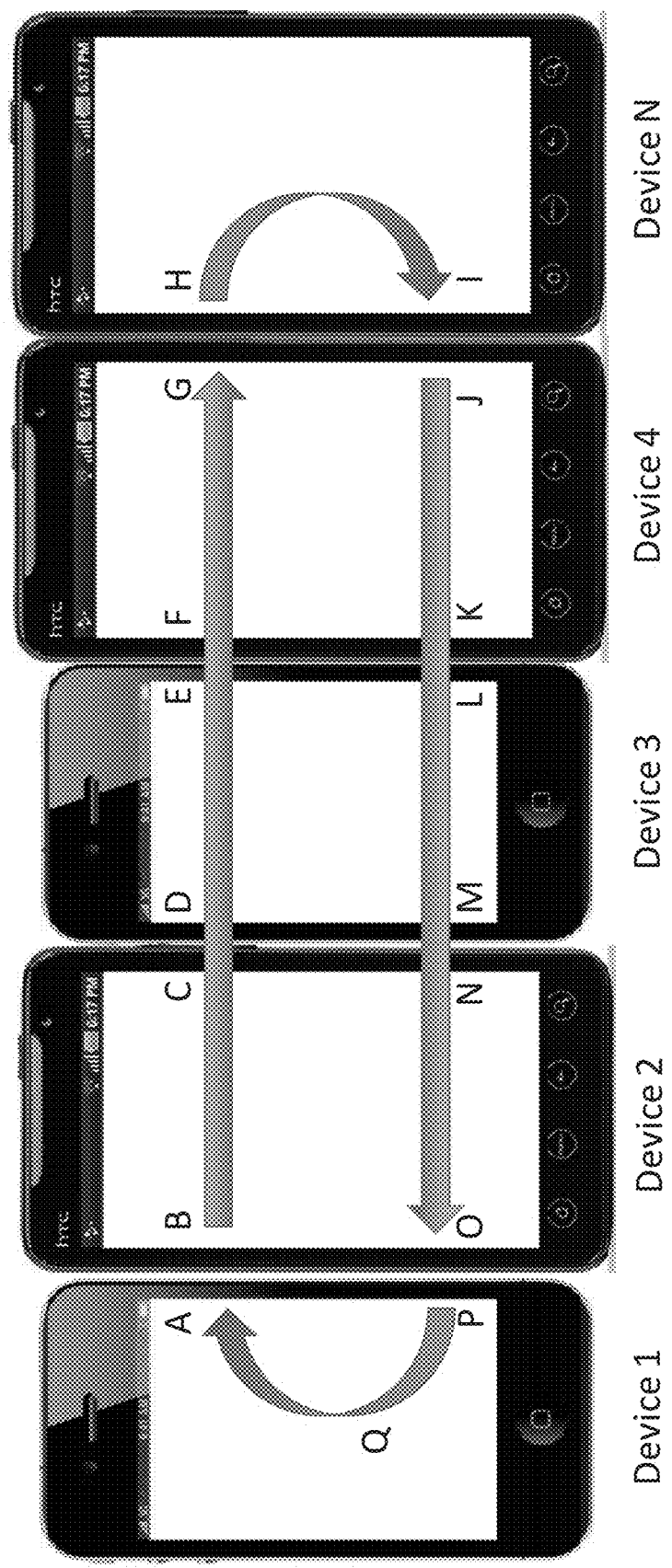
FIG. 18 illustrates a non-limiting example of the example of FIG. 10B in more detail, according to an exemplary embodiment.

FIG. 18 illustrates a non-limiting example of the use case example of FIG. 10b in more detail. According to the process of FIG. 18, first the users of devices 1-N click a button, select an icon, access a particular webpage, etc., on all devices, to load the customized webpage into the browser of the devices and to display the webpage on the device's touch screens (step 1). Then the user at device 1 starts the multi-device gesture at point A and continues through device 2-N (step 2). Device 2-N may being transmitting heartbeat information to the pairing system at points B, D, F and H, or may transmit heart beat information to the pairing system only at points C E G & I (step 3). Device N (the end device) detects an "endpoint", "turn back" or "double back" gesture on the same side (left side) of the screen of the device N at points H and I (Step 4). Device N signals stop to Devices 1 through N−1 at point I (Step 5). Devices N−1 through Device 1 signal they are done receiving touch information at points K M O Q (Step 6). Device 1 Signals final end of the gesture at point Q (Step 7).

As described below, it is possible to include a check step (step 8) in place by subtracting the number of points between a single device's end points on opposite sides of the screen, such as B/O D/M F/K & A/Q points, to see if it matches what the pairing server 15 determines is supposed to have been paired as described below.

Each device 1-N sends periodic heartbeat to the pairing server, every N ms or M pixels (where N and M are variables). The pairing server receives the heartbeat from each device and turns it into a fingerprint using the Characterization Engine, then compares it with known points through a Comparison Engine. If any matches, it will send back a response.

In the Characterization Engine—Characterization engine takes inputs such as x,y coordinates, time, location, velocity etc, and forms simple fingerprint(s) that can be easily stored and compared (e.g. store as multi-dimensional vector, and we can use a simple distance function to compare how close two points are). In Comparison Engine—compare existing points based to see if there are any matches. The comparison engine first navigates to the appropriate bucket (correct 3rd party service, time), then compares the fingerprints (geolocation, x,y, velocity and other fingerprints), then finally does sanity check (e.g. entry/exit points, if it applies), described as follows. These entry/exit points per device edge represent a simple checksum, represented by the following Formula 1: Number of total touchscreen edge events/4)+1=the total number of paired devices in series. The two end devices have a total number of edge events of 4 (top right and bottom right for the originating device and top left and bottom left for the end device in the chain). Each middle device will have four edge events (top left, top right, bottom right and bottom left respectively). If the comparison engine doesn't detect a round number of devices with the simple calculation of Formula 1 above, the gesture may have failed at some point in the multi-device pairing process where a finger was picked up along the gesture before getting to an edge on a device.

Figure 19:
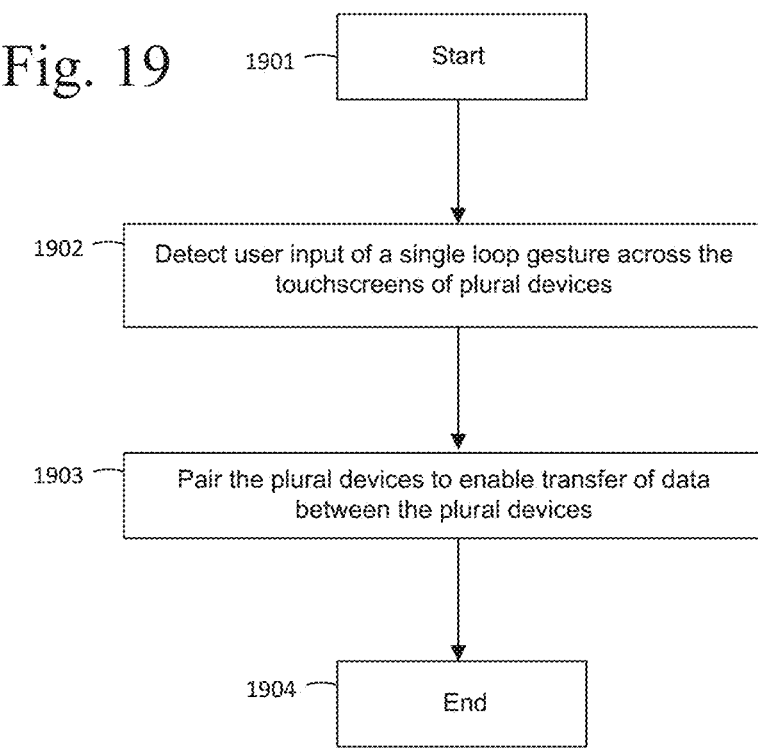
FIG. 19 illustrates an example of a method performed by the device pairing server 80 illustrated in FIG. 8, according to an exemplary embodiment.

FIG. 19 illustrates an example of a workflow of a method performed by the device pairing server 80 illustrated in FIG. 8, according to an exemplary embodiment. After the workflow begins in step 1901, the device pairing server detects user input of a single loop gesture across the touchscreens of the plural devices in step 1902. In step 1903, the device pairing server automatically pairs the plural devices to enable transfer of data between the plural devices, and then the workflow ends in step 1904.

According to an exemplar) embodiment, the determination module 80a of the device pairing module determines that the single loop gesture corresponds to a drag operation of an icon of data (e.g. a file, a link, payload, or any other piece of deliverable data or information) displayed on the touchscreen of one of the plural devices; and determines an operation corresponding to the data, and automatically causes an application installed on the plural devices to perform the operation based on the data.

Figure 20:
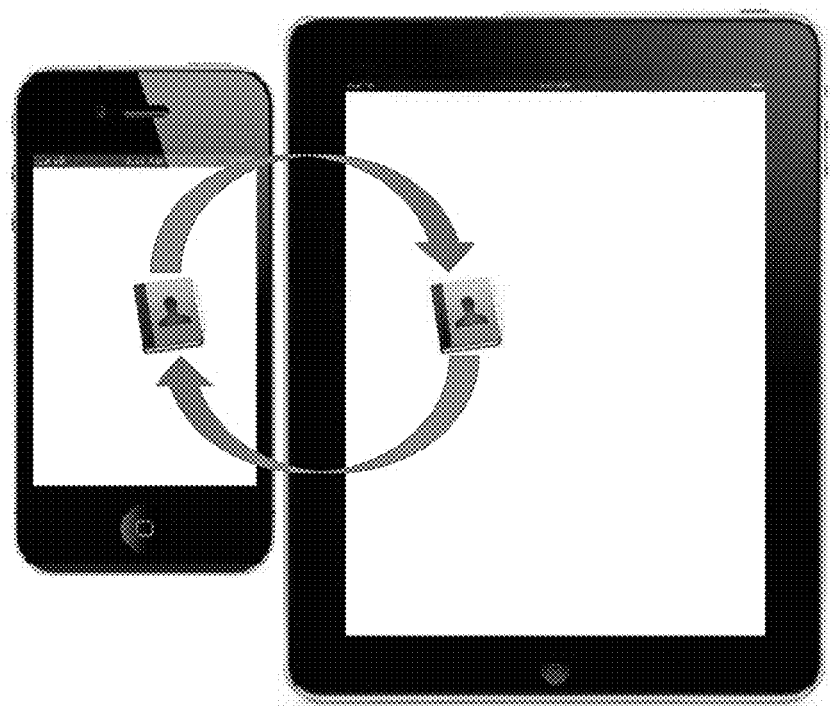
FIG. 20 illustrates an example of a single loop gesture corresponding to the dragging of an icon of user profile/contact information, according to various exemplary embodiments.

For example, the data may correspond to user contact information (see FIG. 20), and the operation is storing the user contact information.

Figure 21:
FIG. 21 illustrates an example of a single loop gesture corresponding to the dragging of an icon of user profile/contact information, according to various exemplary embodiments.
Figure 22:
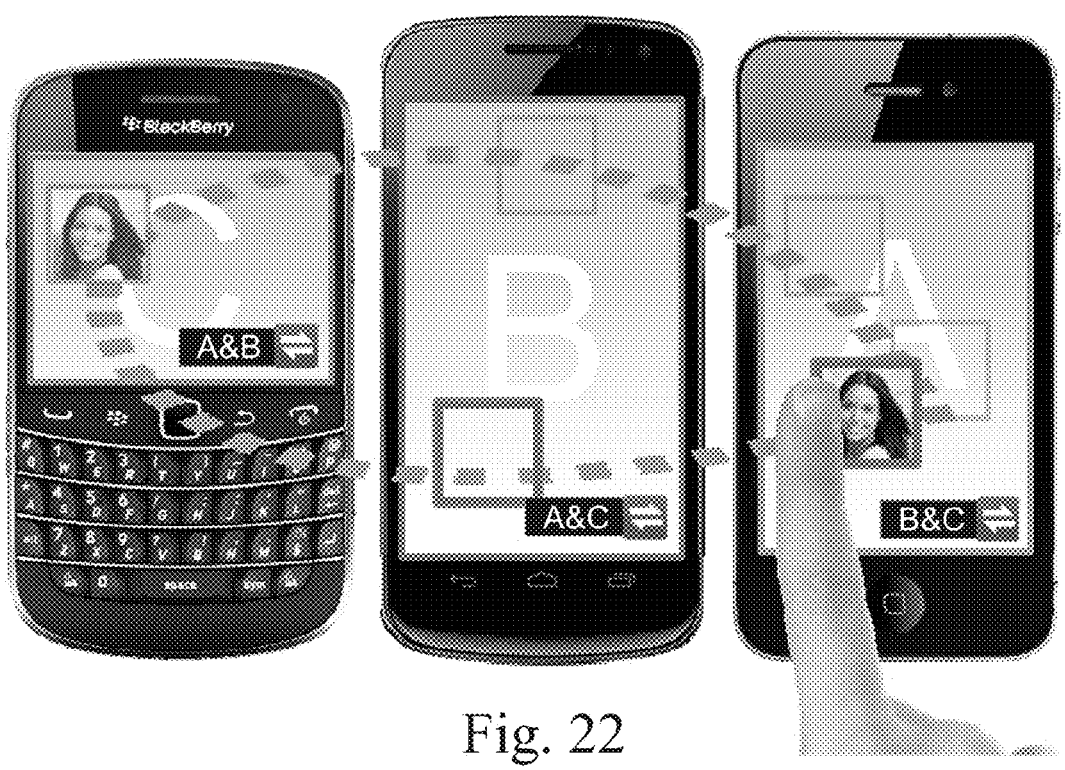
FIG. 22 illustrates an example of a single loop gesture corresponding to the dragging of an icon of user profile/contact information, according to various exemplary embodiments.

As another example, the data may correspond to user profile/contact information (see FIGS. 21 and 22), and the operation may be accessing a user profile webpage on a social networking website.

Figure 23:
FIG. 23 illustrates an example of a single loop gesture corresponding to the dragging of an icon of user profile/contact information, according to various exemplary embodiments.

As another example, the data may correspond to user profile/contact information (see FIGS. 21 and 22), and the operation is referring the user contact information to a colleague, or inviting the user described in the information to a group/event, or taking a business card from the user described in the information (see FIG. 23).

Figure 24:
FIG. 24 illustrates an example of a single loop gesture corresponding to the dragging of an icon of user profile/contact information, according to various exemplary embodiments.

As another example, the data may correspond to user profile/contact information (see FIGS. 21 and 22), and the operation is generating a message to the user described in the information (see FIG. 24).

Figure 25:
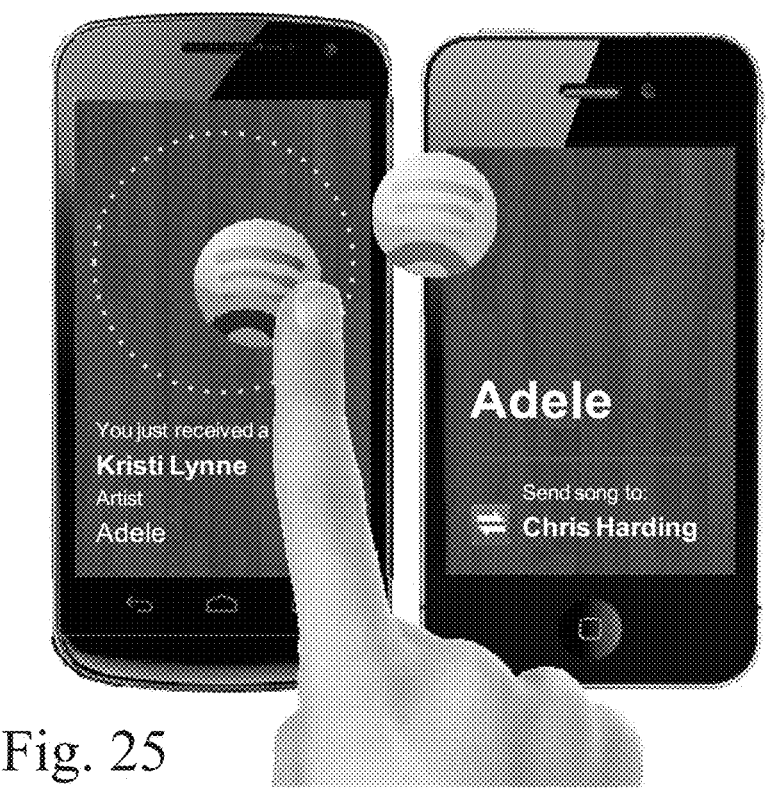
FIG. 25 illustrates an example of a single loop gesture corresponding to the dragging of an icon of a media file, according to an exemplary embodiment.

As another example, the data may correspond to a media file, and the operation is a playback operation (see FIG. 25).

Figure 26:
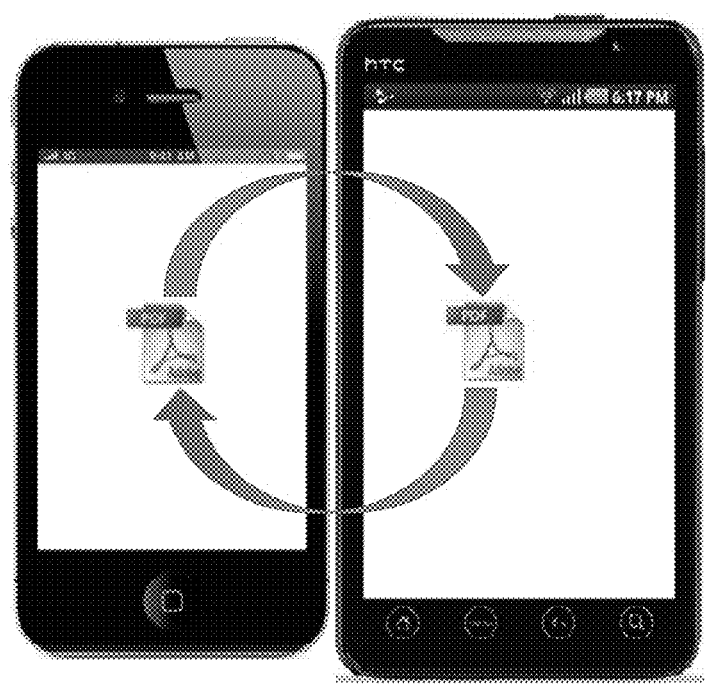
FIG. 26 illustrates an example of a single loop gesture corresponding to the dragging of an icon of a document file, according to various exemplary embodiments.
Figure 27:
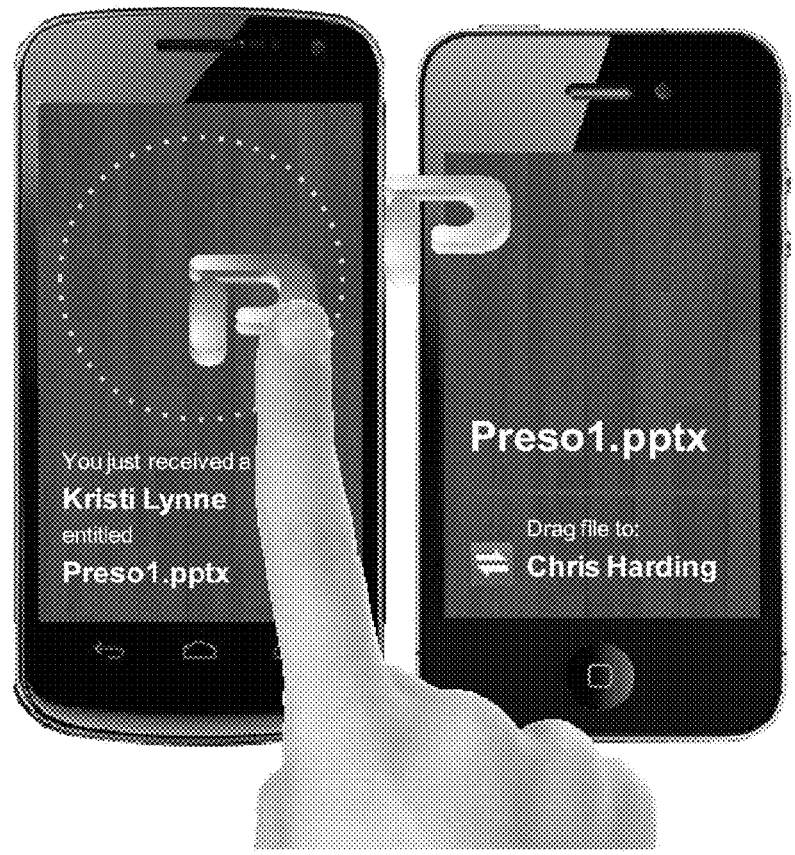
FIG. 27 illustrates an example of a single loop gesture corresponding to the dragging of an icon of a document file, according to various exemplary embodiments.

As another example, the data may correspond to an electronic document, and the operation is a document display operation (see FIGS. 26 and 27).

Figure 28:
FIG. 28 illustrates an example of a single loop gesture corresponding to the dragging of an icon of a geographic location information, according to an exemplary embodiment.

As another example, the data may correspond to geographic address information, and the operation is a mapping operation (see FIG. 28).

Figure 29:
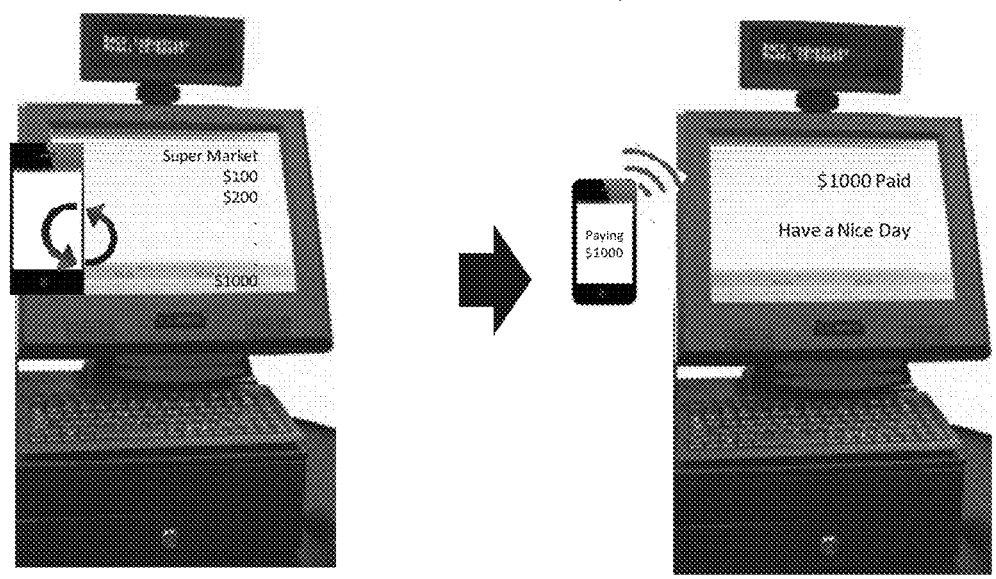
FIG. 29 illustrates an example of the multi-pairing system of this disclosure being used to connect/sync a mobile device with a cash register machine or other payment system, according to various exemplary embodiments.
Figure 30:
FIG. 30 illustrates an example of the multi-pairing system of this disclosure being used to connect/sync a mobile device with a cash register machine or other payment system, according to various exemplary embodiments.
Figure 31:
FIG. 31 illustrates an example of a single loop gesture corresponding to the dragging of an icon of a electronic payment information, according to an exemplary embodiment.

As another example, the data may correspond to electronic financial account information and/or electronic payment information, and the operation is an electronic payment operation (see FIGS. 29, 30 and 31). FIG. 29 illustrates an example of the multi-pairing system of this disclosure being used to connect/sync a mobile device with cash register machine or other payment system. That is, the user can perform a single loop gesture across the touchscreen of the mobile device and the touchscreen of the payment system, in order to pair the two systems and cause the payment system to access funds from a credit card, debit card, financial account, etc., in accordance with instructions received from the mobile device (or an application installed thereon).

As another example, the data may correspond to electronic financial account information, and the operation is an electronic deposit/withdrawal operation (see FIG. 32). FIG. 32 illustrates an example of the multi-pairing system of this disclosure being used to connect/sync a mobile device with an ATM device. That is, the user can perform a single loop gesture across the touchscreen of the mobile device and the touchscreen of the ATM device, in order to pair the two systems and cause the ATM device to withdraw money in accordance with instructions received from the mobile device (or an application installed thereon).

As another example, the data may correspond to a multi-player electronic game, and the operation is initiating the multi-player electronic game.

FIG. 33a illustrates an example of the multi-pairing system of this disclosure being used to connect/sync a mobile device with a car's electronic audio/entertainment. That is, the user can perform a single loop gesture across the touchscreen of the mobile device and the touchscreen of the in-car entertainment system, in order to pair the two systems and cause the car's entertainment system to play music stored on the mobile device. In this way, the user can control the mobile device to cause the in-car entertainment system to play media stored on the mobile device or stored within the in-car entertainment system, for example.

FIG. 33b illustrates an example of the multi-pairing system of this disclosure being used to connect/sync a mobile device with a car's electronic audio/entertainment via Bluetooth. That is, the user can perform a single loop gesture across the touchscreen of the mobile device and the touchscreen of the in-car entertainment system, in order to pair the two systems via Bluetooth and cause the car's entertainment system to act as a hands-free microphone and speaker for the mobile device, via the Bluetooth connection. In this way, the user make calls on their mobile device using the hands-free microphone and speaker of the car's entertainment system.

FIG. 34 illustrates an example of the multi-pairing system of this disclosure being used to connect/sync a mobile device with a television. That is, the user can perform a single loop gesture across the touchscreen of the mobile device and the touchscreen of the television system, in order to pair the two systems and cause the television to play media stored on the mobile device or mirror the display output of the mobile device. In this way, the user can control the mobile device to cause the TV system to play media stored on the mobile device or stored at the TV system, for example.

Figure 35:
FIG. 35 illustrates examples of the multi-pairing system of this disclosure being used to connect/sync a mobile device with various devices, according to various exemplary embodiments.
Figure 39:
FIG. 39 illustrates an example of the multi-pairing system of this disclosure being used to connect/sync a mobile device with the trackpad or touchpad of a laptop computer, according to an exemplary embodiment.

Similarly, the aspects of this disclosure may be applied to any touchscreen-enabled devices, such as an information kiosk, cash register, fridge, washing machine, environmental control system, vending machine, and so forth, as seen in FIG. 35. One of the touchscreen enable devices may even be a laptop computer, wherein the "touchscreen" of the laptop is the trackpad or touchpad of the laptop, as seen in FIG. 39. For example, the trackpad or touchpad of the laptop may receive touch gesture co-ordinate information corresponding to a user input gesture performed on the trackpad or touchpad of the laptop.

Figure 36:
FIG. 36 illustrates aspects of a user interface of a mobile device, according to an exemplary embodiment.

As illustrated in FIG. 36, a user device may include a user interface that indicates the other users and other devices to which the present user is paired with. The user interface displays media files (e.g. photos, documents, songs) which the user can share with the paired users/devices. The user interface also displays financial account/payment information which the user can use to make a payment. The user interface also displays games which the user can play with the paired users/devices. When the user drags icons of the aforementioned items to a specific area, such information is transferred to the paired devices. As seen in FIG. 37, the user can drag conventional mobile apps to an icon, in order to make such apps accessible to the user interface illustrated in FIG. 36.

FIG. 38 illustrates an example a method performed by the device pairing server 80 illustrated in FIG. 8, according to an exemplary embodiment. The method of FIG. 38 may be performed after the method of FIG. 19, for example. After the workflow begins in step 3801, the device pairing server determines that the single loop gesture corresponds to a drag operation of an icon of data (e.g. a file) displayed on the touchscreen of one of the plural devices in step 3802. In step 3803, the device pairing server determines an operation corresponding to the data, and automatically causes an application installed on the plural devices to perform the operation based on the data. The workflow ends in step 3804.

Multi-Finger Loop Gesture

Figure 40:
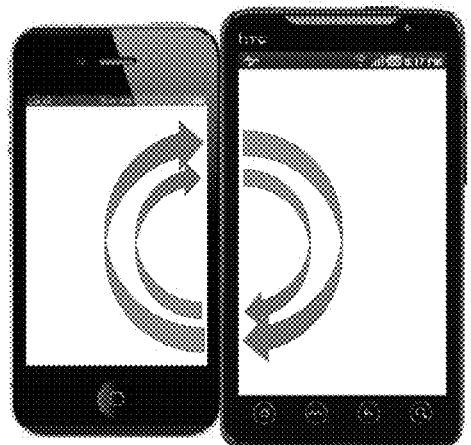
FIG. 40 illustrates an example of a multi-finger single circle gesture performed on the touch screens of two mobile devices, according to an exemplary embodiment.

While the previous embodiments described a single loop gesture, which may be performed by a user using a single finger, it should be understood that the aspects of this disclosure are applicable to gestures (e.g. a single loop gesture) performed by multiple fingers, as seen in FIG. 40.

The various aspects of the other embodiments described in this disclosure are applicable to the multi-loop gesture described here, and will not be described again in the interests of brevity.

Multi-Finger Pinch/Slide Gesture

Figure 41:
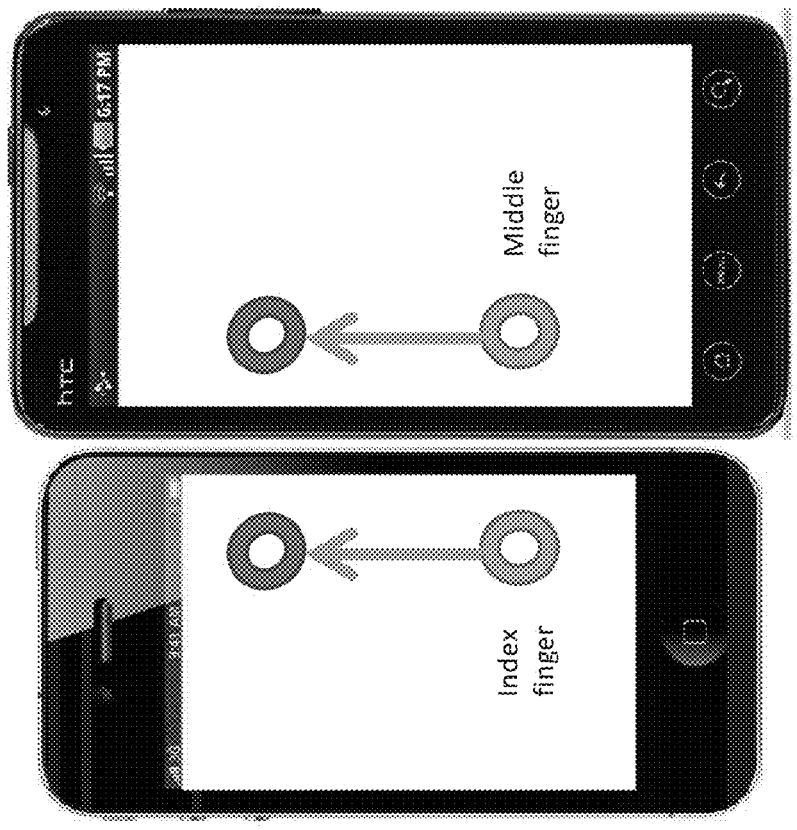
FIG. 41 illustrates an example of a multi-finger slide gesture performed on the touch screens of two mobile devices, according to an exemplary embodiment.
Figure 42:
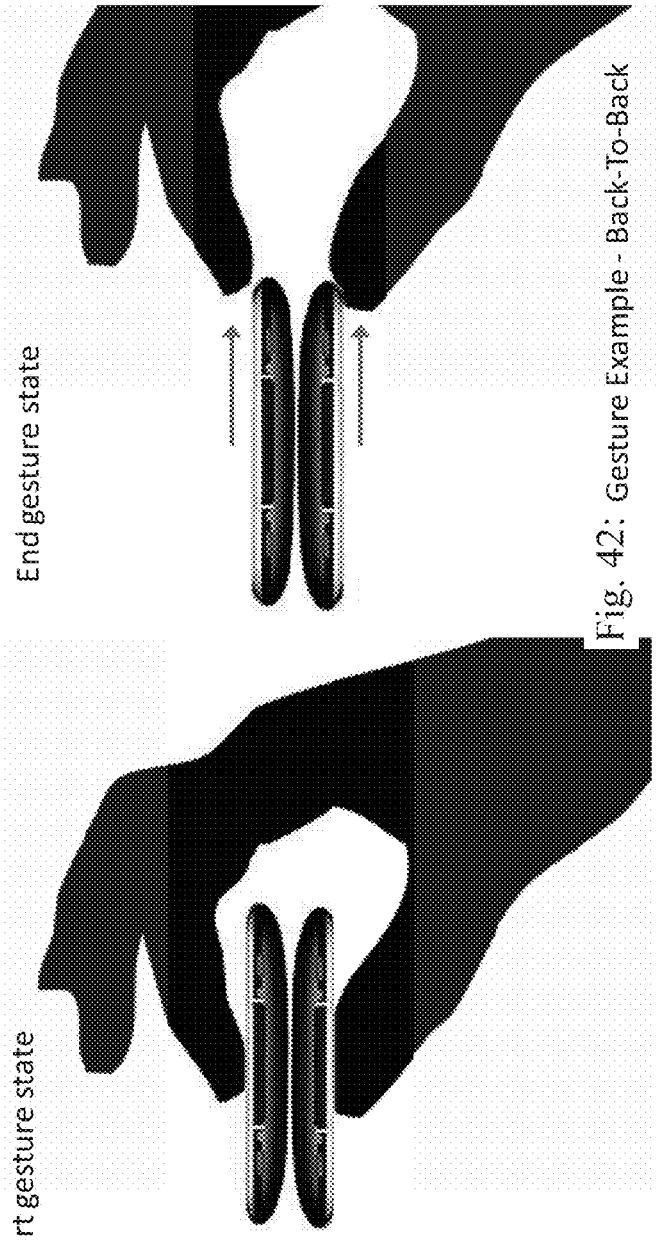
FIG. 42 illustrates an example of a multi-finger "moving pinch" gesture performed on the touch screens of two mobile devices placed back-to-back, according to an exemplary embodiment.

The aspects of this disclosure are also applicable to another type of gesture wherein the user places one finger on each device's touchscreen, and moves their hand (while keeping the positions of their fingers relative to their hand fixed) to perform a single continuous multi-finger gesture on the touchscreens of the plural devices using one hand. For example, the user may place the devices side by side, place one finger on each device's touchscreen, and slide their hand and fingers upward, as seen in FIG. 41, to perform a single continuous multi-finger gesture on the touchscreens of the plural devices using one hand. As another example, the user may place the devices "back-to-back", place their thumb on the touchscreen of one device and another finger on the touchscreen of another device, and then slide their hand in a particular direction, as seen in FIG. 42.

The detection module 80a of the device pairing system 80 may detect the gesture by comparing angle, direction, curvature, speed, acceleration, etc, of the touch input information received from the plural devices, to see if there is a match between the touch input information. For example, the velocity and acceleration of the finger touch inputs should be nearly identical. The pairing module 80b may then pair the devices.

The various aspects of the other embodiments described in this disclosure are applicable to the multi finger pinch/slide gesture described here, and will not be described again in the interests of brevity.

Multi-Finger Turn/Rotate Gesture

Figure 43:
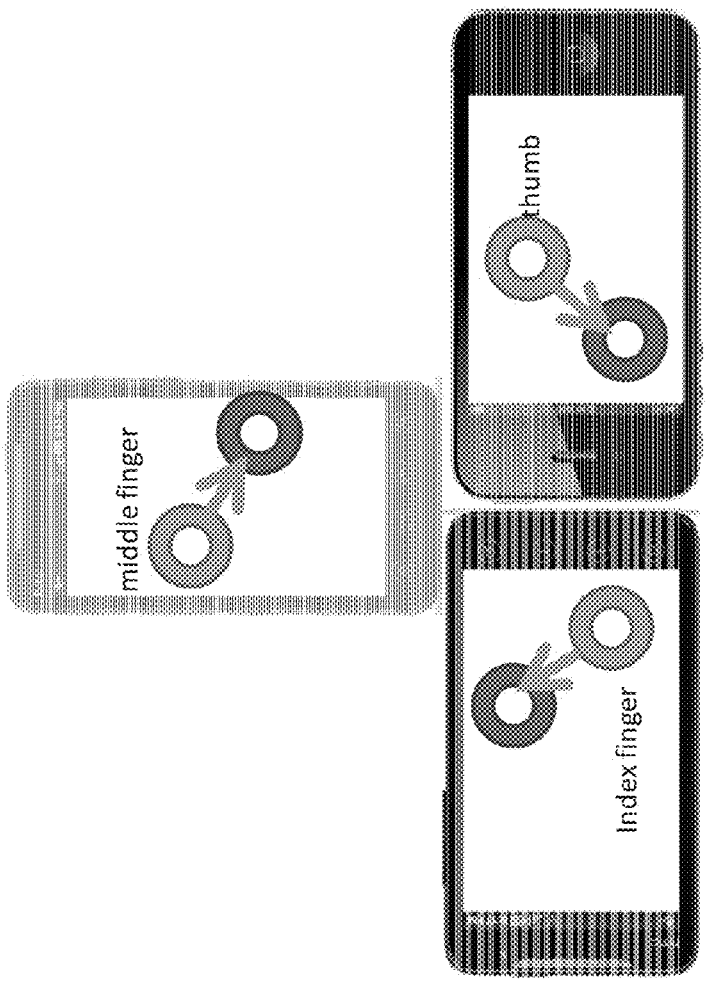
FIG. 43 illustrates an example of a multi-finger "turn" or "rotation" or "turn" gesture performed on the touch screens of multiple mobile devices placed next to each other, according to an exemplary embodiment.

The aspects of this disclosure are also applicable to another type of gesture: a multi-finger "rotation" or "turn" gesture performed on the touch screens of multiple mobile devices placed next to each other. For example, a user may place plural devices next to each other, place one finger on each device's touchscreen, and then rotate their hand (while keeping the positions of their fingers relative to their hand fixed) to perform separate but related gestures on the touchscreens of the plural devices, as seen in FIG. 43.

The detection module 80a of the device pairing system 80 may detect the gesture by comparing angle, direction, curvature, speed, acceleration, etc, of the touch input information received from the plural devices, to see if there is a match between the touch input information. For example, the velocity and acceleration of the finger touch inputs should be nearly identical. The pairing module 80b may then pair the devices.

The various aspects of the other embodiments described in this disclosure are applicable to the multi finger turn/rotate gesture described here, and will not be described again in the interests of brevity.

Camera Recognition of Gestures

The aspects of this disclosure are also applicable in a device pairing system, wherein the user performs a gesture on the touchscreen of one device, in view of the camera of a separate camera-enabled device.

Figure 44:
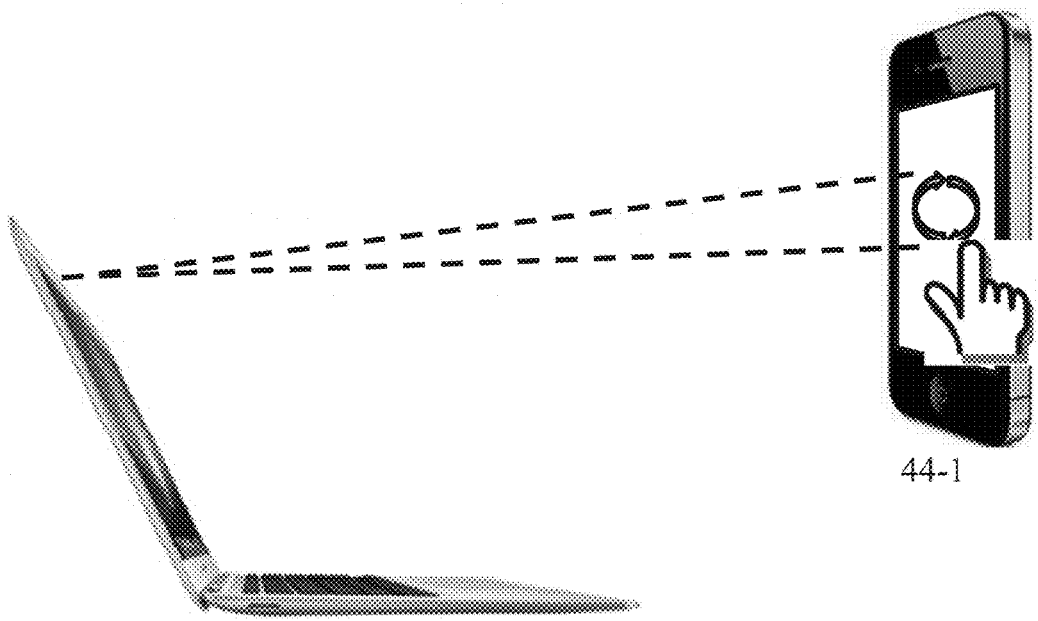
FIGS. 44 and 45 illustrate examples of a gesture performed on a mobile device being captured by the camera of camera-enabled device (FIG. 45) and/or an IR sensor of an IR sensor-equipped device (FIG. 46), to thereby pair the devices, according to various exemplary embodiments.

For example, as seen in FIG. 44, the user performs a gesture (e.g. single loop gesture) on the touchscreen of a mobile device 44-1, in view of the camera of a laptop computer 44-2. The mobile device transmits the touch input gesture information corresponding to the gesture to the device pairing server 80, which analyzes and recognizes the gesture, and determines that the mobile device is to be paired. Moreover, the camera of the laptop computer captures the performance of the gesture, and a gesture recognition module of the laptop computer analyzes and recognizes the performance of the gesture, and transmits camera gesture information corresponding to the performed gesture to the device pairing server 80. The server compares the touch input gesture information received from the mobile device 45-1 with the gesture camera information received from the laptop computer 45-2, and determines a match, and then proceeds to pair the devices.

The detection module 80a of the device pairing system 80 may determine the match by comparing angle, direction, curvature, speed, acceleration, etc, of the touch input gesture information received from the mobile device 45-1 and the gesture camera information received from the laptop computer 45-2. The pairing module 80b may then pair the devices.

Figure 45:
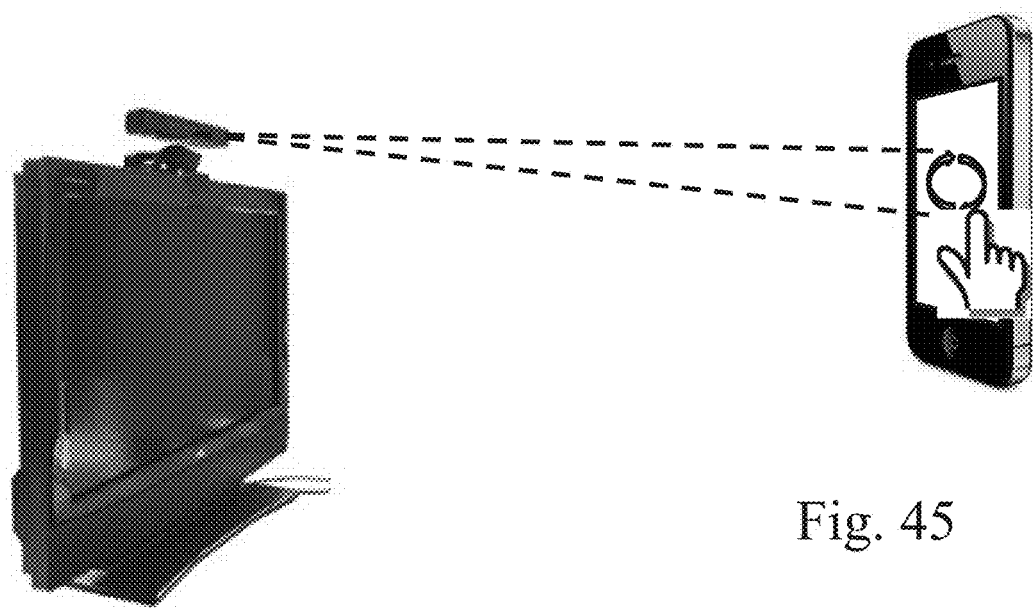

The camera-enabled device need not be a computer, but may be any camera-enabled device, such as a TV system with camera and IR sensors (see FIG. 45). In this scenario, IR information may be used by the TV system instead of (or in addition to) camera information, to recognize the performance of the gesture.

The various aspects of the other embodiments described in this disclosure are applicable to the camera-recognition gesture embodiment described here, and will not be described again in the interests of brevity.

While the examples shown in the figures (e.g. FIG. 1) may include two mobile devices, one third party server and one pairing server, it should be appreciated that such numbers of devices, systems, servers, apparatuses and terminals are arbitrary and are selected as an example in order to facilitate discussion, and that the subject matter of this disclosure can be implemented in a system including one or more systems, servers, apparatuses and terminals.

Further, it is noted that a mobile device, third party server and pairing server can be included in one integrated device (or of course can be separate devices). Other devices, such as scanners, printers and multi-function devices (MFDs) may also be connected to the network.

Another exemplary embodiment is described as follows. Conventionally, when a user wishes to initiate a Bluetooth or Wifi connection (e.g. connecting a mobile device to a local network, or to another mobile device, automobile, etc.), the user is forced to manually enter a code or password.

Figure 46:
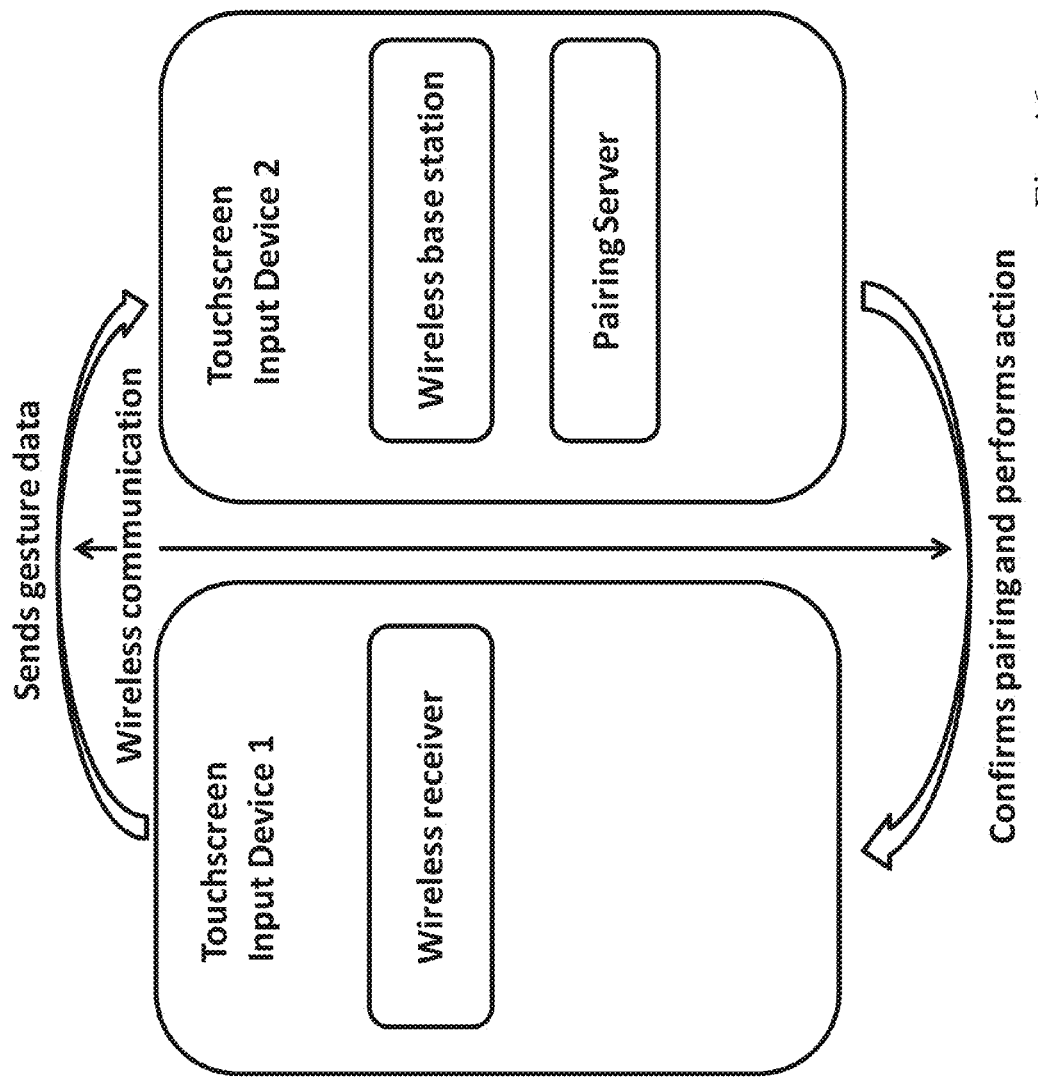
FIGS. 46-48 illustrate examples of how touchscreen input device 1 is paired with touchscreen input device 2 that functions as a pairing server and a wireless base station (FIG. 46), Bluetooth broadcaster (FIG. 47), or WiFi base station (FIG. 48), to thereby allow input device 1 to connect to a wireless network (FIG. 46), Bluetooth network (FIG. 47), or WiFi network (FIG. 48), according to various exemplary embodiments.
Figure 47:
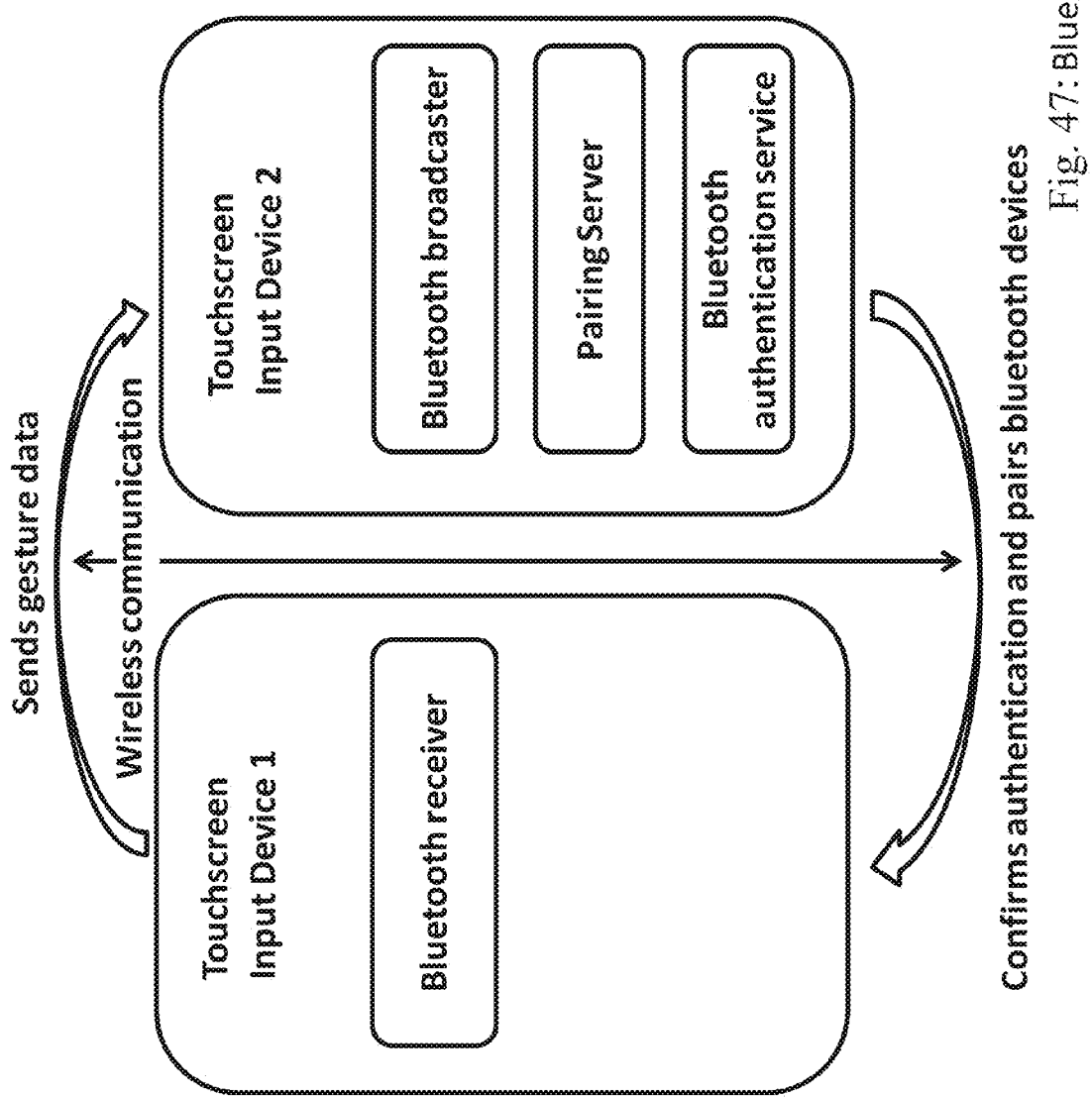
Figure 48:
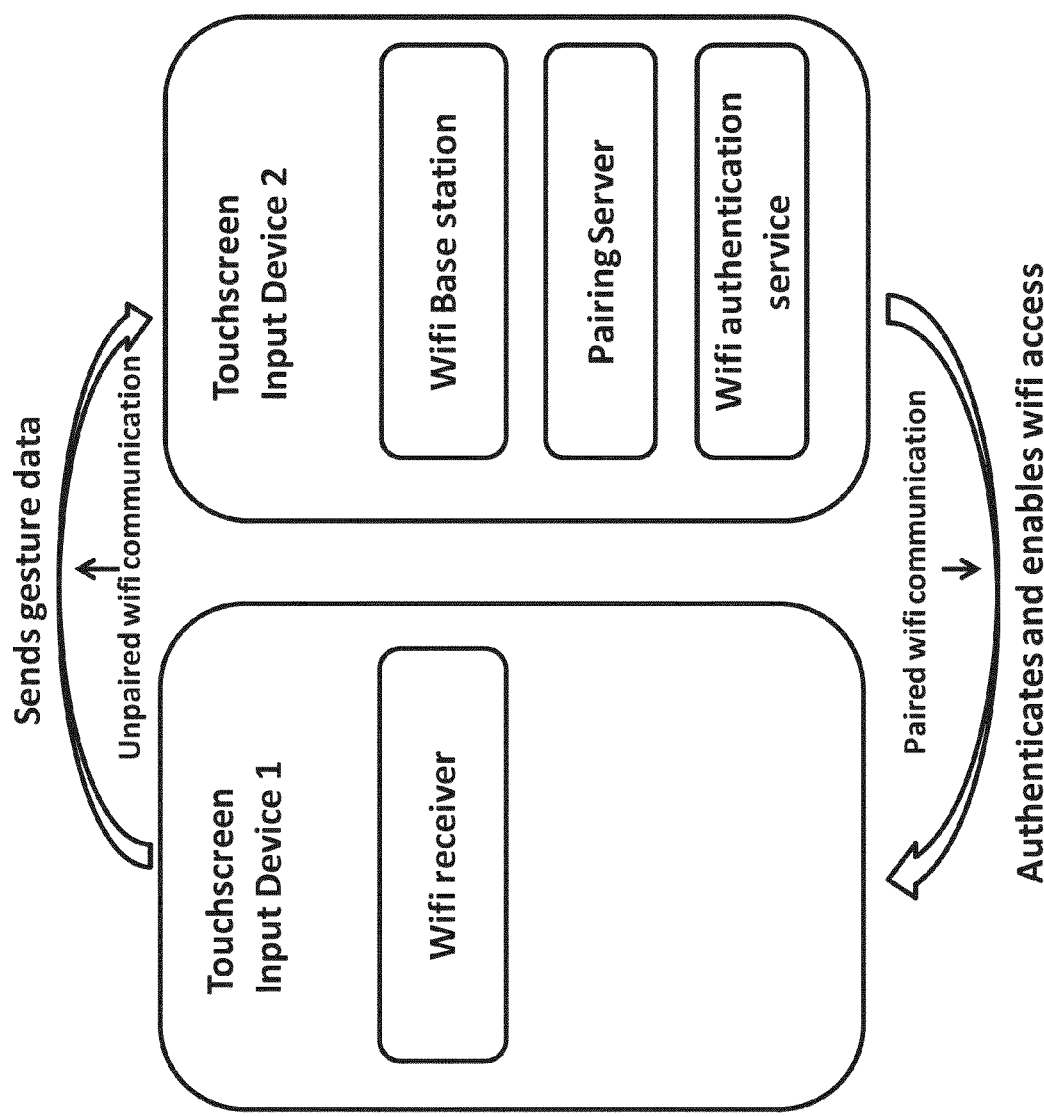

FIGS. 46-48 illustrate an embodiment where touchscreen input device 2 is in fact the pairing server, and touchscreen input device 1 connects to it via the touchscreen gesture across the displays of the two devices. According to another exemplary embodiment, touchscreen input device 2 is also a wireless base station (FIG. 46), Bluetooth broadcaster (FIG. 47), or WiFi base station (FIG. 48), and touchscreen input device 1 connects to a wireless network (FIG. 46), Bluetooth network (FIG. 47) or WiFi network (FIG. 48) by performing the touchscreen gesture with touchscreen input device 2.

Thus, if the user has a mobile device (e.g. phone) that is offline, and the user desires to connect to local network corresponding to another device (e.g. a laptop operating as a bluetooth broadcaster or Wifi/wireless base station), the user simply places the mobile device next to the laptop, makes the single continuous loop gesture, and the laptop may—in accordance with the exemplary embodiments described throughout this disclosure—authenticate the mobile device, pair the devices, and permit the mobile device to connect to the local wireless network (FIG. 46), Bluetooth network (FIG. 47) or WiFi network (FIG. 48) corresponding to the laptop device.

Each of the third party server 13, pairing server 15 and device pairing server 80 can be any computing device, including but not limited to a personal, notebook or workstation computer, a kiosk, a PDA (personal digital assistant), a MFD (multi-function device), a server, a mobile phone or handset, another information terminal, etc., that can communicate through a network with other devices.

Recognition of Gestures Based on Motion Detection

The aspects of this disclosure are also applicable in a device pairing system that utilizes a motion detection system to detect motions performed by the user that may correspond to the various single continuous gestures (e.g. single loop gestures) described throughout this disclosure. That is, instead of the user performing a single continuous gesture directly across the touch sensitive surfaces of plural devices by touching the touch sensitive surfaces of those devices, the user may perform an equivalent motion proximate to the display surfaces of those devices (but without necessarily touching the surfaces of those devices) within the range of a motion detection system, where the motion is detected by the motion detection system and translated to the corresponding single continuous gesture.

Figure 49:
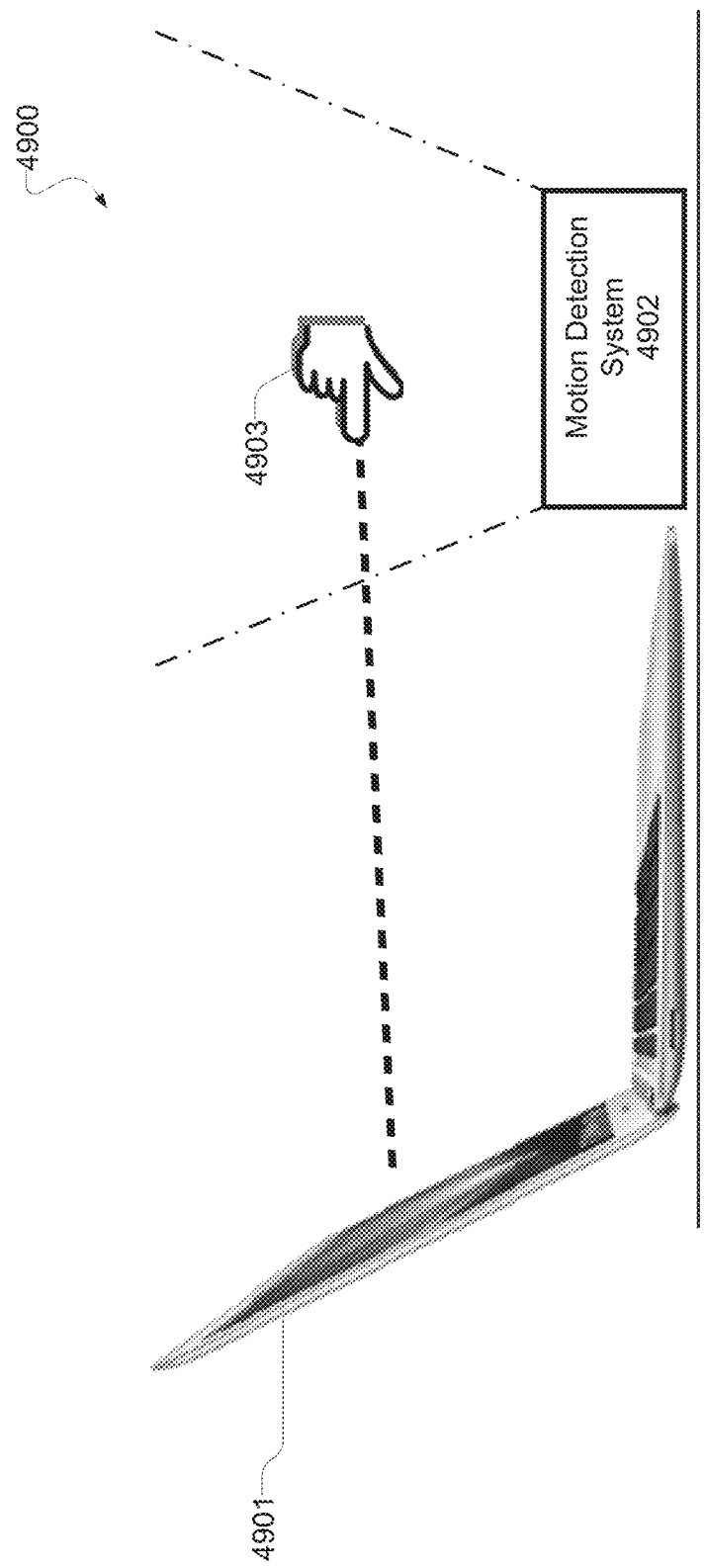
FIG. 49 illustrates an example of an environment including a motion detection system, according to various exemplary embodiments.

For example, FIG. 49 illustrates an example environment 4900 that includes a device 4901 and a motion detection system 4902. The device 4901 may be a personal computer or mobile device (e.g., a laptop, notebook computer, smartphone, tablet, etc.) that includes a display surface or screen (which may or may not be a touchscreen). The motion detection system 4902 is configured to detect any motion or movement performed by a user or a body part 4903 of the user (e.g., one or more fingers and/or hands) or an object manipulated by the user (e.g., a pen or stylus), within a certain range of the motion detected system 4902. Thus, when a user points or aims their finger at a specific point on the display surface of the device 4901, the user effectively selects that specific point on the display surface, just as the user would if they had touched that point on a corresponding touch sensitive display screen. Similarly, when the user moves their hand so that they are pointing at a second point on the display surface of the device 4901, the user effectively selects that second point, just as the user would if they had touched that second point on a touch sensitive display screen. Thus, the motions of the user are translated by the motion detection system 4902, in order to determine the points on the display surface of the device 4901 that are being selected (e.g., pointed to) by the user.

The aforementioned motion detection system 4902 may correspond to any system known to those skilled in the art capable of electronically detecting the motion of an object. For example, the motion detection system 4902 may detect motion based on: infrared (Passive and active sensors); optics (video and camera systems); radio frequency Energy (radar, microwave and tomographic motion detection); sound (microphones and acoustic sensors); vibration (triboelectric, seismic, and inertia-switch sensors); magnetism (magnetic sensors and magnetometers), and so on. Motion detection systems are well understood by those skilled in the art, and will not be described in more detail here and in the interests of brevity.

Figure 50A:
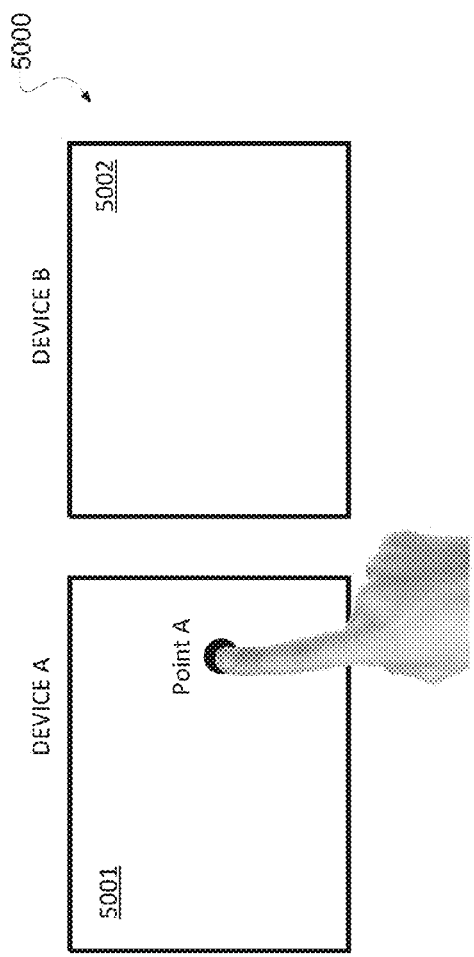
FIG. 50A illustrates an example of an environment including a motion detection system, according to various exemplary embodiments.
Figure 50B:
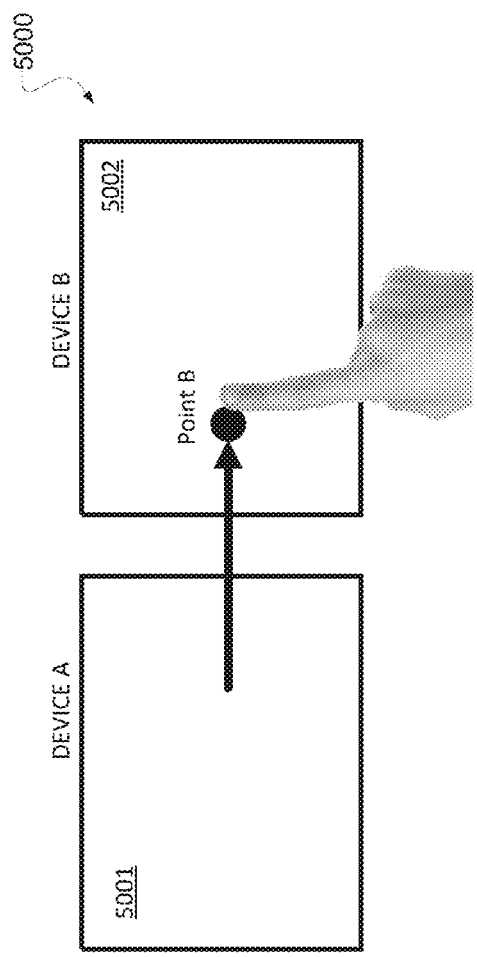
FIG. 50B illustrates an example of an environment including a motion detection system, according to various exemplary embodiments.

Thus, a motion detection system 4902 may detect a user motion that corresponds to user input of a single continuous gesture (e.g., a single loop gesture) across the display surfaces of plural devices. For example, FIG. 50*a* illustrates Device A with display surface 5001 and Device B with display surface 5002, where Device A and Device B are placed adjacent to each other. If the display surfaces 5001 and 5002 are touch sensitive surfaces, the user may specify a point such as Point A on display surface 5001 by simply touching that point, as illustrated in FIG. 50*a*. Thus, Device A generates "touch input gesture information" about a specific point selected by the user at a specific time, as described in various embodiments throughout this disclosure. Moreover, as illustrated in FIG. 50*b*, the user can perform a single continuous gesture by moving their finger from Point A on display surface 5001 to Point B on display surface 5002. Thus. Devices A and B generate touch input gesture information describing this single continuous gesture, as described in various embodiments throughout this disclosure.

Figure 51A:
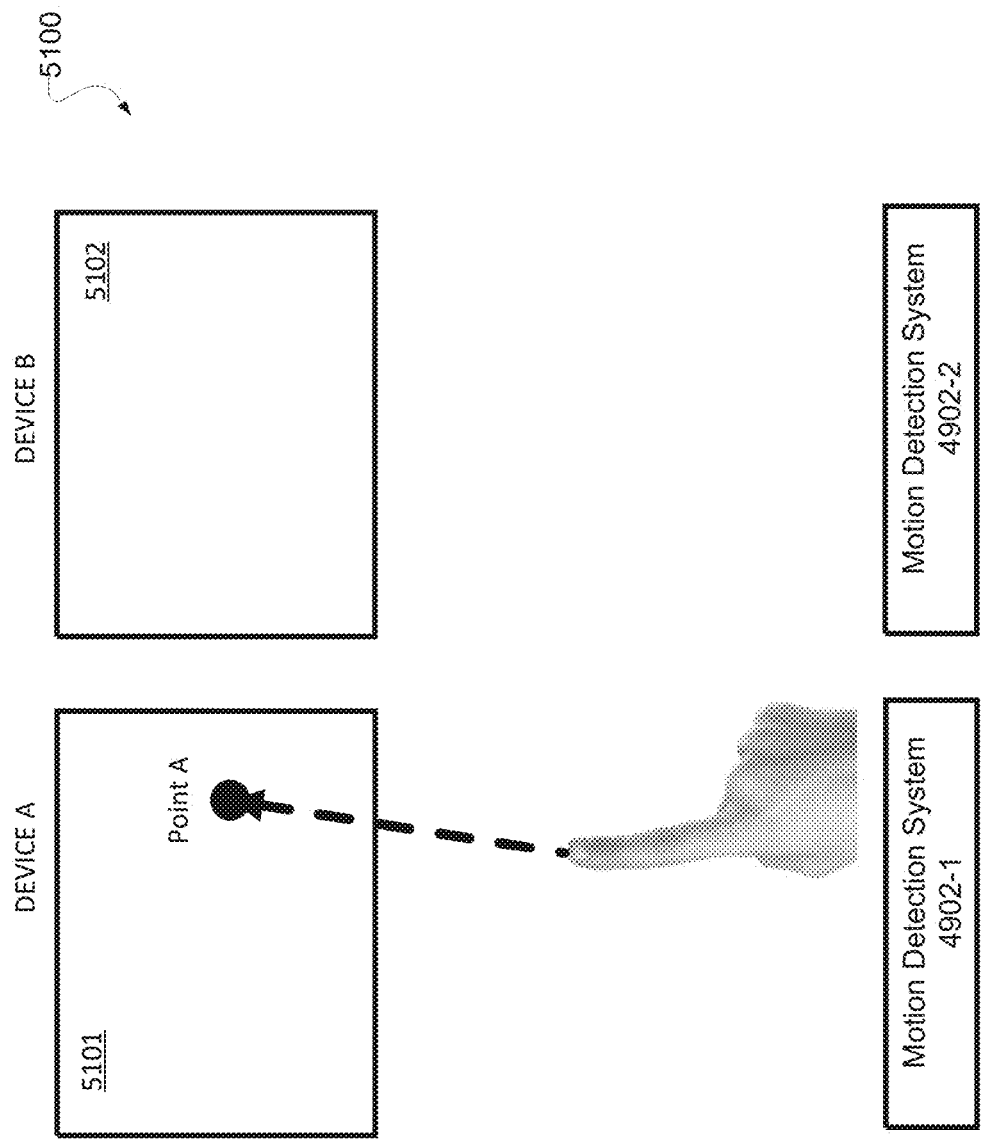
FIG. 51A illustrates an example of an environment including a motion detection system, according to various exemplary embodiments.
Figure 51B:
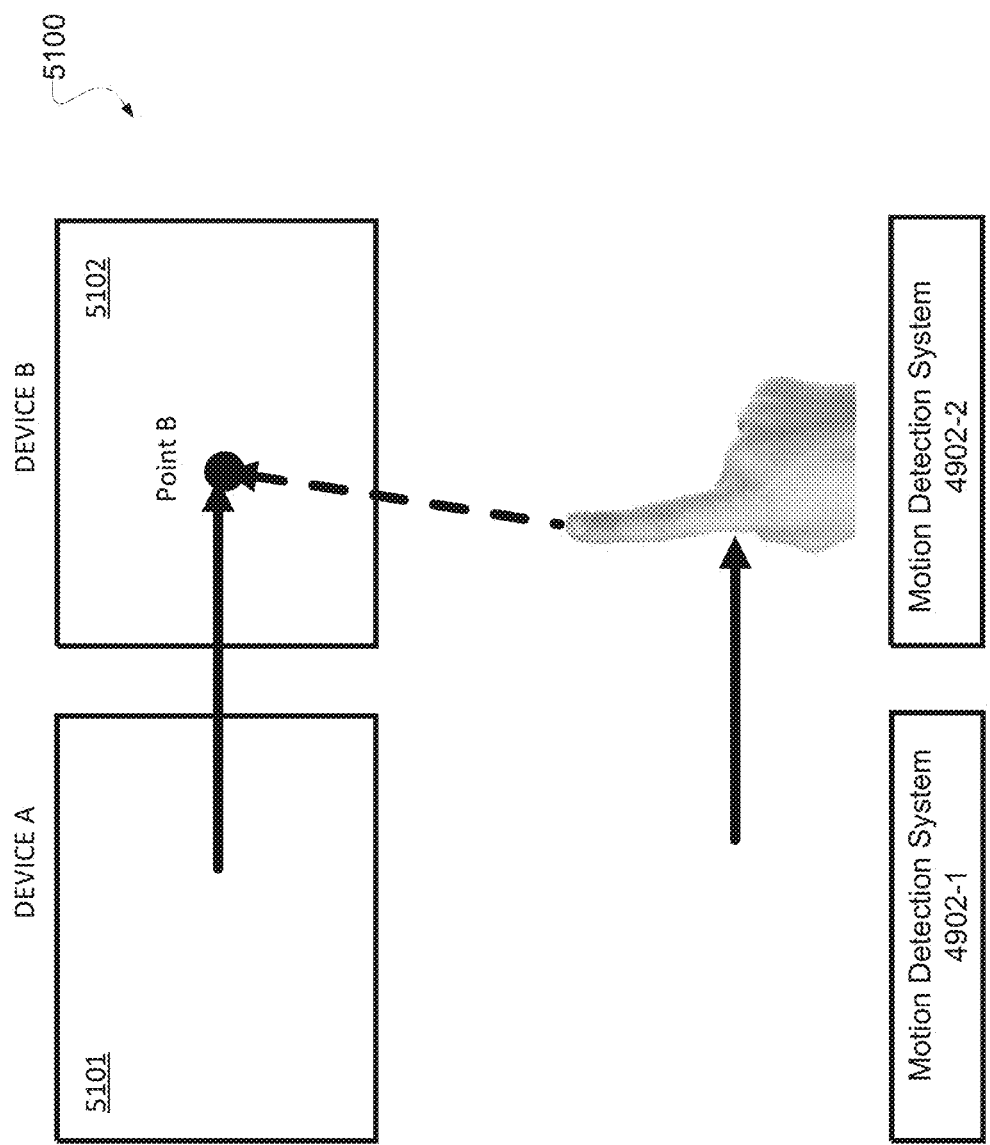
FIG. 51B illustrates an example of an environment including a motion detection system, according to various exemplary embodiments.

Now, FIGS. 51*a* and 51*b* illustrate an equivalent motion performed by the user that corresponds to the single continuous gesture illustrated in FIGS. 50*a* and 50*b*, where the motion performed by the user is detected by one or more motion detection systems. For example, as seen in FIG. 51*a*, an environment 5100 includes Device A with display surface 5101 and associated motion detection system 4902-1, and Device B with display surface 5102 and associated Motion Detection System 4902-2 (the display surface 5101 and 5102 need not be touch sensitive surfaces). As illustrated in FIG. 51*a*, when the user points their finger towards Point A, this movement of the user's hand is detected by the motion detection system 4902-1 and interpreted as a user selection of the Point A (similar to the touch selection of Point A by the user in FIG. 50*a*). Thus, in FIG. 51*a*, Device A generates information about a specific point selected by the user at a specific time (based on the input of the motion detection system 4902-1), just as if the user had touched that point on a corresponding touchscreen. Moreover, as illustrated in FIG. 51*b*, the user can perform the movement corresponding to the single continuous gesture in FIG. 50*b*, by moving their finger from a position aiming at Point A on display surface 5101 to the second position aiming at Point B on display surface 5102. This movement of the user's hand is detected by the motion detection system 4902-2 and interpreted as a user selection of the Point B (similar to the touch selection of Point B by the user in FIG. 50*b*). Thus, Devices A and B generate information about a single continuous gesture performed by a user, based on the input of the motion detection systems 4902-1 and 4902-2.

Thus, all the embodiments of this disclosure are applicable in a device pairing system that utilizes a motion detection system to detect motions performed by the user that correspond to single continuous gestures. This is because the user motions detected by the motion detection system may be translated to "motion input gesture information" describing single continuous gestures, where the "motion input gesture information" is substantially similar to the "touch input gesture information" described throughout this disclosure. That is, since the motion detection system 4902 is able to determine the exact time when a user selects a specific point on a display screen (just as if the user had selected that point on a corresponding touchscreen by touching it), this motion input gesture information is analogous to the touch input gesture information described throughout this disclosure. For example, Devices A and B in FIGS. 50*a* and 50*b* will generate touch input gesture information indicating that the user selected point A and then moved their hand to select point B, corresponding to a single continuous gesture. Similarly, Devices A and B in FIGS. 51*a* and 51*b* may generate motion input gesture information that is substantially similar to the aforementioned touch input gesture information generated in FIGS. 50*a* and 50*b* (i.e., indicating that the user selected point A and then moved their hand to select point B, corresponding to a single continuous gesture).

Accordingly, such motion input gesture information may be used by various devices, such as the pairing server 15, third party server 13, or pairing server 80, in order to determine whether the user has performed single continuous gesture and/or whether devices are to be paired, as described in various embodiments throughout. For example, Device A and Device B in FIGS. 51*a* and 51*b* may transmit the motion input gesture information corresponding to a gesture to the device pairing server 80, which analyzes and recognizes the gesture, and determines that the devices are to be paired. More specifically, the server 80 compares the motion input gesture information received from Device A with the motion input gesture information received from the Device B, and may determine a match by comparing angle, direction, curvature, speed, acceleration, etc., of the motion input gesture information received from Device's A and B. The pairing module 80*b* may then pair the devices if a match is detected.

Figure 52:
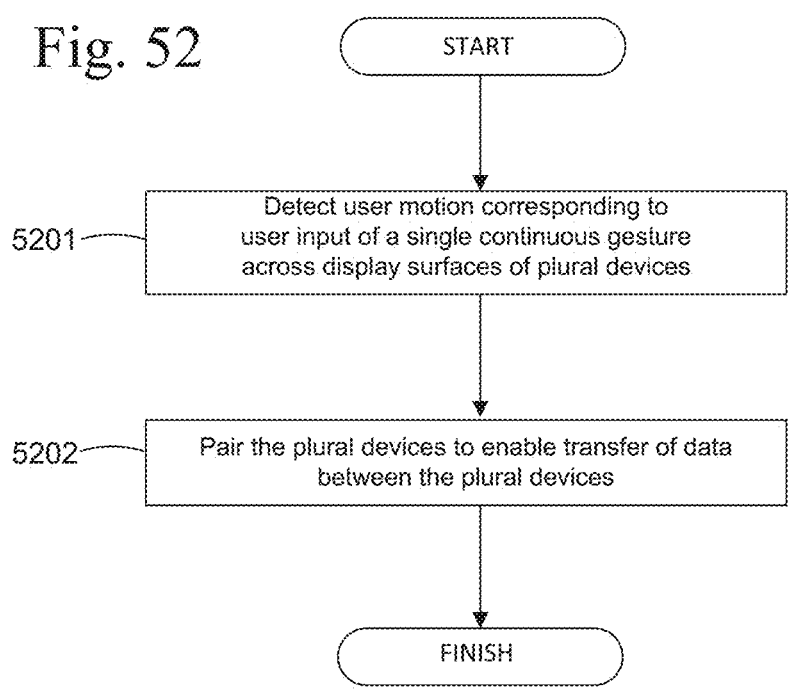
FIG. 52 illustrates an example of a method performed by the device pairing server, according to an exemplary embodiment.

FIG. 52 is a flowchart illustrating an example method 5200, according to various embodiments. The method 5200 may be performed at least in part by, for example, the pairing server 80 illustrated in FIG. 8. In 5201, the detection module 80*a*, detects using one or more motion detection systems, a user motion corresponding to user input of a single continuous gesture across the display surfaces of the plural devices, the gesture including at least one entry point and one exit point on each of the display surfaces of the plural devices. In 5202, the pairing module 80*b* pairs the plural devices to enable transfer of data between the plural devices.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 53:
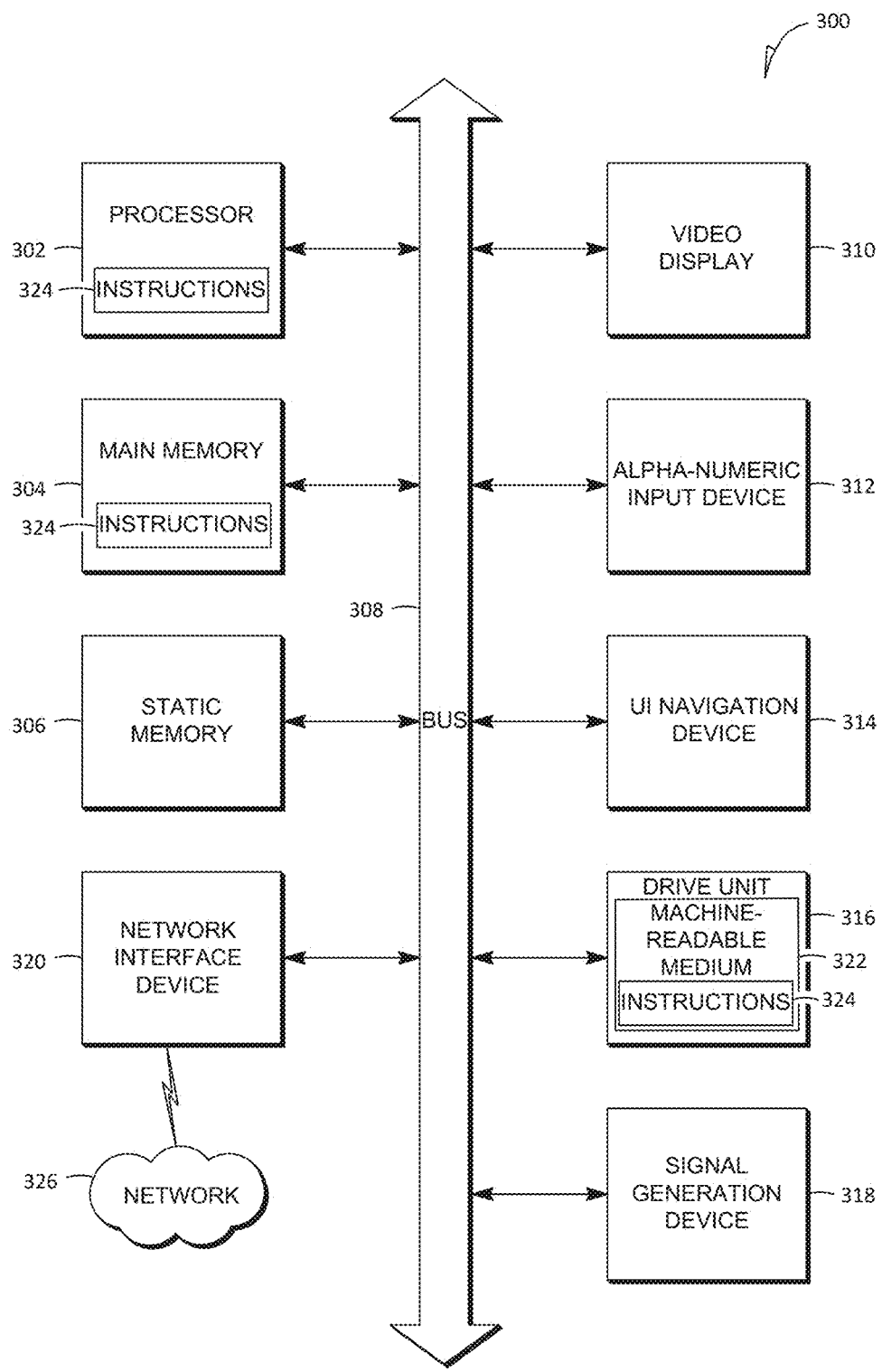
FIG. 53 is a block diagram of machine in the example form of a computer system within which instructions, for causing the machine to perform any one or more of the modules or methodologies discussed herein, may be executed.

FIG. 53 is a block diagram of machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

Machine-Readable Medium

The disk drive unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 324 may further be transmitted or received over a communications network 326 using a transmission medium. The instructions 324 may be transmitted using the network interface device 320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
a processor and a memory comprising instructions which, when executed by the processor, cause the system to:
receive gesture data resulting from a physical user gesture associated with a first device and a second device;
extract from the gesture data a first curved-line between contact points of the physical user gesture on a first touchscreen of the first device and an exit point of the physical user gesture on the first touchscreen;
extract from the gesture data a second curved-line between contact points of the physical user gesture on a second touchscreen of the second device and an entry point of the physical user gesture on the second touchscreen;
determine that the first and second curved-lines correspond to curved-line portions of a same circle based on respective curvatures of the first and second curved-lines and relative positions of the exit point on the first touchscreen and the entry point on the second touchscreen; and
initiate a communicative coupling between the first device and the second device based on the determination.

2. The system of claim 1, wherein the memory further comprises instructions which, when executed by the processor, cause the system to base the initiation of the communicative coupling on a direction determined from the gesture data.

3. The system of claim 1, wherein the memory further comprises instructions which, when executed by the processor, cause the system to base the initiation of the communicative coupling on an angle determined from the gesture data.

4. The system of claim 1, wherein the memory further comprises instructions which, when executed by the processor, cause the system to base the initiation of the communicative coupling on a speed determined from the gesture data.

5. The system of claim 1, wherein the memory further comprises instructions which, when executed by the processor, cause the system to base the initiation of the communicative coupling on an acceleration determined from the gesture data.

6. The system of claim 1, wherein the memory further comprises instructions which, when executed by the processor, cause the system to:
access sensor data for the first device and the second device;
determine a likelihood of an association between particular devices of a plurality of candidate devices using the sensor data; and
identify the first device and the second device from among the plurality of candidate devices based on the determined likelihood.

7. The system of claim 6, wherein the sensor data comprises geolocation data.

8. A method comprising:
receiving gesture data resulting from a physical user gesture associated with a first device and a second device;
extracting from the gesture data a first curved-line between contact points of the physical user gesture on a first touchscreen of the first device and an exit point of the physical user gesture on the first touchscreen;
extracting from the gesture data a second curved-line between contact points of the physical user gesture on a second touchscreen of the second device and an entry point of the physical user gesture on the second touchscreen;
determining that the first and second curved-lines correspond to curved-line portions of a same circle based on respective curvatures of the first and second curved-lines and relative positions of the exit point on the first touchscreen and the entry point on the second touchscreen; and initiating a communicative coupling between the first device and the second device based on the determination.

9. The method of claim 8, further comprising basing the initiation of the communicative coupling on a direction determined from the gesture data.

10. The method of claim 8, further comprising basing the initiation of the communicative coupling on an angle determined from the gesture data.

11. The method of claim 8, further comprising basing the initiation of the communicative coupling on a speed determined from the gesture data.

12. The method of claim 8, further comprising basing the initiation of the communicative coupling on an acceleration determined from the gesture data.

13. The method of claim 8, further comprising:
accessing sensor data for the first device and the second device;
determining a likelihood of an association between particular devices of a plurality of candidate devices using the sensor data; and
identifying the first device and the second device from among the plurality of candidate devices based on the determined likelihood.

14. The method of claim 13, wherein the sensor data comprises geolocation data.

15. A non-transitory machine-readable medium storing instructions that, when executed by at least one processor of a machine, cause the machine to perform operations comprising:
receiving gesture data resulting from a physical user gesture associated with a first device and a second device;
extracting from the gesture data a first curved-line between contact points of the physical user gesture on a first touchscreen of the first device and an exit point of the physical user gesture on the first touchscreen;
extracting from the gesture data a second curved-line between contact points of the physical user gesture on a second touchscreen of the second device and an entry point of the physical user gesture on the second touchscreen;
determining that the first and second curved-lines correspond to curved-line portions of a same circle based on respective curvatures of the first and second curved-lines and relative positions of the exit point on the first touchscreen and the entry point on the second touchscreen; and
initiating a communicative coupling between the first device and the second device based on the determination.

16. The non-transitory machine-readable medium of claim 15, the operations further comprising basing the initiation of the communicative coupling on a direction determined from the gesture data.

17. The non-transitory machine-readable medium of claim 15, the operations further comprising basing the initiation of the communicative coupling on an angle determined from the gesture data.

18. The non-transitory machine-readable medium of claim 15, the operations further comprising basing the initiation of the communicative coupling on a speed and/or acceleration determined from the gesture data.

19. The non-transitory machine-readable medium of claim 15, the operations further comprising:
accessing sensor data for the first device and the second device;
determining a likelihood of an association between particular devices of a plurality of candidate devices using the sensor data; and
identifying the first device and the second device from among the plurality of candidate devices based on the determined likelihood.

20. The non-transitory machine-readable medium of claim 19, wherein the sensor data comprises geolocation data.

* * * * *